United States Patent [19]

Birbaum et al.

[11] Patent Number: 5,597,854
[45] Date of Patent: Jan. 28, 1997

[54] LATENT LIGHT STABILIZERS

[75] Inventors: Jean-Luc Birbaum, Kobe, Japan; Gerhard Rytz, Bern; Vien Van Toan, Lentigny, both of Switzerland; Andreas Valet, Binzen, Germany; Norbert Würms, Ursen, Switzerland

[73] Assignee: Ciba-Geigy Corporation, Tarrytown, N.Y.

[21] Appl. No.: 556,159

[22] Filed: Nov. 9, 1995

[30] Foreign Application Priority Data

Nov. 14, 1994 [CH] Switzerland .............. 3410/94

[51] Int. Cl.$^6$ .............. C08K 5/3492; C07D 403/00; C07D 251/02; C07D 251/00; C07D 234/02; G03C 1/46
[52] U.S. Cl. ............. 524/100; 430/507; 430/512; 430/931; 544/212; 544/213; 544/214; 544/215; 544/243; 544/335
[58] Field of Search .............. 524/100; 430/614, 430/631, 507, 512, 931; 544/212, 213, 214, 215, 243, 296, 335

[56] References Cited

U.S. PATENT DOCUMENTS

| | | | |
|---|---|---|---|
| 3,113,941 | 12/1963 | Johns et al. | 260/248 |
| 3,113,942 | 12/1963 | Johns et al. | 260/248 |
| 3,118,887 | 1/1964 | Hardy et al. | 260/248 |
| 3,242,175 | 3/1966 | Duennenberger et al. | 260/248 |
| 3,244,708 | 4/1966 | Duennenberger et al. | 260/248 |
| 3,249,608 | 5/1966 | Bilard | 260/248 |
| 3,268,474 | 8/1966 | Hardy et al. | 760/45.8 |
| 3,423,360 | 1/1969 | Huber et al. | 260/47 |
| 3,442,898 | 5/1969 | Luethi et al. | 260/251 |
| 3,843,371 | 10/1974 | Rillar et al. | 252/300 |
| 3,936,418 | 2/1976 | Pond et al. | 524/91 |
| 4,247,628 | 1/1981 | Uchida et al. | 430/551 |
| 4,344,830 | 8/1982 | Olson | 524/91 |
| 4,619,956 | 10/1986 | Susi | 524/100 |
| 4,775,707 | 10/1988 | Slongo et al. | 548/261 |
| 4,826,978 | 5/1989 | Migdal et al. | 524/100 |
| 4,831,068 | 5/1989 | Reinert et al. | 524/100 |
| 4,895,981 | 1/1990 | Reinert et al. | 544/335 |
| 5,030,731 | 7/1990 | Slongo et al. | 548/261 |
| 5,288,778 | 2/1994 | Schmitter et al. | 524/100 |
| 5,298,067 | 3/1994 | Valet | 524/100 |
| 5,350,449 | 9/1994 | Valet et al. | 524/100 |
| 5,364,749 | 11/1994 | Leppard et al. | 430/512 |
| 5,369,140 | 11/1994 | Valet et al. | 522/75 |
| 5,462,846 | 10/1995 | Yoneyama | 430/512 |

FOREIGN PATENT DOCUMENTS

| | | |
|---|---|---|
| 0434608 | 6/1991 | European Pat. Off. . |
| 0444323 | 9/1991 | European Pat. Off. . |
| 0483488 | 5/1992 | European Pat. Off. . |
| 0604980 | 7/1994 | European Pat. Off. . |
| 480091 | 12/1969 | Switzerland . |
| 480090 | 12/1969 | Switzerland . |
| 484695 | 3/1970 | Switzerland . |
| 8603528 | 6/1986 | WIPO . |

OTHER PUBLICATIONS

Chem. Abst. 121590n af CH 484,695.
Chem. Abst. 79103d af CH 480, 091.
Chem. Abst. 90534r af CH 480, 090.
Chem. Abst. 103:124474X.
D. Olson Journal of Applied Polymer Science vol. 28 pp. 1159–1165 (1983).
D. Olson Journal of Applied Polymer Science vol. 22 pp. 2165–2172 (1978).

Primary Examiner—Veronica P. Hoke
Attorney, Agent, or Firm—Luther A. R. Hall

[57] ABSTRACT

The invention relates to compounds of the formula I

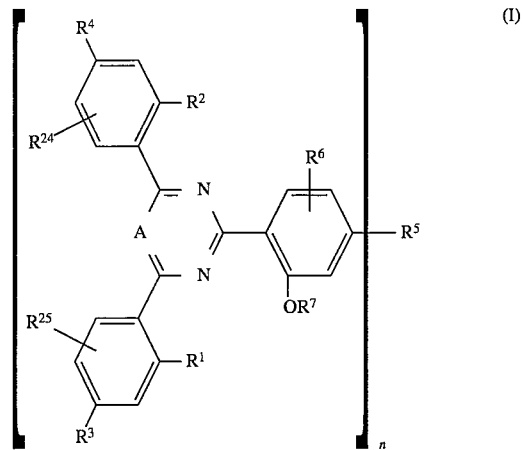

in which n is 1 or 2, A is CH or a nitrogen atom, and the other radicals $R^1$ to $R^{25}$ are as defined in claim 1.

The compounds of the formula I can advantageously be employed for stabilizing organic material against the harmful effect of light, oxygen and/or heat.

16 Claims, No Drawings

LATENT LIGHT STABILIZERS

The invention relates to compositions which have been stabilized against damage by light, heat and oxygen by a latent light stabilizer of the 2,4,6-trisaryl-1,3,5-triazine or 2,4,6-trisaryl-1,3-pyrimidine type, to the use of these latent light stabilizers for stabilizing organic material, and to novel compounds of said type.

Latent light stabilizers liberate the effective stabilizers by re-cleavage on heating or exposure to UV radiation. The use of compounds of this type, which can be converted into light stabilizers of the 2-(2-hydroxyphenyl)benzotriazole or 2-hydroxybenzophenone type by removal of the substituent on the phenolic oxygen atom, is described, for example, in the publications U.S. Pat. No. 4,775,707, U.S. Pat. No. 5,030,731, J. Appl. Pol. Science 22, 2165–2172 (1978) and J. Appl. Pol. Science 28, 1159–1165 (1983). Further benzotriazoles containing a blocked phenolic hydroxyl group are mentioned as stabilizers in, for example, U.S. Pat. No. 3,936,418, U.S. Pat. No. 4,247,628, Chem. Abstr. 103: 124474x and U.S. Pat. No. 4,344,830.

A more recent, structurally completely different class of light stabilizers comprises compounds of the 2,4,6-trisaryl-1,3,5-triazine and 2,4,6-trisaryl-1,3-pyrimidine type which contain free OH groups; the following may be selected from the large number of relevant publications: U.S. Pat. No. 3,118,887, U.S. Pat. No. 3,268,474, U.S. Pat. No. 3,242,175, U.S. Pat. No. 3,244,708, U.S. Pat. No. 3,249,608, CH-A-480,090, CH-A-480,091, CH-A-484,695, U.S. Pat. No. 3,423,360, U.S. Pat. No. 3,843,371, WO 86/3528, U.S. Pat. No. 4,619,956, U.S. Pat. No. 4,831,068, U.S. Pat. No. 4,826,978, EP-A-434 608, EP-A-444 323, EP-A-458 741, EP-A-483 488, U.S. Pat. No. 5,288,778, U.S. Pat. No. 5,298,067, U.S. Pat. No. 5,350,449, U.S. Pat. No. 3,442,898 and U.S. Pat. No. 4,895,981.

EP-A-604 980 proposes the use of phenolic UV absorbers, including those containing a blocked hydroxyl group, for the preparation of anchored light stabilizers.

U.S. Pat. No. 3,249,608 describes some trisaryltriazines whose hydroxyl groups have been acylated and which are formed as by-products in the preparation of light stabilizers.

U.S. Pat. No. 3,113,941 and U.S. Pat. No. 3,113,942 propose some esters and ethers of trishydroxyphenyltriazines as plastics additives.

It has now been found that, surprisingly, latent light stabilizers which have good substrate compatibility and colour properties and have a high re-cleavage rate and a long shelf life can be obtained from trisaryltriazine and trisarylpyrimidine compounds.

The invention therefore relates to a composition comprising

A) an organic material which is sensitive to damage by light, oxygen and/or heat and B) as stabilizer, a compound of the formula I

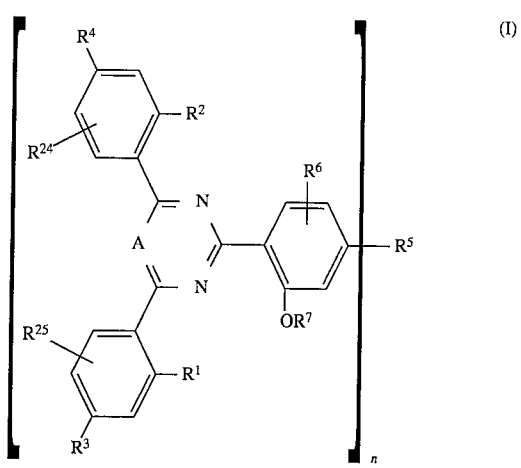

in which n is 1 or 2;

A is CH or a nitrogen atom;

$R^1$ and $R^2$, independently of one another, are H, $C_1$–$C_{12}$alkyl, $C_5$–$C_{12}$cycloalkyl, trifluoromethyl or $OR^7$;

$R^3$ and $R^4$, independently of one another, are H, $C_1$–$C_{12}$alkyl, $C_5$–$C_{12}$cycloalkyl, $OR^{17}$, phenyl, CN, halogen or $OR^7$;

$R^5$, in the case where n=1, is as a monovalent radical $C_6$–$C_{18}$alkyl, $C_1$–$C_{18}$alkoxy, halogen, —O—CO—$R^{12}$, —O—$SO_2$—$R^{13}$,

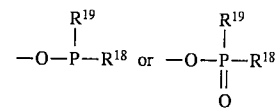

or $R^5$, in the case where n=1, is as defined for $R^{17}$ or is —O—$R^{17}$, and $R^5$ as a monovalent radical in the case where neither of the radicals $R^1$ and $R^2$ is $OR^7$ may alternatively be H or $C_1$–$C_5$alkyl; $R^5$, in the case where n=2, is as a divalent radical —O—G—O—, where G is $C_2$–$C_{16}$alkylene, $C_4$–$C_{12}$alkenylene, xylylene or $C_3$–$C_{20}$alkylene which is interrupted by —O— and/or is substituted by $OR^7$, or G is one of the groups —$CH_2CH(OR^7)CH_2$O—$R^{20}$—$OCH_2CH(OR^7)CH_2$—, —CO—$R^{21}$—CO—, —CO—NH—$R^{22}$—NH—CO— and —$(CH_2)_m$—COO—$R^{23}$—OOC—$(CH_2)_m$—, in which m is an integer in the range from 1 to 3, or is

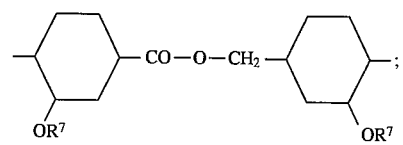

$R^6$ is H, $C_2$–$C_{18}$alkenyl, —X—$Z^3$, benzoyl which is unsubstituted or substituted on the phenyl ring by methyl, halogen, —CN or methoxy, halogen, —$SR^{14}$, —$SOR^{13}$, —$SO_2R^{13}$, —$C(Z)^3)$=N-$Z^3$, —$CH(Z^3)$—MJ—$Z^3$, a radical of the formula

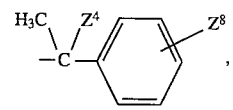

or a radical of the formula

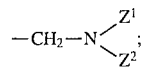

$R^7$ is $-CO-R^{11}$, $-SO_2-R^{13}$,

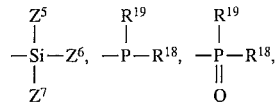

allyl or a group of the formula

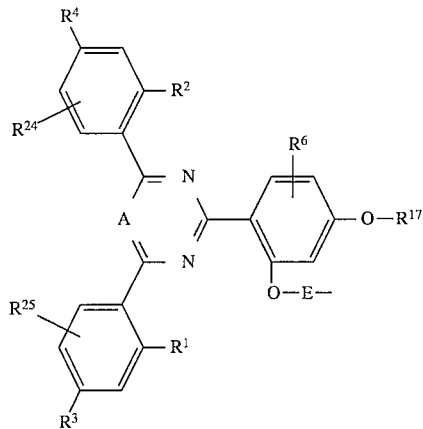

in which E is $C_3-C_{18}$alkylene or $C_4-C_{18}$alkenylene;

$R^8$ is $C_1-C_{18}$alkyl, $C_3-C_{18}$alkenyl, $C_3-C_{20}$alkyl which is interrupted by O, N or S and/or is substituted by $OR^7$, $C_1-C_4$alkyl which is substituted by $-P(O)(OR^{14})_2$, $-N(R^9)(R^{10})$, $-OCOR^{11}$ and/or $OR^7$, glycidyl, $C_5-C_{12}$cycloalkyl or $C_7-C_{11}$phenylalkyl, or a group of the formula

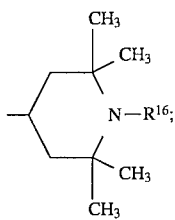

$R^9$ and $R^{10}$, independently of one another, are $C_1-C_{12}$alkyl, $C_3-C_{12}$alkoxyalkyl, $C_4-C_{16}$dialkylaminoalkyl or $C_5-C_{12}$cycloalkyl, or $R^9$ and $R^{10}$ together are $C_3-C_9$alkylene or -oxaalkylene or -azaalkylene;

$R^{11}$ is $C_1-C_{18}$alkyl, halogen-substituted $C_1-C_{18}$alkyl, $C_5-C_{12}$cycloalkyl, $C_2-C_{18}$alkenyl, $-CH_2-CO-CH_3$, $C_7-C_{12}$aralkyl, $C_1-C_{12}$alkoxy or phenyl which is unsubstituted or substituted by $C_1-C_{12}$alkyl, $C_1-C_4$alkoxy, halogen and/or benzyl;

$R^{12}$ is $C_1-C_{18}$alkyl, halogen-substituted $C_1-C_{18}$alkyl, $C_5-C_{12}$cycloalkyl, $C_2-C_{18}$alkenyl, phenyl or $-R^{15}-O-CO-R^{11}$, or is a group of the formula

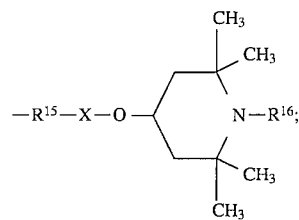

$R^{13}$ is $C_1-C_{12}$alkyl, $C_6-C_{10}$aryl, or $C_7-C_{18}$alkylaryl;

$R^{14}$ is $C_1-C_{12}$alkyl, phenyl or $C_7-C_{15}$phenylalkyl;

$R^{15}$ is $C_1-C_{18}$alkylene or $C_2-C_{18}$alkenylene;

$R^{16}$ is hydrogen, N-oxide, formyl, $C_2-C_8$alkanoyl, $C_1-C_{18}$alkyl, $C_1-C_{18}$alkoxy, $C_5-C_{12}$cycloalkyl, $C_5-C_{12}$cycloalkoxy, $C_7-C_{11}$phenylalkyl, $C_7-C_{11}$phenylalkyl which is substituted on the phenyl ring by 1 to 3 $C_1-C_4$alkyl or $C_1-C_8$alkanoyl radicals, or is $C_7-C_{11}$phenylalkoxy;

$R^{17}$ is $C_5-C_{18}$alkyloxycarbonyl, $C_2-C_{18}$alkenyl or $C_1-C_{18}$alkyl which is substituted by $OR^7$, $C_1-C_{18}$alkoxy, $C_5-C_{12}$cycloalkoxy, $C_2-C_{18}$alkanoyl, $C_2-C_8$alkenyloxy, halogen, $-COOR^8$, $-CONH_2$, $-CONHR^9$, $-CON(R^9)(R^{10})$, $-NHR^9$, $-N(R^9)(R^{10})$, $-NHCOR^{11}$, $-CN$, $-OCOR^{11}$, a group of the formula

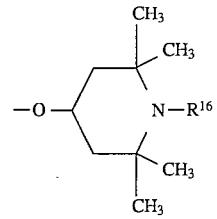

and/or phenoxy which is unsubstituted or substituted by $C_1-C_{18}$alkyl, $C_1-C_{18}$alkoxy or halogen, or $R^{17}$ is $C_3-C_{50}$alkyl which is interrupted by O or may be substituted by $OR^7$, or is glycidyl, $C_5-C_{12}$cycloalkyl, $C_5-C_{12}$cycloalkyl which is substituted by $OR^7$, $C_1-C_4$alkyl or $-OCOR^{11}$, or is $C_7-C_{11}$-phenylalkyl which is unsubstituted or substituted by $OR^7$, Cl or $CH_3$;

$R^{18}$ and $R^{19}$, independently of one another, are $C_1-C_{12}$alkoxy, phenoxy, $C_1-C_{12}$alkyl, $C_5-C_{12}$cycloalkyl, benzyl, tolyl or phenyl;

$R^{20}$ is $C_2-C_{10}$alkylene, $C_4-C_{50}$alkylene which is interrupted by $-O-$, phenylene or a -phenylene-D-phenylene- group in which D is $-O-$, $-S-$, $-SO_2-$, $-CH_2-$ or $-C(CH_3)_2-$;

$R^{21}$ is $C_2-C_{10}$alkylene, $C_2-C_{10}$alkylene which is interrupted by O or S, $C_6-C_{12}$arylene or $C_2-C_6$alkenylene;

$R^{22}$ is $C_2-C_{10}$alkylene, phenylene, tolylene, diphenylenemethane or

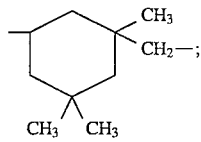

$R^{23}$ is $C_2-C_{10}$alkylene or $C_4-C_{20}$alkylene which is interrupted by $-O-$;

$R^{24}$ and $R^{25}$, independently of one another, are H, $C_1-C_{12}$alkyl, $C_2-C_6$alkenyl, $C_1-C_{12}$alkoxy, $C_3$–$C_{18}$alkenyloxy, halogen, trifluoromethyl, $C_7$–$C_{11}$phenylalkyl, phenyl, phenyl which is substituted by $C_1$–$C_{18}$alkyl, $C_1$–$C_{18}$alkoxy or halogen, phenoxy, or phenoxy which is substituted by $C_1$–$C_{18}$alkyl, $C_1$–$C_{18}$alkoxy or halogen;

X is a direct bond or —CO—;

$Z^1$ and $Z^2$, independently of one another, are $C_1$–$C_{12}$alkyl or together are $C_4$–$C_{10}$alkylene, which may be interrupted by an oxygen atom;

$Z^3$ is $C_1$–$C_{20}$alkyl or $C_7$–$C_{15}$phenylalkyl;

$Z^4$ and $Z^8$, independently of one another, are hydrogen or methyl; and $Z^5$, $Z^6$ and $Z^7$, independently of one another, are $C_1$–$C_{18}$alkyl, cyclohexyl, phenyl or $C_1$–$C_{18}$alkoxy.

A halogen substituent is —F, —Cl, —Br or —I, preferably —Cl or —F, in particular —Cl.

Aryl is generally an aromatic hydrocarbon radical, for example phenyl, biphenyl or naphthyl. Aralkyl is generally aryl-substituted alkyl; $C_7$–$C_{12}$Aralkyl is thus, for example, benzyl, phenylethyl, phenylpropyl, phenylbutyl, phenylpentyl or phenylhexyl, preferably benzyl or α-methylbenzyl. Alkylaryl is alkyl-substituted aryl; $C_7$–$C_{18}$alkylaryl is thus, inter alia, methylphenyl (tolyl), dimethylphenyl (xylyl), trimethylphenyl, tetramethylphenyl, pentamethylphenyl, ethylphenyl, propylphenyl (for example cumyl), butylphenyl (for example tert-butylphenyl), methylbutylphenyl, dibutylphenyl, pentylphenyl, hexylphenyl, dihexylphenyl, heptylphenyl, octylphenyl, nonylphenyl, decylphenyl, undecylphenyl, dodecylphenyl, methylnaphthyl, dimethylnaphthyl, ethylnaphthyl, propylnaphthyl, butylnaphthyl, pentylnaphthyl, hexylnaphthyl, heptylnaphthyl or octylnaphthyl, in particular tolyl, xylyl, propylphenyl or butylphenyl.

Cycloalkyl is generally a saturated carbocyclic radical of the empirical formula $C_iH_{2i}$, where i is an integer. $C_5$–$C_{12}$cycloalkyl is, for example, cyclopentyl, cyclohexyl, cycloheptyl, cyclooctyl or cyclododecyl, preferably cyclohexyl.

In the formula I, the line with the symbol $R^6$ projecting into the phenyl ring represents a substituent which is in one of the three free positions in the o-, m- or p-position to the phenolic OH group.

The substituent $R^6$ is preferably in the o- or p-position to the phenolic OH group, in particular in the p-position.

$R^6$ is, for example, hydrogen, $C_1$–$C_{12}$alkyl, $C_6$–$C_{18}$alkanoyl, benzoyl, methylbenzoyl, dimethylbenzoyl, benzoyl which is substituted by —Cl, —Br, —CN or —OCH$_3$, α-methylbenzyl, α,α-dimethylbenzyl, N,N-dialkylaminomethyl, 1-piperidylmethyl, 1-(4-oxapiperidyl)methyl, an imide of an acyl radical or α-(N-alkylamino)alkyl. $R^6$ is preferably hydrogen, $C_1$–$C_6$alkyl, benzoyl, α-methylbenzyl, allyl or a radical of the formula

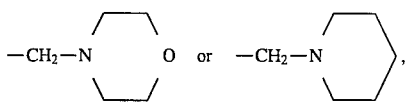

for example hydrogen, $C_1$–$C_6$alkyl or allyl, in particular hydrogen or methyl, especially hydrogen.

Alkyl radicals $R^1$, $R^2$, $R^3$, $R^4$, $R^5$, $R^6$, $R^8$, $R^9$, $R^{10}$, $R^{11}$, $R^{12}$, $R^{13}$, $R^{14}$, $R^{16}$, $R^{17}$, $R^{18}$, $R^{19}$, $Z^1$, $Z^2$, $Z^3$, $Z^5$, $Z^6$ and $Z^7$ are, within the stated definitions, branched or unbranched alkyl, such as methyl, ethyl, propyl, isopropyl, n-butyl, sec-butyl, isobutyl, t-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl or octadecyl. Alkyl $R^1$, $R^2$, $R^3$, $R^4$, $R^6$, $R^8$, $R^{11}$, $R^{12}$, $R^{14}$ and $R^{16}$ are preferably $C_1$–$C_8$alkyl, in particular $C_1$–$C_4$alkyl, such as methyl, n- or tert-butyl, especially methyl. $R^9$ and $R^{10}$ are preferably $C_1$–$C_8$alkyl, in particular butyl.

Alkanoyl $R^6$ is, for example, acetyl, propionyl, butyryl, valeryl, caproyl, capryl, caprinyl, lauryl, myristyl, palmityl or stearyl, preferably $C_6$–$C_{18}$alkanoyl.

$C_1$–$C_{18}$alkoxy $R^3$, $R^4$, $R^5$ and $R^6$ are, for example, methoxy, ethoxy, propoxy, isopropoxy, butoxy, isobutoxy, tert-butoxy, pentoxy, hexoxy, heptoxy, octyloxy, nonyloxy, decyloxy, undecyloxy, dodecyloxy, tridecyloxy, tetradecyloxy, pentadecyloxy, hexadecyloxy, heptadecyloxy or octadecyloxy, preferably $C_4$–$C_{12}$alkoxy, for example n-butoxy, n-pentoxy, n-hexoxy, n-heptoxy, n-octyloxy, 1-ethylhexyloxy, n-nonyloxy or n-decyloxy.

Particular preference is given to compounds of the formula I in which $R^5$ is $OR^{17}$.

$C_1$–$C_{18}$alkoxy $R^5$ is preferably alkoxyalkoxy, alkoxy which is substituted by

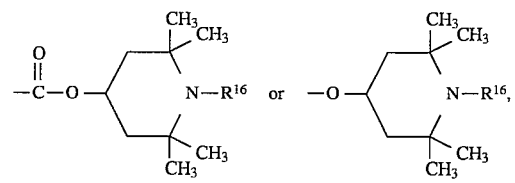

or alkoxy which is substituted by alkenyloyloxy and/or $OR^7$; $R^5$ is particularly preferably —OCH$_2$CH$_2$OCOCH=CH$_2$, —OCH$_2$CH(OR$^7$)C$_8$H$_{17}$, —OCH$_2$CH(OR$^7$)C$_{12}$H$_{25}$, —OCH$_2$CH(OR$^7$)CH$_2$OC$_8$H$_{17}$, —OCH$_2$CH(OR$^7$)CH$_2$O—(CH$_2$)$_{12-14}$—CH$_3$,
—OCH$_2$CH(OR$^7$)CH$_2$OCOC(CH$_3$)=CH$_2$,

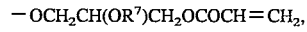

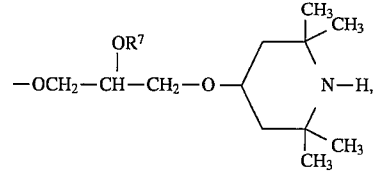

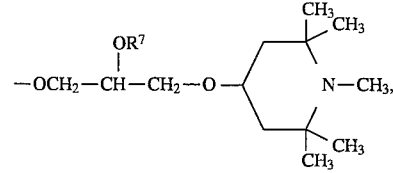

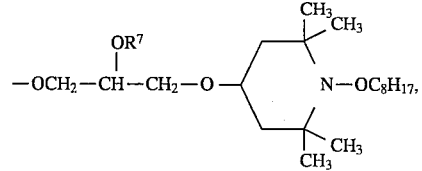

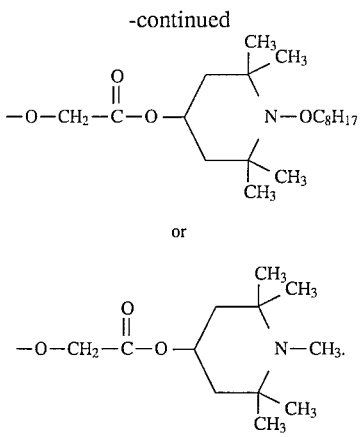

$R^1$, $R^2$, $R^3$ and $R^4$ are particularly preferably hydrogen or methyl. Particular preference is given to compounds in which the radicals $R^1$, $R^2$, $R^3$ and $R^4$ are identical.

$R^7$ as —CO—$R^{11}$ is acetyl, propionyl, butanoyl (butyryl), pentanoyl (valeryl), hexanoyl (caproyl), heptanoyl, octanoyl, nonanoyl, decanoyl, undecanoyl, dodecanoyl, acryloyl, methacryloyl, pentenoyl, 9-undecenoyl, benzoyl;

$R^7$ as —SO$_2$—$R^{13}$ is, for example, phenylsulfonyl, heptylsulfonyl, octylsulfonyl, nonylsulfonyl, decylsulfonyl, undecylsulfonyl, dodecylsulfonyl, tridecylsulfonyl, tetradecylsulfonyl, pentadecylsulfonyl, hexadecylsulfonyl, heptadecylsulfonyl or octadecylsulfonyl;

$R^7$ as a silyl radical is, for example, trimethylsilyl, trimethoxysilyl, triethylsilyl, triethoxysilyl, tripropylsilyl, tripropoxysilyl, tributylsilyl, tributoxysilyl, dimethylmethoxysilyl, diethylethoxysilyl, dimethylethoxysilyl, dimethoxymethylsilyl, diethoxyethylsilyl, diethoxymethylsilyl and similar (lower alkyl)- or (lower alkoxy)silyl radicals:

$R^7$ as a phosphorus-containing radical is, for example, dimethoxyphosphoryl, diethoxyphosphoryl, dipropoxyphosphoryl, dibutoxyphosphoryl, methoxymethylphosphoryl, ethoxymethylphosphoryl, propoxymethylphosphoryl, butoxymethylphosphoryl, dimethylphosphoryl, phenylmethylphosphoryl, phenylmethoxyphosphoryl, phenylethoxyphosphoryl, and corresponding radicals of trivalent phosphorus.

Attention should be drawn to compounds of the formula I in which $R^7$ is —CO—$R^{11}$,

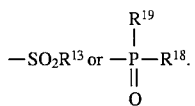

$C_3$–$C_{18}$Alkenyl $R^8$, $R^{11}$, $R^{12}$ and $R^{17}$ are, inter alia, allyl, isopropenyl, 2-butenyl 3-butenyl, isobutenyl, n-penta-2,4-dienyl, 3-methyl-but-2-enyl, n-oct-2-enyl, n-dodec-2-enyl, iso-dodecenyl, n-octadec-2-enyl or n-octadec-4-enyl. $R^{17}$, $R^{11}$ and $R^{12}$ can alternatively be vinyl. Alkenyl $R^{11}$ and $R^{12}$ are particularly preferably —CH=CH$_2$ or —C(CH$_3$)=CH$_2$.

Unsubstituted or substituted $C_5$–$C_8$cycloalkyl $R^{17}$ is, for example, cyclopentyl, cyclohexyl, cycloheptyl, cyclooctyl, methylcyclohexyl or acetoxycyclohexyl, preferably cyclohexyl.

$R^{16}$ is preferably hydrogen, n-oxide, $C_2$–$C_8$alkanoyl, $C_1$–$C_{12}$alkyl, $C_1$–$C_{18}$alkoxy, cyclohexyl, $C_5$–$C_8$cycloalkoxy, $C_7$–$C_{11}$phenylalkyl or $C_7$–$C_{11}$phenylalkoxy. $R^{16}$ is particularly preferably hydrogen, $C_1$–$C_8$alkyl, $C_1$–$C_{18}$alkoxy, $C_5$–$C_8$cycloalkoxy or $C_7$–$C_9$phenylalkyl, for example benzyl or α-methylbenzyl, in particular hydrogen, methyl, $C_6$–$C_{12}$alkoxy or cyclohexyloxy.

Cycloalkoxy $R^{16}$ is preferably cyclohexyloxy; substituted or unsubstituted $C_7$–$C_{11}$phenylalkyl $R^{16}$ is preferably benzyl, α-methylbenzyl or methylphenylmethyl.

If any alkyl radicals carry further substituents or if any individual radicals are alkylene, free valences and bonds to substituents can emanate from the same or different carbon atoms. Bonds from alkyl radicals having 2 or more carbon atoms preferably emanate from different carbon atoms, in particular if they are attached to heteroatoms.

Alkylene $R^{15}$ and $R^{20}$ to $R^{23}$ are, for example, within the stated definition, methylene, ethylene, propylene, butylene, pentylene, hexylene, heptylene, octylene, nonylene, decylene, undecylene, dodecylene, tridecylene, tetradecylene, pentadecylene, hexadecylene, heptadecylene or octadecylene; preferably, where possible, $C_2$–$C_{18}$alkylene or $C_4$–$C_{12}$alkenylene. Particular preference is given to terminal radicals, ie those in which the free valences are at the ends of the longest carbon chain.

$R^{24}$ and $R^{25}$ are, independently of one another, preferably H or $C_1$–$C_{12}$alkyl, for example H or CH$_3$, in particular hydrogen.

Of particular industrial interest are compounds of the formula I or Ia in which $R^{24}$ and $R^{25}$ are in the ortho-position to the triazine ring, in particular those in which $R^{24}$ is H, $R^{25}$ is methyl, $R^2$ is OR$^7$ and $R^1$ is $C_1$–$C_{12}$alkyl.

Where A is CH, the compounds of the formula I are derived from 1,3-pyrimidine, and where A is N, they are derived from 1,3,5-triazine. If A is CH, $R^1$ and $R^2$ are, independently of one another, preferably hydrogen or alkyl, in particular H or $C_1$–$C_4$alkyl, especially H or methyl. A is preferably a nitrogen atom.

Preference is given to compositions comprising compounds of the formula I in which n is 1.

Mention should be made of compositions in which, in the compound of the formula I, $R^1$ and $R^2$, independently of one another, are H, $C_1$–$C_{12}$alkyl, cyclohexyl, trifluoromethyl or OR$^7$;

$R^3$ and $R^4$, independently of one another, are H, $C_1$–$C_{12}$alkyl, cyclohexyl, $C_1$–$C_{18}$alkoxy or $C_3$–$C_{18}$alkoxy which is interrupted by O and/or substituted by OR$^7$, or are halogen or OR$^7$;

$R^5$, in the case where n=1, is as a monovalent radical as defined for $R^{17}$ or is $C_6$–$C_{18}$alkyl, $C_1$–$C_{18}$alkoxy, halogen, —O—CO—$R^{12}$, —O—SO$_2$—$R^{13}$ or —O—$R^{17}$; and in the case where $R^1$ and $R^2$ are not OR$^7$, $R^5$ may alternatively be H or $C_1$–$C_5$alkyl;

$R^5$, in the case where n=2, is as a divalent radical —O—G—O—, where G is $C_2$–$C_{16}$alkylene, $C_4$–$C_{12}$alkenylenes, xylylene, $C_3$–$C_{20}$alkylene which is interrupted by —O—, or G is one of the groups —CH$_2$CH(OR$^7$)CH$_2$O—R$^{20}$—OCH$_2$CH(OR$^7$)CH$_2$—, —CO—R$^{21}$—CO—, —CO—NH—R$^{22}$—NH—CO— or —(CH$_2$)$_m$—COO—R$^{23}$—OOC—(CH$_2$)$_m$—, in which m is an integer in the range from 1 to 3, or is

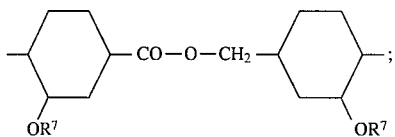

$R^6$ is in the o-position to $R^5$ and in the p-position to $OR^7$;

$R^9$ and $R^{20}$, independently of one another, are $C_1$–$C_{12}$alkyl, $C_3$–$C_{12}$alkoxyalkyl, $C_4$–$C_{16}$dialkylaminoalkyl or cyclohexyl, or $R^9$ and $R^{10}$ together are $C_3$–$C_9$alkylene, -oxaalkylene or -azaalkylene;

$R^{11}$ is $C_1$–$C_{18}$alkyl, trihalomethyl, $C_2$–$C_{18}$alkenyl, —$CH_2$—CO—$CH_3$, $C_7$–$C_{12}$aralkyl, $C_1$–$C_{12}$alkoxy or phenyl which is unsubstituted or substituted by $C_1$–$C_{12}$alkyl, $C_1$–$C_4$alkoxy, halogen and/or benzyl;

$R^{17}$ is $C_5$–$C_{18}$alkoxycarbonyl or $C_2$–$C_{18}$alkenyl or is $C_1$–$C_{18}$alkyl which is substituted by $OR^7$, $C_1$–$C_{18}$alkoxy, $C_2$–$C_8$alkanoyl, $C_2$–$C_8$alkenyloxy, halogen, —$COOR^8$, —$CONH_2$, —$CONHR^9$, —$CON(R^9)(R^{10})$, —$NHR^9$, —$N(R^9)(R^{10})$, —NH-$COR^{11}$, —CN, —$OCOR^{11}$, a group of the formula

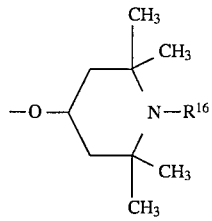

and/or phenoxy which is unsubstituted or substituted by $C_1$–$C_{18}$alkyl, $C_1$–$C_{18}$alkoxy, or halogen, or $R^{17}$ is $C_4$–$C_{20}$alkyl which is interrupted by O and may be substituted by $OR^7$, or is glycidyl, cyclohexyl, cyclohexyl which is substituted by $OR^7$, $C_1$–$C_4$alkyl or —$OCOR^{11}$, or $C_7$–$C_{11}$ phenylalkyl which is unsubstituted or substituted by Cl or $CH_3$; $R^{18}$ and $R^{19}$, independently of one another, are $C_1$–$C_6$alkoxy, $C_1$–$C_4$alkyl, cyclohexyl, tolyl or phenyl;

$R^{24}$ and $R^{25}$, independently of one another, are H or $C_1$–$C_{12}$alkyl; and $Z^5$, $Z^6$ and $Z^7$, independently of one another, are $C_1$–$C_4$alkyl or $C_1$–$C_4$alkoxy.

Of particular importance are compositions in which, in the compound of the formula I, $R^1$ and $R^2$, independently of one another, are H, $C_1$–$C_4$alkyl or $OR^7$;

$R^3$ and $R^4$, independently of one another, are H, $C_1$–$C_4$alkyl, $C_1$–$C_8$alkoxy, $C_3$–$C_{12}$alkoxy which is interrupted by O and/or substituted by $OR^7$, or are halogen or $OR^7$;

$R^5$, in the case where n=1, is as a monovalent radical as defined for $R^{17}$ or is halogen, $C_6$–$C_{18}$alkyl, $C_1$–$C_{18}$alkoxy, —O—CO—$R^{12}$, —O—$SO_2$—$R^{13}$ or —O—$R^{17}$; and in the case where $R^1$ and $R^2$ are not $OR^7$, $R^5$ is alternatively H or $C_1$–$C_5$alkyl;

$R^5$, in the case where n=2, is as a divalent radical —O—G—O—, where G is $C_2$–$C_{16}$alkylene, $C_4$–$C_{12}$alkenylene or xylylene, or G is one of the groups —$CH_2CH(OR^7)CH_2$O—$R^{20}$—$OCH_2CH(OR^7)CH_2$—, —CO—$R^{21}$—CO—, —CO—NH—$R^{22}$—NH—CO— or —$(CH_2)_m$—COO—$R^{23}$—OOC—$(CH_2)_m$—, in which m is an integer in the range from 1 to 3;

$R^6$ is H, allyl, $C_1$–$C_{10}$alkyl, acetyl or benzoyl;

$R^7$ is —CO—$R^{11}$, —$SO_2$—$R^{13}$,

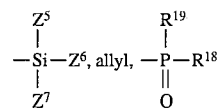

or a group of the formula

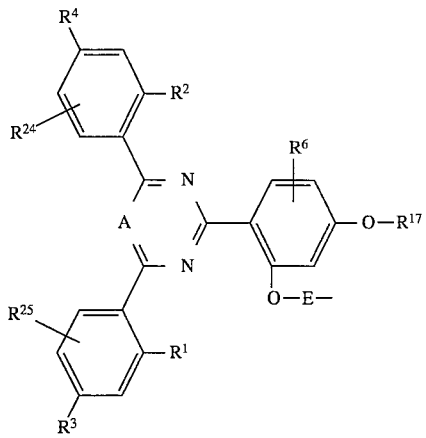

in which E is $C_3$–$C_{18}$alkylene or $C_4$–$C_{18}$alkenylene;

$R^8$ is $C_1$–$C_{18}$alkyl, $C_3$–$C_{18}$alkenyl, $C_3$–$C_{20}$alkyl which is interrupted by O, N or S and/or is substituted by $OR^7$, or is glycidyl or a group of the formula

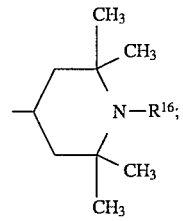

$R^9$ and $R^{10}$, independently of one another, are $C_1$–$C_{12}$alkyl or together are $C_4$–$C_9$alkylene, -oxaalkylene or -azaalkylene;

$R^{11}$ is $C_1$–$C_{12}$alkyl, trihalomethyl, $C_2$–$C_4$alkenyl, $C_1$–$C_{12}$alkoxy, phenyl, tolyl or xylyl;

$R^{12}$ is $C_1$–$C_{18}$alkyl, $C_2$–$C_{18}$alkenyl, phenyl, —$R^{15}$—O—CO—$C(CH_3)$=$CH_2$ or —$R^{15}$—O—CO—CH=$CH_2$, or a group of the formula

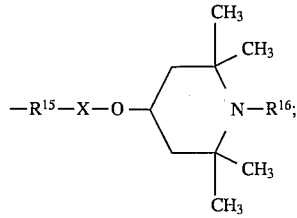

$R^{13}$ is phenyl or $C_7$–$C_{18}$alkylphenyl;

$R^{15}$ is $C_2$–$C_{12}$alkylene;

$R^{16}$ is hydrogen, N-oxide, $C_2$–$C_8$alkanoyl, $C_1$–$C_{12}$alkyl, $C_1$–$C_{18}$alkoxy, cyclohexyl, $C_5$–$C_{12}$cycloalkoxy, $C_7$–$C_{11}$phenylalkyl or $C_7$–$C_{11}$phenylalkoxy;

$R^{17}$ is $C_3$–$C_{18}$alkenyl, or $C_1$–$C_{12}$alkyl which is substituted by $OR^7$, $C_1$–$C_{18}$alkoxy, —$COOR^8$, —$CONHR^9$, —CON(R$^9$)(R$^{10}$), —OCOR$^{11}$ and/or a group of the formula

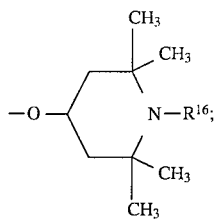

or R$^{17}$ is C$_4$–C$_{20}$alkyl which is interrupted by 1 to 6 O atoms and may be substituted by OR$^7$, or is glycidyl, C$_5$–C$_{12}$cycloalkyl or C$_7$–C$_{11}$phenylalkyl;

R$^{18}$ and R$^{19}$, independently of one another, are C$_1$–C$_4$alkoxy, methyl or phenyl;

R$^{20}$ is C$_2$–C$_{10}$alkylene, phenylene or a -phenylene-D-phenylene- group in which D is —O—, —SO$_2$— or —C(CH$_3$)$_2$—;

R$^{21}$ is C$_2$–C$_{10}$alkylene, phenylene or C$_2$–C$_6$alkenylene;

R$^{22}$ is C$_2$–C$_{10}$alkylene or

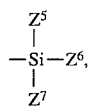

R$^{23}$ is C$_2$–C$_{10}$alkylene; and

R$^{24}$ and R$^{25}$, independently of one another, are H or methyl.

Of these, preference is given to compositions in which, in the compound of the formula I, A is a nitrogen atom;

R$^6$ is in the o-position to R$^5$ and in the p-position to OR$^7$;

R$^7$ is C$_2$–C$_8$alkanoyl, benzoyl, phenylsulfonyl, —CO—CF$_3$, allyl,

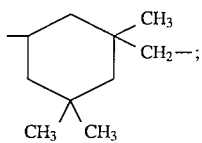

C$_7$–C$_9$alkylphenylsulfonyl or a group of the formula

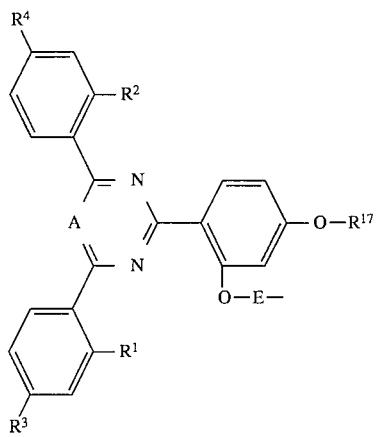

in which E is C$_3$–C$_6$alkylene or C$_4$–C$_6$alkenylene; and

Z$^5$, Z$^6$ and Z$^7$, independently of one another, are C$_1$–C$_4$alkyl; in particular those in which, in the compound of the formula I, R$^1$ and R$^2$, independently of one another, are H, C$_1$–C$_4$alkyl or OR$^7$;

R$^3$ and R$^4$, independently of one another, are H, C$_1$–C$_4$alkyl, C$_1$–C$_4$alkoxy, C$_3$–C$_{12}$alkoxy which is interrupted by O and substituted by OR$^7$, or are Cl or OR$^7$;

R$^5$, in the case where n=1, is —O—CO—R$^{12}$ or —O—R$^{17}$; and in the case where R$^1$ and R$^2$ are not OR$^7$, can alternatively be H;

R$^5$, in the case where n=2, is —O—G—O—, where G is C$_2$–C$_{16}$alkylene;

R$^6$ is H or C$_1$–C$_{10}$alkyl;

R$^8$ is C$_1$–C$_8$alkyl;

R$^{11}$ is C$_1$–C$_3$alkyl, trifluoromethyl, trichloromethyl, C$_1$–C$_4$alkoxy, C$_2$–C$_3$alkenyl, phenyl, tolyl or xylyl;

R$^{12}$ is C$_1$–C$_8$alkyl, or phenyl;

R$^{13}$ is phenyl or C$_7$–C$_9$alkylphenyl;

R$^{16}$ is hydrogen, N-oxide, C$_1$–C$_{12}$alkyl, C$_1$–C$_{18}$alkoxy, cyclohexyloxy or C$_7$–C$_{11}$phenylalkyl;

R$^{17}$ is C$_1$–C$_{18}$alkyl, allyl or C$_1$–C$_{12}$alkyl which is substituted by OR$^7$, C$_1$–C$_{18}$alkoxy, —COOR$^8$ and/or —OCOR$^{11}$.

Some of the compounds of the formula I described above as component (B) are novel. The invention therefore also relates to compounds of the formula Ia

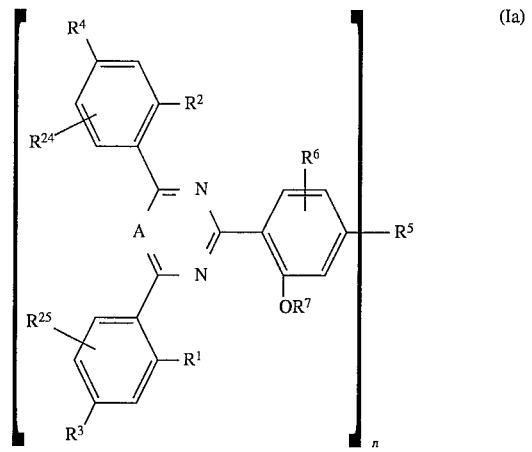

in which n is 1 or 2;

A is CH or a nitrogen atom;

R$^1$ and R$^2$, independently of one another, are H, C$_1$–C$_{12}$alkyl, C$_5$–C$_{12}$cycloalkyl, trifluoromethyl or OR$^7$;

R$^3$ and R$^4$, independently of one another, are H, C$_1$–C$_{12}$alkyl, C$_5$–C$_{12}$cycloalkyl, OR$^{17}$, halogen or OR$^7$;

R$^5$, in the case where n=1, is as a monovalent radical C$_6$–C$_{18}$alkyl, C$_1$–C$_{18}$alkoxy, halogen, —O—SO$_2$—R$^{13}$,

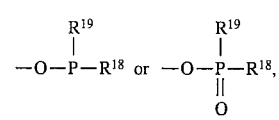

or R$^5$, in the case where n=1, is as defined for R$^{17}$ or is —O—R$^{17}$, and R$^5$ as a monovalent radical in the case where neither of the radicals $R^1$ and $R^2$ is $OR^7$ may alternatively be H or $C_1$–$C_5$alkyl;

$R^5$, in the case where n=2, is as a divalent radical —O—G—O—, where G is $C_2$–$C_{16}$alkylene, $C_4$–$C_{12}$alkenylene, xylylene or $C_3$–$C_{20}$alkylene which is interrupted by —O— and/or is substituted by $OR^7$, or G is one of the groups —CH$_2$CH(OR$^7$)CH$_2$O—R$^{20}$—OCH$_2$CH(OR$^7$)CH$_2$—, —CO—R$^{21}$—CO—, —CO—NH—R$^{22}$—NH—CO— and —(CH$_2$)$_m$—COO—R$^{23}$—OOC—(CH$_2$)$_m$—, in which m is an integer in the range from 1 to 3, or is

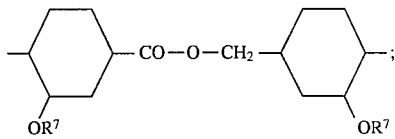

$R^6$ is H, $C_2$–$C_{18}$alkenyl, —X—Z$^3$, benzoyl which is unsubstituted or substituted on the phenyl ring by methyl, halogen, —CN or methoxy, halogen, —SR$^{14}$, SOR$^{13}$, —SO$_2$R$^{13}$, —C(Z$^3$)=N—Z$^3$, —CH(Z$^3$)—NH—Z$^3$, a radical of the formula

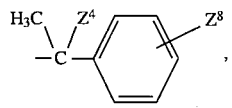

or a radical of the formula

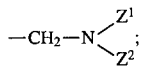

$R^7$ is —CO—R$^{11}$, —SO$_2$—R$^{13}$,

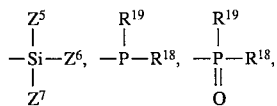

allyl or a group of the formula

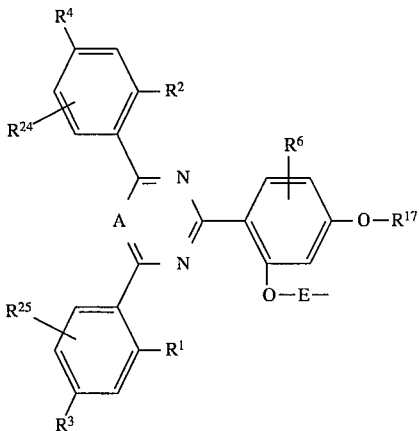

in which E is $C_3$–$C_{18}$alkylene or $C_4$–$C_{18}$alkenylene; $R^8$ is $C_1$–$C_{18}$alkyl, $C_3$–$C_{18}$alkenyl, $C_3$–$C_{20}$alkyl which is interrupted by O, N or S and/or is substituted by $OR^7$, $C_1$–$C_4$alkyl which is substituted by —P(O)(OR$^{14}$)$_2$, —N(R$^9$)(R$^{10}$), —OCOR$^{11}$ and/or OR$^7$, glycidyl, $C_5$–$C_{12}$cycloalkyl or $C_7$–$C_{11}$phenylalkyl, or a group of the formula

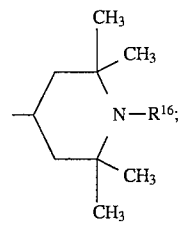

$R^9$ and $R^{10}$, independently of one another, are $C_1$–$C_{12}$alkyl, $C_3$–$C_{12}$alkoxyalkyl, $C_4$–$C_{16}$dialkylaminoalkyl or $C_5$–$C_{12}$cycloalkyl, or $R^9$ and $R^{10}$ together are $C_3$–$C_9$alkylene or -oxaalkylene or -azaalkylene;

$R^{11}$ is $C_1$–$C_{18}$alkyl, $C_5$–$C_{12}$cycloalkyl, halogen-substituted $C_1$–$C_{18}$alkyl, $C_2$–$C_{18}$alkenyl, —CH$_2$—CO—CH$_3$, $C_7$–$C_{12}$aralkyl, $C_1$–$C_{12}$alkoxy or phenyl which is unsubstituted or substituted by $C_1$–$C_{12}$alkyl, $C_1$–$C_4$alkoxy, halogen and/or benzyl;

$R^{13}$ is $C_1$–$C_{12}$alkyl, $C_6$–$C_{10}$aryl or $C_7$–$C_{18}$alkylaryl;

$R^{14}$ is $C_1$–$C_{12}$alkyl, phenyl or $C_7$–$C_{15}$phenylalkyl;

$R^{15}$ is $C_1$–$C_{18}$alkylene or $C_2$–$C_{18}$alkenylene;

$R^{16}$ is hydrogen, N-oxide, formyl, $C_2$–$C_8$alkanoyl, $C_1$–$C_{18}$alkyl, $C_1$–$C_{18}$alkoxy, $C_5$–$C_{12}$cycloalkyl, $C_5$–$C_{12}$cycloalkoxy, $C_7$–$C_{11}$phenylalkyl, $C_7$–$C_{11}$phenylalkyl which is substituted on the phenyl ring by 1 to 3 $C_1$–$C_4$alkyl or $C_1$–$C_8$alkanoyl radicals, or is $C_7$–$C_{11}$phenylalkoxy;

$R^{17}$ is $C_5$–$C_{18}$alkyloxycarbonyl, $C_2$–$C_{18}$alkenyl or $C_1$–$C_{18}$alkyl which is substituted by $OR^7$, $C_1$–$C_{18}$alkoxy, $C_5$–$C_{12}$cycloalkoxy, $C_2$–$C_{18}$alkanoyl, $C_2$–$C_8$alkenyloxy, halogen, —COOR$^8$, —CONH$_2$, —CONHR$^9$, —CON(R$^9$)(R$^{10}$), —NHR$^9$, —N(R$^9$)(R$^{10}$), —NHCOR$^{11}$, —CN, —OCOR$^{11}$, a group of the formula

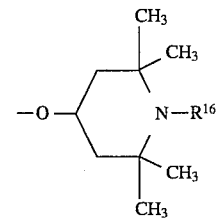

and/or phenoxy which is unsubstituted or substituted by $C_1$–$C_{18}$alkyl, $C_1$–$C_{18}$alkoxy or halogen, or $R^{17}$ is $C_3$–$C_{50}$alkyl which is interrupted by O and may be substituted by $OR^7$, or is glycidyl, $C_5$–$C_{12}$cycloalkyl, $C_5$–$C_{12}$cycloalkyl which is substituted by $OR^7$, $C_1$–$C_4$alkyl or —OCOR$^{11}$, or is $C_7$–$C_{11}$phenylalkyl which is unsubstituted or substituted by $OR^7$, Cl or CH$_3$;

$R^{18}$ and $R^{19}$, independently of one another, are $C_1$–$C_{12}$alkoxy, phenoxy, $C_1$–$C_{12}$alkyl, $C_5$–$C_{12}$cycloalkyl, benzyl, tolyl or phenyl;

$R^{20}$ is $C_2$–$C_{10}$alkylene, $C_4$–$C_{50}$alkylene which is interrupted by —O—, phenylene or a -phenylene-D-phenylene- group in which D is —O—, —S—, —SO$_2$—, —CH$_2$— or —C(CH$_3$)$_2$—;

$R^{21}$ is $C_2$–$C_{10}$alkylene, $C_2$–$C_{10}$alkylene which is interrupted by O or S, $C_6$–$C_{12}$arylene or $C_2$–$C_6$alkenylene;

$R^{22}$ is $C_2$–$C_{10}$alkylene, phenylene, tolylene, diphenylenemethane or

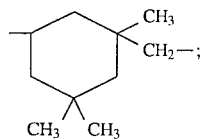

$R^{23}$ is $C_2$–$C_{10}$alkylene or $C_4$–$C_{20}$alkylene which is interrupted by —O—;

$R^{24}$ and $R^{25}$, independently of one another, are H, $C_1$–$C_{12}$alkyl, $C_2$–$C_6$alkenyl, $C_1$–$C_{12}$alkoxy, $C_3$–$C_{18}$alkenyloxy, halogen, trifluoromethyl, $C_7$–$C_{11}$phenylalkyl, phenyl, phenyl which is substituted by $C_1$–$C_{18}$alkyl, $C_1$–$C_{18}$alkoxy or halogen, phenoxy, or phenoxy which is substituted by $C_1$–$C_{18}$alkyl, $C_1$–$C_{18}$alkoxy or halogen;

X is a direct bond or —CO—;

$Z^1$ and $Z^2$, independently of one another, are $C_1$–$C_{12}$alkyl or together are $C_4$–$C_{10}$alkylene, which may be interrupted by an oxygen atom;

$Z^3$ is $C_1$–$C_{20}$alkyl or $C_7$–$C_{15}$phenylalkyl;

$Z^4$ and $Z^8$, independently of one another, are hydrogen or methyl; and $Z^5$, $Z^6$ and $Z^7$, independently of one another, are $C_1$–$C_{18}$alkyl, cyclohexyl, phenyl or $C_1$–$C_{18}$alkoxy.

Essentially the preferences described above for compounds of the formula I apply to compounds of the formula Ia. Of particular interest are furthermore compounds of the formula Ia in which $R^1$ and $R^2$, independently of one another, are H, $C_1$–$C_{12}$alkyl, cyclohexyl, trifluoromethyl or $OR^7$;

$R^3$ and $R^4$, independently of one another, are H, $C_1$–$C_{12}$alkyl, cyclohexyl, $C_1$–$C_{18}$alkoxy, $C_3$–$C_{18}$alkoxy which is interrupted by O and/or substituted by $OR^7$, or are halogen or $OR^7$;

$R^5$, in the case where n=1, is as a monovalent radical as defined for $R^{17}$ or is $C_6$–$C_{18}$alkoxy, $C_1$–$C_{18}$alkoxy, halogen, —O—$SO_2$—$R^{13}$ or —O—$R^{17}$; and in the case where $R^1$ and $R^2$ are not $OR^7$, $R^5$ may alternatively be H or $C_1$–$C_5$alkyl;

$R^5$, in the case where n=2, is as a divalent radical —O—G—O—, where G is $C_2$–$C_{16}$alkylene, $C_4$–$C_{12}$alkenylene, xylylene, $C_3$–$C_{20}$alkylene which is interrupted by —O—, or G is one of the groups —$CH_2CH(OR^7)CH_2O$—$R^{20}$—$OCH_2CH(OR^7)CH_2$—, —CO—$R^{21}$—CO—, —CO—NH—$R^{22}$—NH—CO— or —$(CH_2)_m$—COO—$R^{23}$—OOC—$(CH_2)_m$—, in which m is an integer in the range from 1 to 3, or is

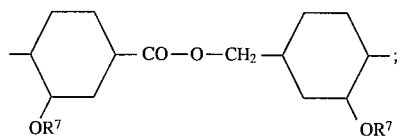

$R^6$ is in the o-position to $R^5$ and in the p-position to $OR^7$;

$R^9$ and $R^{10}$, independently of one another, are $C_1$–$C_{12}$alkyl, $C_3$–$C_{12}$alkoxyalkyl, $C_4$–$C_{16}$dialkylaminoalkyl or cyclohexyl, or $R^9$ and $R^{10}$ together are $C_3$–$C_9$alkylene, -oxaalkylene or -azaalkylene;

$R^{11}$ is $C_1$–$C_{18}$alkyl, trihalomethyl, $C_2$–$C_{18}$alkenyl, —$CH_2CO$—$CH_3$, $C_7$–$C_{12}$aralkyl, $C_1$–$C_{12}$alkoxy or phenyl which is unsubstituted or substituted by $C_1$–$C_{12}$alkyl, $C_1$–$C_4$alkoxy, halogen and/or benzyl;

$R^{17}$ is $C_5$–$C_{18}$alkoxycarbonyl or $C_2$–$C_{18}$alkenyl or is $C_1$–$C_{18}$alkyl which is substituted by $OR^7$, $C_1$–$C_{18}$alkoxy, $C_2$–$C_{18}$alkanoyl, $C_2$–$C_8$alkenyloxy, halogen, —$COOR^8$, —$CONH_2$, —$CONHR^9$, —$CON(R^9)(R^{10})$, —$NHR^9$, —$N(R^9)(R^{10})$, —NH-$COR^{11}$, —CN, —$OCOR^{11}$, a group of the formula

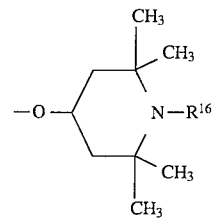

and/or phenoxy which is unsubstitued or substituted by $C_1$–$C_{18}$alkyl, $C_1$–$C_{18}$alkoxy, or halogen, or $R^{17}$ is $C_4$–$C_{20}$alkyl which is interrupted by O and may be substituted by $OR^7$, or is glycidyl, cyclohexyl, cyclohexyl which is substituted by $OR^7$, $C_1$–$C_4$alkyl or —$OCOR^{11}$, or $C_7$–$C_{11}$phenylalkyl which is unsubstituted or substituted by Cl or $CH_3$;

$R^{18}$ and $R^{19}$, independently of one another, are $C_1$–$C_6$alkoxy, $C_1$–$C_4$alkyl, cyclohexyl, tolyl or phenyl;

$R^{24}$ and $R^{25}$, independently of one another, are H or $C_1$–$C_{12}$alkyl; and $Z^5$, $Z^6$ and $Z^7$, independently of one another, are $C_1$–$C_4$alkyl or $C_1$–$C_4$alkoxy.

Of particular interest are compounds of the formula Ia in which $R^1$ and $R^2$, independently of one another, are H, $C_1$–$C_4$alkyl or $OR^7$;

$R^3$ and $R^4$, independently of one another, are H, $C_1$–$C_4$alkyl, $C_1$–$C_8$alkoxy, $C_3$–$C_{12}$alkoxy which is interrupted by O and/or substituted by $OR^7$, or are halogen or $OR^7$;

$R^5$, in the case where n=1, is as a monovalent radical as defined for $R^{17}$ or is halogen, $C_6$–$C_{18}$alkyl, $C_1$–$C_{18}$alkoxy, —O—$SO_2$—$R^{13}$ or —O—$R^{17}$; and in the case where $R^1$ and $R^2$ are not $OR^7$, $R^5$ is alternatively H or $C_1$–$C_5$alkyl;

$R^5$, in the case where n=2, is as a divalent radical —O—G—O—, where G is $C_2$–$C_{16}$alkylene, $C_4$–$C_{12}$alkenylene or xylylene, or G is one of the groups —$CH_2CH(OR^7)CH_2O$—$R^{20}$—$OCH_2CH(OR^7)CH_2$—, —CO—$R^{21}$—CO—, —CO—NH—$R^{22}$—NH—CO— or —$(CH_2)_m$—COO—$R^{23}$—OOC—$(CH_2)_m$—, in which m is an integer in the range from 1 to 3;

$R^6$ is H, allyl, $C_1$–$C_{10}$alkyl, acetyl or benzoyl;

$R^7$ is —CO—$R^{11}$, —$SO_2$—$R^{13}$,

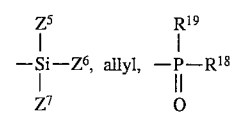

or a group of the formula

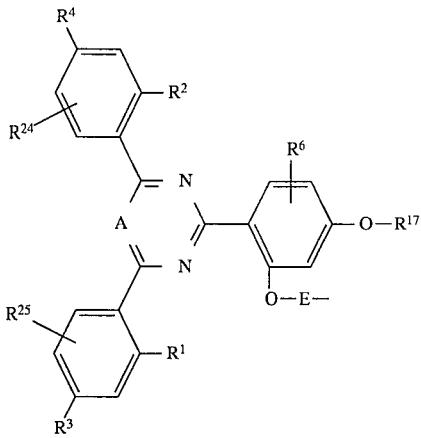

in which E is $C_3$–$C_{18}$alkylene or $C_4$–$C_{18}$alkenylene;
$R^8$ is $C_1$–$C_{18}$alkyl, $C_3$–$C_{18}$alkenyl, $C_3$–$C_{20}$alkyl which is interrupted by O, N or S and/or is substituted by $OR^7$, or is glycidyl or a group of the formula

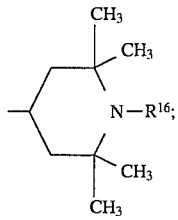

$R^9$ and $R^{10}$, independently of one another, are $C_1$–$C_{12}$alkyl or together are $C_4$–$C_9$alkylene, -oxaalkylene or-azaalkylene;
$R^{11}$ is $C_1$–$C_{12}$alkyl, trihalomethyl, $C_2$–$C_4$alkenyl, $C_1$–$C_{12}$alkoxy, phenyl, tolyl or xylyl;
$R^{13}$ is phenyl or $C_7$–$C_{18}$alkylphenyl;
$R^{15}$ is $C_2$–$C_{12}$alkylene;
$R^{16}$ is hydrogen, N-oxide, $C_2$–$C_8$alkanoyl, $C_1$–$C_{12}$alkyl, $C_1$–$C_{18}$alkoxy, cyclohexyl, $C_5$–$C_{12}$cycloalkoxy, $C_7$–$C_{11}$phenylalkyl or $C_7$–$C_{11}$phenylalkoxy;
$R^{17}$ is $C_3$–$C_{18}$alkenyl, or $C_1$–$C_{12}$alkyl which is substituted by $OR^7$, $C_1$–$C_{18}$alkoxy, —$COOR^8$, —$CONHR^9$, —$CON(R^9)(R^{10})$, —$OCOR^{11}$ or a group of the formula

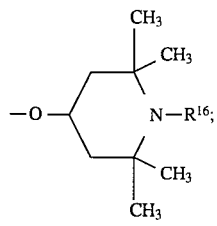

or $R^{17}$ is $C_4$–$C_{20}$alkyl which is interrupted by 1 to 6 O atoms and may be substituted by $OR^7$, or is glycidyl, $C_5$–$C_{12}$cycloalkyl or $C_7$–$C_{11}$phenylalkyl;
$R^{18}$ and $R^{19}$, independently of one another, are $C_1$–$C_4$alkoxy, methyl or phenyl;
$R^{20}$ is $C_2$–$C_{10}$alkylene, phenylene or a -phenylene-D-phenylene- group in which D is —O—, —$SO_2$— or —$C(CH_3)_2$—;
$R^{21}$ is $C_2$–$C_{10}$alkylene, phenylene or $C_2$–$C_6$alkenylene;

$R^{22}$ is $C_2$–$C_{10}$alkylene or

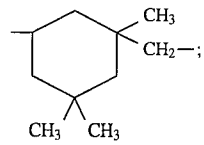

$R^{23}$ is $C_2$–$C_{10}$alkylene; and
$R^{24}$ and $R^{25}$, independently of one another, are H or methyl.
Of these, particular attention should be drawn to compounds in which
A is a nitrogen atom;
$R^6$ is in the o-position to $R^5$ and in the p-position to $OR^7$;
$R^7$ is $C_2$–$C_8$alkanoyl, benzoyl, phenylsulfonyl, allyl,

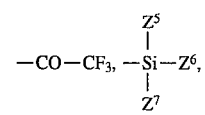

$C_7$–$C_9$alkylphenylsulfonyl or a group of the formula

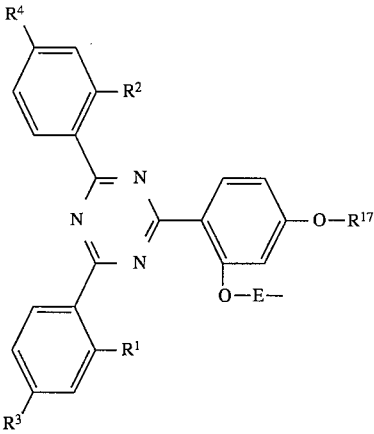

in which E is $C_3$–$C_6$alkylene or $C_4$–$C_6$alkenylene; and $Z^5$, $Z^6$ and $Z^7$, independently of one another, are $C_1$–$C_4$alkyl;
in particular the compounds of the formula Ia in which $R^1$ and $R^2$, independently of one another, are H, $C_1$–$C_4$alkyl or $OR^7$;
$R^3$ and $R^4$, independently of one another, are H, $C_1$–$C_4$alkyl, $C_1$–$C_4$alkoxy, $C_3$–$C_{12}$alkoxy which is interrupted by O and substituted by $OR^7$, or are Cl or $OR^7$;
$R^5$, in the case where n=1, is —O—$R^{17}$; and in the case where $R^1$ and $R^2$ are not $OR^7$, can alternatively be H;
$R^5$, in the case where n=2, is —O—G—O—, where G is $C_2$–$C_{16}$alkylene;
$R^6$ is H or $C_1$–$C_{10}$alkyl;
$R^8$ is $C_1$–$C_8$alkyl;
$R^{11}$ is $C_1$–$C_3$alkyl, trifluoromethyl, trichloromethyl, $C_1$–$C_4$alkoxy, $C_2$–$C_3$alkenyl, phenyl, tolyl or xylyl;
$R^{13}$ is phenyl or $C_7$–$C_9$alkylphenyl;
$R^{16}$ is hydrogen, N-oxide, $C_1$–$C_{12}$alkyl, $C_1$–$C_{18}$alkoxy, cyclohexyloxy or $C_7$–$C_{11}$phenylalkyl;
$R^{17}$ is $C_1$–$C_{18}$alkyl, allyl or $C_1$–$C_{12}$alkyl which is substituted by $OR^7$, $C_1$–$C_{18}$alkoxy, —$COOR^8$ and/or —$OCOR^{11}$; and $R^{24}$ and $R^{25}$, independently of one another, are H or methyl.

Compounds of the formulae I and Ia can be prepared starting from 2,4,6-trisaryl-1,3,5-triazines or 2,4,6-trisaryl-1,3-pyrimidines containing free OH groups. These starting compounds can be obtained by or analogously to one of the methods indicated in EP-A-434 608, U.S. Pat. No. 3,442,898, U.S. Pat. No. 4,895,981 or in the publication by H. Brunetti and C. E. Lüthi, Helv. Chim. Acta 55, 1566 (1972) by Friedel-Crafts adduction of halotriazines or halopyrimidines onto corresponding phenols. This can be followed by a further reaction by known methods to give compounds of the formula I or Ia in which $R^5$ is not hydrogen or $OR^7$; such reactions and processes are described, for example, in EP-A-434 608, page 15, line 11, to page 17, line 1; cf. also U.S. Pat. No. 3,442,898. Reactions with compound mixtures, for example technical-grade isomer mixtures, are also possible, resulting in corresponding product mixtures; such reactions can be carried out by or analogously to processes described, for example, in EP-A-444 323.

These starting compounds, which still contain free OH groups, can subsequently be subjected to a further reaction to form the novel latent light stabilizers. This reaction can be carried out, for example, by known methods analogously to the processes described in U.S. Pat. No. 4,775,707, U.S. Pat. No. 5,030,731, J. Appl. Pol. Science 22, 2165–2172 (1978) and J. Appl. Pol. Science 28, 1159–1165 (1983). Acylation to give compounds in which $R^7$ is —CO—$R^{11}$ can also be carried out in accordance with the process described in U.S. Pat. No. 3,249,608, but in this case the acylating reagent is expediently employed in excess.

Thus, the reaction to give compounds of the formula I or Ia in which $R^7$ is —CO—$R^{11}$,

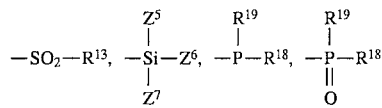

or allyl can be carried out, for example, by reaction with the corresponding chlorides Cl—CO—$R^{11}$, Cl—$SO_2$—$R^{13}$,

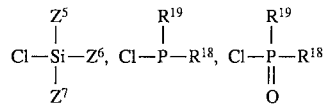

or allyl chloride. Acylated compounds can furthermore be obtained by reaction with anhydrides, ketenes or esters, for example lower alkyl esters.

Said reagents can be employed in approximately equimolar amounts with respect to the hydroxyl groups present in the starting compound. However, they are advantageously used in excess, for example from 2 to 20 mol per mol of OH to be reacted.

Use is frequently made of the catalysts customary for the particular acylation, sulfonylation, phosphonylation or silylation reaction. For example, acylation and sulfonylation reactions are frequently carried out in the presence of tertiary or quaternary amines, for example triethylamine, dimethylaminopyridine or tetrabutylammonium salts; details can be obtained, for example, from the abovementioned U.S. Pat. No. 4,775,707.

The reaction can be carried out with or without solvent. If desired, said reagents can themselves be employed as solvent; this is expedient, for example, when anhydrides which are liquid in the range from approx. 20°–100° C. are used, for example on reaction with acetic anhydride or benzoic anhydride. Use is frequently also made of inert organic solvents, for example hydrocarbons, such as toluene, xylene, petroleum ether or ligroin, or chlorinated hydrocarbons, such as $CCl_4$, $CHCl_3$ or monochlorobenzene, or ethers, such as tetrahydrofuran or dibutyl ether, or other inert solvents, for example acetonitrile.

The temperature is generally not crucial; the reaction is usually carried out at temperatures between 20° C. and the boiling point of the solvent, for example between 50° C. and 150° C. The work-up can be effected by conventional methods, for example by precipitation of the product in water, filtration and drying; if necessary, further purification steps, for example recrystallization, can be carried out.

The compounds of the formulae I and Ia can advantageously be employed as stabilizers for organic materials against damage by light, oxygen or heat. These compounds are very particularly suitable as light stabilizers (UV absorbers). Organic materials to be stabilized can be, for example, oils, fats, waxes, cosmetics, biocides or photographic materials. Of particular interest is their use in polymeric materials, as are present in plastics, rubbers, paints or adhesives. Examples of polymers and other substrates which can be stabilized in this manner are the following:

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), branched low density polyethylene (BLDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the tree form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5-C_9$) including hydrogenated modifications thereof (e.g. tackifiers) and mixtures of polyalkylenes and starch.

5. Polystyrene, poly(p-methylstyrene), poly($\alpha$-methylstyrene).

6. Copolymers of styrene or $\alpha$-methylstyrene with dienes or acrylic derivatives, for example styrene/butadiene, styrene/acrylonitrile, styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

7. Graft copolymers of styrene or $\alpha$-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from $\alpha,\beta$-unsaturated acids and derivatives thereof such as polyacrylates and polymethacrylates; polymethyl methacrylates, polyacrylamides and polyacrylonitriles, impact-modifed with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate and polyhydroxybenzoates, as well as block copolyether esters derived from hydroxyl-terminated polyethers; and also polyesters modified with polycarbonates or MBS.

19. Polycarbonates and polyester carbonates.

20. Polysulfones, polyether sulfones and polyether ketones.

21. Crosslinked polymers derived from aldehydes on the one hand and phenols, ureas and melamines on the other hand, such as phenol/formaldehyde resins, urea/formaldehyde resins and melamine/formaldehyde resins.

22. Drying and non-drying alkyd resins.

23. Unsaturated polyester resins derived from copolyesters of saturated and unsaturated dicarboxylic acids with polyhydric alcohols and vinyl compounds as crosslinking agents, and also halogen-containing modifications thereof of low flammability.

24. Crosslinkable acrylic resins derived from substituted acrylates, for example epoxy acrylates, urethane acrylates or polyester acrylates.

25. Alkyd resins, polyester resins and acrylate resins crosslinked with melamine resins, urea resins, isocyanates, isocyanurates, polyisocyanates or epoxy resins.

26. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

27. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.

28. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PP()/HIPS, PPO/PA 6.6 and copolymers, PA/HDPE, PA/PP, PA/PPO, PBT/PC/ABS or PBT/PET/PC.

The invention also relates to a process for stabilizing organic material against damage by light, oxygen and/or heat, which comprises adding a compound of the formula I thereto as stabilizer, and to the use of compounds of the formula I for stabilizing organic material.

The amount of stabilizer to be used depends on the organic material to be stabilized and on the intended use of the stabilized material. In general, the novel composition comprises, per 100 parts by weight of component A, from 0.01 to 15 parts by weight, in particular from 0.05 to 10 parts by weight, especially from 0.1 to 5 parts by weight, of a compound of the formula I (component B).

The stabilizer (component B) can also be a mixture of two or more compounds of the formula I or Ia. The novel compositions can, in addition to the stabilizer of the formula I, also comprise other stabilizers or other additives, for example antioxidants, further light stabilizers, metal deactivators, phosphites or phosphonites. Examples thereof are the following stabilizers:

1. Antioxidants 1.1. Alkylated monophenols, for example 2,6-di-tert-butyl-4-methylphenol,2-tert-butyl-4,6-dimethylphenol,2,6-di-tert-butyl-4-ethylphenol,2,6-di-tert-butyl-4-n-butylphenol, 2,6-di-tert-butyl-4-isobutylphenol,2,6-dicyclopentyl-4-methylphenol,2-(α-methylcyclohexyl)-4,6-dimethylphenol,2, 6-dioctadecyl-4-methylphenol,2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methyl-undec-1'-yl)phenol,2,4-dimethyl-6-(1'-methylheptadec-1'-yl)phenol,2,4-dimethyl-6-(1'-methyltridec-1'-yl)phenol and mixtures thereof.

1.2 Alkylthiomethylphenols, for example 2,4-dioctylthiomethyl-6-tert-butylphenol, 2,4-dioctylthiomethyl-6-methylphenol,2,4-dioctylthiomethyl-6-ethylphenol,2,6-di-dodecylthiomethyl- 4-nonylphenol.

1.3. Hydroquinones and alkylated hydroquinones, for example 2,6-di-tert-butyl-4-methoxyphenol, 2,5-di-tert-butylhydroquinone,2,5-di-tert-amylhydroquinone,2,6-di-phenyl-4-octadecyloxyphenol,2,6-di-tert-butylhydroquinone,2, 5-di-tert-butyl-4-hydroxyanisole, 3,5-di-tert-butyl-4-hydroxyanisole,3,5-di-tert-butyl-4-hydroxyphenyl stearate, bis-(3,5-di-tert-butyl-4-hydroxyphenyl)adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol),4,4'-thiobis(6-tert-butyl-3-methylphenol),4,4'-thiobis(6-tert-butyl-2-methylphenol),4,4'-thiobis-(3,6-di-sec-amylphenol),4,4'-bis-(2,6-dimethyl-4-hydroxyphenyl)disulfide.

1.6. Alkylidenebisphenols, for example 2,2'-methylenebis(6-tert-butyl-4-methylphenol), 2,2'-methylenebis(6-tert-butyl-4-ethylphenol),2,2'-methylenebis[4-methyl-6-(α-methylcyclohexyl)phenol], 2,2'-methylenebis(4-methyl-6-cyclohexylphenol),2,2'-methylenebis(6-nonyl-4-methylphenol),2,2'-methylenebis(4,6-di-tert-butylphenol),2, 2'-ethylidenebis(4,6-di-tert-butylphenol),2,2'-ethylidenebis(6-tert-butyl-4-isobutylphenol),2,2'-methylenebis[6-(α-methylbenzyl)-4-nonylphenol],2,2'-methylenebis[6-(α,α-dimethylbenzyl)-4-nonylphenol],4,4'-methylenebis(2,6-di-tert-butylphenol),4,4'-methylenebis(6-tert-butyl-2-methylphenol),1,1-bis(5-tert-butyl-4-hydroxy-2-methylphenyl)butane,2,6-bis(3-tert-butyl-5-methyl-2-hydroxybenzyl)-4-methylphenol, 1,1,3-tris(5-tert-butyl-4-hydroxy-2-methylphenyl)butane,1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate],bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate,1,1-bis-(3,5-dimethyl-2-hydroxyphenyl)butane, 2,2-bis-(3,5-di-tert-butyl-4-hydroxyphenyl)propane,2,2-bis-(5-tert-butyl-4-butyl-4-hydroxy2-methylphenyl)-4-n-dodecylmercaptobutane, 1,1, 5,5-tetra-(5-tert-butyl-4-hydroxy2-methylphenyl)pentane.

1.7. O-, N- and S- benzyl compounds, for example 3,5,3',5'-tertra-tert-butyl-4,4'-dihydroxydibenzyl ether, octadecyl-4-hydroxy-3,5-dimethylbenzylmercaptoacetate,tridecyl-4-hydroxy-3,5-di-tert-butylbenzyhncrcaptoacetatc, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl- 4-hydroxybenzyl)sulfide,isooctyl-3, 5di-tert-butyl-4-hydroxybenzyhnercaptoacetate.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2, 3,5,6-tetramethylbenzene, 2,4,6-tris(3,5-di-tert-butyl-4-hydroxybenzyl)phenol.

1.10. Triazine Compounds, for example 2,4-bis(octylmercapto)-6-(3,5-di-tert-butyl-4-hydroxyanilino)-1,3,5-triazine,2-octylmercapto-4,6-bis(3,5-di-tert-butyl-4-hydroxyanilino)-1,3,5-triazine,2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate,1,3,5-tris(4-tert-butyl-3-hydroxy-2,6-dimethylbenzyl)isocyanurate, 2,4, 6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tertbutyl-4-hydroxybenzylphosphonate, dioctadecyl3,5-di-tert-butyl-4-hydroxybenzylphosphonate,dioctadecyl-5-tert-butyl-4-hydroxy3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide,4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapenmdecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)priopionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenol)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl)propionic acid e.g. N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine, N,N'-bis(3,5-di-tert-butyl-4-hydroxyphenylpropionyl)hydrazine.

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylamino-phenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, Bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazin, N,N,N',N'-tetraphenyl-1,4-diaminobut-2-ene, N,N-bis(2,2,6,6-tetramethyl-piperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV absorbers and light stabilisers 2.1.2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3', 5'-di-tert-amyl-2'-hydroxyphenyl)benzotriazole, 2-(3',5'-bis-(α,α-dimethylbenzyl)-2'-hydroxyphenyl)benzotriazole, mixture of 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2octyl-oxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, and 2-(3'-tert-butyl-2'-hydroxy-5'-(2-isooctyloxycarbonylethyl)phenylbenzotriazole, 2,2'-methylenc-bis[4-(1,1,3,3-tetramethylbutyl)-6-benzotriazole-2-ylphenol]; the transesterilication product of 2-[3'-tert-butyl-5'-(2-methoxycarbonylethyl)-2'-hydroxyphenyl]-2H-benzotriazole with polyethylene glycol 300; [R—CH$_2$CH$_2$—COO(CH$_2$)$_3$]$_2$, where R=3'-tert-butyl-4'-hydroxy-5'-2H-benzotriazol-2-ylphenyl.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tertbutylphenyl salicylate, phenyl salicylate, octylphenyl salicylate, dibenzoyl resorcinol, bis(4-tert-butylbenzoyl) resorcinol, benzoyl resorcinol, 2,4-di-tertbutylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis( 1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, the condensate of N,N'-bis(2,2,6,6-tetramethyl-4-piperidyl)hexamethylenediamine and 4-tert-octyl-amino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butane-tetracarboxylate, 1,1'-(1,2-ethanediyl)bis(3,3,5,5-tetramethylpiperazinone ), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl- 2-(2-hydroxy-3,5-di-tert-butylbenzyl)malonate, 3-n-octyl-7,7,9,9-tetramethyl-1,3,8-triazaspiro[4.5]decan-2,4-dion, bis(1-octyloxy-2,2,6,6-tetramethylpiperidyl)sebacate, bis(1-octyloxy-2,2,6,6-tetramethylpiperidyl)succinate, the condensate of N,N'-bis-(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylaminoethane, 8-acetyl-3-dodecyl-7,7,9,9-tetrarmethyl-1,3,8-triazaspiro[4.5]decane-2,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl)pyrrolidine-2,5-dione, a mixture of 4-hexadecyloxy and 4-stearyloxy-2,2,6,6-tetramethylpiperidine, a condensation product of N,N'-bis-(2,2,6,6-tetramethyl-4-piperidyl-)hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro[4,5]decane, a reaction product of 7,7,9,9-tetramethyl-2-cyclo-undecyl-1-oxa-3,8-diaza-4-oxospiro[4,5]decane und epichlorohydrin.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5- tert-butyl-2'-ethoxanilide and its mixture with 2-ethoxy-2'-ethyl-5,4'-di-tert-butoxanilide and mixtures of ortho- and para-methoxy-disubstituted oxanilides and mixtures of o- and p-ethoxy-disubstituted oxanilides.

2.8.2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy)phenyl]-4,6-bis(2,4-dimethyl)-1,3,5-triazine, 2-[2-hydroxy-4-(2-hydroxy-3-octyloxy-oxy-propyloxy)phenyl]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl-4,6-bis(2,4-dimethylphenyl)- 1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl) hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, 6-fluoro-2,4,8,10-tetra-tert-butyl-12-methyl-dibenz[d,g]-1,3,2-dioxaphosphocin, bis(2,4-di-tert-butyl-6-methylphenyl)methylphosphite-)bis(2,4-di-tert-butyl-6-methylphenyl)ethylphosphite.

5. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenareal tallow amine.

6. Nitrones, for example, N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridecyl-nitrone, N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecyl-nitrone, N-hepta-decyl-alpha-heptadecyl-nitrone, N-octadecyl-alpha-hexadecyl-nitrone, nitrone derived from N,N-dialkylhydroxylamine derived from hydrogenated tallow amine.

7. Thiosynergists, for example, dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecyhnercapto)propionate.

9. Polyamide stabilisers, for example, copper salts in combination with iodides and/or phosphorus compounds and salts of divalent manganese.

10. Basic co-stabilisers, for example, reelamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmitate, antimony pyrocatecholate or tin pyrocatecholate.

11. Nucleating agents, for example, inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers ("ionomers").

12. Fillers and reinforcing agents, for example, calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

13. Other additives, for example, plasticisers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. No. 4,325,863, U.S. Pat. No. 4,338, 244, U.S. Pat. No. 5,175,312, U.S. Pat. No. 5,216,052, U.S. Pat. No5,252,643, DE-A-4 316 611, DE-A-4 316 622, DE-A-4 316 876, EP-A-0 589 839 or EP-A-0 591 102 or 3-[4-(2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]-phenyl)benzofuran-2-one], 5,7-di-ten-butyl-3-(4-ethoxyphenyl)benzofuran-2-one, 3-(4-acetoxy-3,5-dimethylphenyl)-5,7-di-tert-butyl-benzofuran-2-one, 3-(3, 5-dimethyl-4-pivaloyloxyphenyl)-5,7-di-tert-butyl-benzofuran-2-one.

The type and amount of the further stabilizers added is determined by the type of substrate to be stabilized and on its intended use; frequently, from 0.1 to 5% by weight, based on the polymer to be stabilized, are used.

In addition to components A and B, the novel composition preferably comprises, as component C, a light stabilizer of the sterically hindered amine, 2-(2-hydroxyphenyl)-1,3,5-triazine and/or 2-hydroxyphenyl-2H-benzotriazole type. Examples of such costabilizers are given in the above list under points 2.1, 2.6 and 2.8.

In order to achieve maximum light stability, it is of particular interest to add sterically hindered amines, as listed in said list under point 2.6. A composition which, in addition to components A and B, comprises, as component C, a light stabilizer of the sterically hindered amines (HALS) type is therefore of particular interest.

This is preferably a 2,2,6,6-tetraalkylpiperidine derivative containing at least one group of the formula

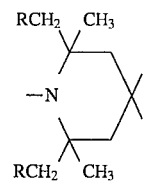

in which R is hydrogen or methyl, in particular hydrogen.

The novel compounds of the formula I are particularly advantageously employed in compositions in which component A is a synthetic organic polymer, in particular a thermoplastic polymer, a binder for coatings, for example paints, or a photographic material.

If component A is a binder for coatings, the addition of the above-described component C to the novel composition is particularly advisable.

Suitable thermoplastic polymers are, for example, polyolefins and polymers containing hereto atoms in the main chain. Preference is also given to compositions in which component A is a photographic material or is a thermoplastic polymer containing nitrogen, oxygen and/or sulfur, in particular nitrogen or oxygen, in the main chain.

Polymers containing hetero atoms in the main chain are in particular O-, S- and/or N-containing polymers. Examples of such polymers are the rollowing classes of thermoplastic polymers:

1. Polyacetals, such as polyoxymethylene, and polyoxymethylenes containing comonomers, for example ethylene oxide; polyacetals which have been modified with thermoplastic polyurethanes, acrylates or MBS.

2. Polyphenylene oxides and sulfides, and mixtures thereof with styrene polymers or polyamides.

3. Polyamides and copolyamides, for example those derived from diamines and dicarboxylic acids and/or from aminocarboxylic acids or the corresponding lactams, such as nylon 4, nylon 6, nylon 6/6, 6/10, 6/9, 6/12, 4/6, nylon 11, nylon 12, aromatic polyamides derived from m-xylene, diamine and adipic acid; polyamides prepared from hexamethylenediamine and iso- and/or terephthalic acid and, if desired, an elastomer as modifier, for example poly-2,4,4-trimethylhexamethyleneterephthalamide, poly-m-phenyleneisophthalamide; block copolymers of the abovementioned polyamides with polyolefins, olefin copolymers, ionomers or chemically bonded or grafted elastomers; or with polyethers, for example with polyethylene glycol, polypropylene glycol or polytetramethylene glycol; furthermore polyamides or copolyamides modified with EPDM or ABS; and polyamides condensed during processing ("RIM polyamide systems").

4. Polyureas, polyimides, polyamide-imides and polybenzimidazoles.

5. Polyesters, for example those derived from dicarboxylic acids and dialcohols and/or from hydroxycarboxylic acids or the corresponding lactones, such as polyethylene terephthalate, polybutylene terephthalate, poly-1,4-dimethylolcyclohexane terephthalate, polyhydroxybenzoates, and block polyether-esters derived from polyethers containing hydroxyl terminal groups; furthermore polyesters modified with polycarbonates or MBS.

6. Polycarbonates and polyester carbonates, in particular aromatic polycarbonates, for example those based on 2,2-bis(4-hydroxyphenyl)propane or 1,1-bis(4-hydroxyphenyl)cyclohexane.

7. Polysulfones, polyether sulfones and polyether ketones, in particular aromatic polymers from this class.
8. Mixtures (polyblends) of such polymers with one another or with other polymers, for example with polyolefins, polyacrylates, polydienes or other elastomers as impact modifiers.

Of these, preference is given to polycarbonates, polyesters, polyamides, polyacetals, polyphenylene oxides and polyphenylene sulfides, but in particular to polycarbonates.

Also of interest are compositions in which component (A) is a polyolefin, for example polyethylene or polypropylene.

Incorporation into the organic material to be stabilized, for example into the synthetic organic, in particular thermoplastic polymers, can be carried out by addition of the novel compounds and any further additives by the methods conventional in industry. The incorporation can expediently be carried out before or during shaping, for example by mixing the pulverulent components or by adding the stabilizer to the melt or solution of the polymer, or by applying the dissolved or dispersed compounds to the polymer, if desired with subsequent evaporation of the solvent. In the case of elastomers, these can also be stabilized as latices. Another way of incorporating the novel compounds into polymers comprises adding them before or during the polymerization of the corresponding monomers or before the crosslinking.

The novel compounds or mixtures thereof can also be added to the plastics to be stabilized in the form of a masterbatch which comprises these compounds, for example, in a concentration of from 2.5 to 25% by weight.

The novel compounds can expediently be incorporated by the following methods:

as an emulsion or dispersion (for example to latices or emulsion polymers)

as a dry mix during mixing of additional components or polymer mixtures by direct addition into the processing equipment (for example extruder, internal mixer, etc.)

as a solution or melt.

The stabilized polymer compositions obtained in this way can be converted into shaped articles, for example fibres, films, tapes, sheets, sandwich boards, containers, pipes and other profiles, by conventional methods, for example by hot pressing, spinning, extrusion or injection moulding.

The invention therefore furthermore relates to the use of the novel polymer composition for the production of a shaped article.

Also of interest is use in multilayer systems. In this case, a novel polymer composition having a relatively high content of stabilizer of the formula I, for example 5–15% by weight, is applied in a thin film (10–100 μm) to a shaped article made from a polymer containing little or no stabilizer of the formula I. The application can be carried out at the same time as shaping of the base structure, for example by coextrusion. However, the application can also take place to the ready-shaped base structure, for example by lamination with a film or by coating with a solution. The outer layer or layers of the finished article have the function of a UV filter which protects the interior of the article against UV light. The outer layer preferably comprises 5–15% by weight, in particular 5–10% by weight, of at least one stabilizer of the formula I.

Likewise of particular interest is the use of the novel compounds of the formula I as stabilizers for coatings, for example for paints. The invention therefore also relates to compositions whose component A is a film-forming binder.

Use in multilayer systems is possible, where the concentration of the compound of the formula I (component B) in the outer layer can be higher, for example from 1 to 15 parts by weight of B, especially 3–10 parts by weight of B, per 100 parts by weight of solid binder A.

The binder (component A) can in principle be any binder which is customary in industry, for example those as described in Ullmann's Encyclopedia of Industrial Chemistry, 5th Edn., Vol. A18, pp. 368–426, VCH, Weinheim, 1991. In general, this is a film-forming binder based on a thermoplastic or thermoserring resin, predominantly based on a thermosetting resin. Examples thereof are alkyd, acrylic, polyester, phenolic, melamine, epoxy and polyurethane resins and mixtures thereof.

Component A can be a cold-curable or hot-curable binder; it may be advantageous to add a curing catalyst. Suitable catalysts which accelerate curing of the binder are described, for example, in Ullmann's Encyclopedia of Industrial Chemistry, Vol. A 18, p. 469, VCH Verlagsgesellschaft, Weinheim, 1991 .

Preference is given to coating compositions in which component A is a binder comprising a functional acrylate resin and a crosslinking agent.

Examples of coating compositions containing specific binders are:

1. Paints based on cold- or hot-crosslinkable alkyd, acrylate, polyester, epoxy or melamine resins, or mixtures of such resins, if desired with addition of a curing catalyst;
2. Two-component polyurethane paints based on hydroxyl-containing acrylate, polyester or polyether resins and aliphatic or aromatic isocyanates, isocyanurates or polyisocyanates;
3. One-component polyurethane paints based on blocked isocyanates, isocyanurates or polyisocyanates which are deblocked during baking;
4. Two-component paints based on (poly)ketimines and aliphatic or aromatic isocyanates, isocyanurates or polyisocyanates;
5. Two-component paints based on (poly)ketimines and an unsaturated acrylate resin or a polyacetoacetate resin or a methacrylamidoglycolate methyl ester;
6. Two-component paints based on carboxyl- or amino-containing polyacrylates and polyepoxides;
7. Two-component paints based on anhydride-containing acrylate resins and a polyhydroxyl or polyamino component;
8. Two-component paints based on (poly)oxazolines and anhydride-containing acrylate resins or unsaturated acrylate resins or aliphatic or aromatic isocyanates, isocyanurates or polyisocyanates;
9. Two-component paints based on unsaturated polyacrylates and polymalonates;
10. Thermoplastic polyacrylate paints based on thermoplastic acrylate resins or externally crosslinking acrylate resins in combination with etherified melamine resins;
11. Paint systems based on siloxane-modified or fluorine-modified acrylate resins.

The novel coating compositions can also be radiation-curable. In this case, the binder essentially comprises monomeric or oligomeric compounds containing ethylenically unsaturated bonds which are cured, after application, by UV radiation or electron beams, i.e. are converted into a crosslinked, high-molecular-weight form. Corresponding systems are described in the abovementioned publication, Ulhnann's Encyclopedia of Industrial Chemistry, 5th Edn. Vol. A 18, pages 451–453. In radiation-curable coating compositions, the compounds of the formula I can also be employed without addition of sterically hindered amines.

In addition to components A, B and, if used, C, the coating composition can comprise further components, for example solvents, pigments, dyes, plasticizers, stabilizers, thixotropic agents, drying catalysts and/or flow-control agents. Examples of possible components are those as described in Ullmann's Encyclopedia of Industrial Chemistry, 5th Edn., Vol. A18, pp. 429–471, VCH, Weinheim, 1991.

Possible drying catalysts or curing catalysts are, for example, organometallic compounds, amines, amino-containing resins and/or phosphines. Examples of organometallic compounds are metal carboxylates, in particular those of the metals Pb, Mn, Co, Zn, Zr and Cu, or metal chelates, in particular those of the metals Al, Ti and Zr, or organometallic compounds, for example organolin compounds.

Examples of metal carboxylates are the stearates of Pb, Mn and Zn, the octanoates of Co, Zn and Cu, the naphthenates of Mn and Co and the corresponding linoleates, resinales and tallates.

Examples of metal chelates are the aluminium, titanium and zirconium chelates of acetylacetone, ethyl acetylacetate, salicyl aidehyde, salicyl aldoxime, o-hydroxyacetophenone and ethyl trifluoroacetylacetate, and the alkoxides of these metals.

Examples of organotin compounds are dibutyltin oxide, dibutyltin dilaurate and dibutyltin dioctanoate.

Examples of amines are in particular tertiary amines, for example tributylamine, triethanolamine, N-methyldiethanolamine, N-dimethylethanolamine, N-ethylmorpholine, N-methyhnorpholine and diazabicyclooctane (tfiethylenediamine) and salts thereof. Further examples are quaternary ammonium salts, for example trimethylbenzylammonium chloride.

Amino-containing resins are simultaneously binder and curing catalyst. Examples thereof are amino-containing acrylate copolymers.

The curing catalyst can also be a phosphine, for example triphenylphosphine.

The novel coating compositions can be applied to any desired substrates, for example to metal, wood, plastic or ceramic materials. They are preferably used as top coat in the painting of automobiles. If the top coat comprises two layers, of which the lower layer is pigmented and the upper layer is not pigmented, the novel coating composition can be used for either the upper or the lower layer or for both layers, but preferably for the upper layer.

The novel coating compositions can be applied to the substrates by conventional processes, for example by brushing, spraying, pouring, dipping or electrophoresis; see also Ullmann's Encyclopedia of Industrial Chemistry, 5th Edn., Vol. A18, pp. 491–500.

The curing of the coatings can—depending on the binder system—be carried out at room temperature or by warming. The coatings are preferably cured at 50°–150° C., powder coatings also at high temperatures.

The coatings obtained in accordance with the invention have excellent resistance to the harmful effects of light, oxygen and heat; particular mention should be made of the good light and weathering resistance of the coatings, for example paints, obtained in this way.

The invention therefore also relates to a coating, in particular a paint, which has been stabilized against the harmful effects of light, oxygen and heat by a content of the novel compound of the formula I. The paint is preferably a top coat for automobiles.

Also of interest are binders into which a compound of the formula I has been incorporated by copolyaddition or copolycondensation. Suitable compounds of the formula I for this purpose are those in which the radical $R^7$ contains an ethylenically unsaturated group which is suitable for copolyaddition or a functional group which is suitable for copolycondensation. In this case, the novel coating composition can also comprise only one component, namely the binder with incorporated stabilizer.

The coating compositions usually comprise an organic solvent or solvent mixture in which the binder is soluble. However, the coating composition can also be an aqueous solution or dispersion. The vehicle can also be a mixture of an organic solvent and water. The coating composition can also be a high-solids paint or contain no solvent (powder paint).

The pigments can be inorganic, organic or metallic pigments. The novel coating compositions preferably contain no pigments and are used as clear coats.

Likewise preferred is the use of the coating composition its top coat for applications in the automobile industry, in particular as a pigmented or unpigmented top coat of the finish. However, use for underlying layers is also possible.

The present invention furthermore relates to the use of a compound of the formula I as a stabilizer against light damage, in particular UV light damage, in photographic materials, and to a photographic material comprising a compound of the formula I or a mixture of compounds of the formula I.

The novel compounds can be used for photosensitive materials of all types. For example, they can be used for colour paper, colour reversal paper, direct-positive colour materials, colour negative film, colour positive film, colour reversal film, inter alia. They are preferably used, inter alia, for photosensitive colour material which comprises a reversal substrate or forms positives.

The novel compounds can furthermore be combined with further UV absorbers, in particular with those which are dispersible in aqueous gelatin, for example with hydroxyphenylbenzotriazoles (cf., for example, U.S. Pat. No. 4,853,471, U.S. Pat. No. 4,973,702, U.S. Pat. No. 4,921,966 and U.S. Pat. No. 4,973,701), benzophenones, oxanilides, cyanoacrylates, salicylates, acrylonitriles or thiazolines. It is advantageous here to employ these further oil-dissolved UV absorbers in different layers in the photographic material than the novel UV absorbers. In particular, photographic materials similar to those as described in U.S. Pat. No. 4,518,686 can successfully be stabilized.

The invention therefore also relates to a photographic material comprising, on a support, a blue-sensitive, a green-sensitive and/or a red-sensitive silver-halide emulsion layer and, if desired, a protection layer, where a layer comprising a UV absorber is arranged above the first silver-halide emulsion layer, wherein the UV absorber conforms to the formula I.

In a further embodiment, the novel material comprises a layer comprising a UV absorber of the formula I which is arranged between the green- and red-sensitive silver-halide emulsion layers, where a further layer comprising a UV absorber of the formula I may be arranged above the uppermost silver-halide emulsion layer.

Good results are also achieved if the UV absorber of the formula I is additionally present in the red-sensitive silver-halide emulsion layer.

Preference is furthermore given to photographic materials which comprise a layer comprising a compound of the formula I above the uppermost silver-halide emulsion layer and/or between the green- and red-sensitive silver-halide emulsion layers, where in addition an oil-soluble UV absorber is present in a layer containing no UV absorber of the formula I.

It may furthermore be advantageous if all or some of said layers which can comprise a UV absorber comprise a UV absorber of the formula I and/or a further UV absorber which can be dispersed in aqueous gelatin, but a UV absorber of the formula I must be present in at least one layer.

The novel material preferably comprises gelatin interlayers between the silver-halide emulsion layers.

Preference is given to photographic materials wherein the silver halide in the blue-sensitive, green-sensitive and/or red-sensitive layer is silver chloride bromide comprising at least 90 mol % of silver chloride.

Preference is furthermore given to photographic materials in which the silver-halide emulsion layers are in the sequence blue-sensitive, green-sensitive and red-sensitive silver-halide emulsion layers.

The novel photographic materials offer the advantage over materials comprising benzotriazole UV absorbers that the UV absorbers of the formula I are required in a relatively small amount in order to ensure adequate protection against UV radiation. This means that the thickness of the layers comprising the UV absorbers of the formula I can be very thin, which has a positive effect on, for example, the sharpness of the images produced using this material.

Yellow couplers which can be used in the material according to the invention are preferably compounds of the formula A

(A)

in which $R_1$ is alkyl or aryl, $R_2$ is aryl and Q is hydrogen or a group which can be eliminated by reaction with the oxidized developer.

A group of yellow couplers comprises the compounds of the formula A in which $R_1$ is t-butyl and $R_2$ is a group of the formula

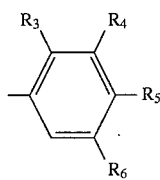

in which $R_3$ is hydrogen, halogen, alkyl or alkoxy, and $R_4$, $R_5$ and $R_6$ are hydrogen, halogen, alkyl, alkenyl, alkoxy, aryl, carboxyl, alkoxycarbonyl, carbamoyl, sulfonyl, sulfamoyl, alkoxysulfonylamino, acylamino, ureido or amino.

Preferably, $R_3$ is chlorine, $R_4$ and $R_5$ are hydrogen and $R_6$ is an acylamino group. This group also includes the compounds of the formula

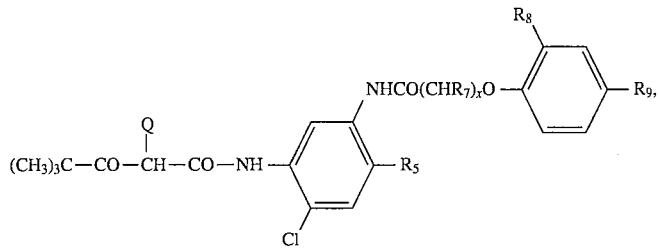

in which x is 0–4, $R_7$ is hydrogen or alkyl, $R_8$ and $R_9$ are alkyl.

Another group of yellow couplers conforms to the formula B

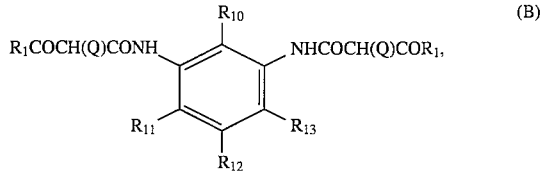

in which $R_{10}$ is hydrogen, halogen or alkoxy, $R_{11}$, $R_{12}$ and $R_{13}$ are hydrogen, halogen, alkyl, alkenyl, alkoxy, aryl, carboxyl, alkoxycarbonyl, carbamoyl, sulfonyl, sulfamoyl, sulfonamido, acylamino, ureido or amino, and $R_1$ and Q are as defined above.

This group includes compounds of the formula B in which $R_1$ is t-butyl, $R_{10}$ is chlorine, $R_{11}$ and $R_{13}$ are hydrogen, and $R_{12}$ is alkoxycarbonyl.

In the compounds of the formulae A and B, leaving group Q may be hydrogen or a heterocyclic group

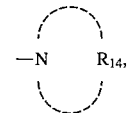

in which $R_{14}$ is a divalent organic group which supplements the ring to make up a 4–7-membered ring, or Q is an —$OR_{15}$ group in which $R_{15}$ is alkyl, aryl, acyl or a heterocyclic radical.

The yellow couplers are usually used in an amount of 0.05–2 tool and preferably 0.1–1 mol per tool of silver halide.

Examples of magenta couplers are simple 1-aryl-5-pyrazolones or pyrazole derivatives which have been condensed with 5-membered hetero rings, e.g. imidazopyrazoles, pyrazolopyrazoles, pyrazolotriazoles and pyrazolotetrazoles.

One group of magenta couplers comprises 5-pyrazolones of the formula C

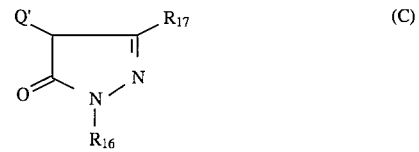

as described in British Patent 2 003 473. In this formula, $R_{16}$ is hydrogen, alkyl, aryl, alkenyl or a heterocyclic group and $R_{17}$ is hydrogen, alkyl, aryl, a heterocyclic group, an ester group, an alkoxy group, an alkylthio group, a carboxyl group, an arylamino group, an acylamino group, a (thio)urea group, a (thio)carbamoyl group, a guanidino group or a sulfonamido group.

$R_{17}$ is preferably an

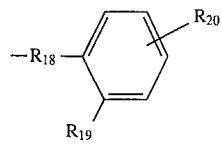

group, in which $R_{18}$ is imino, acylamino or ureido, $R_{19}$ is hydrogen, halogen, alkyl or alkoxy and $R_{20}$ is hydrogen, alkyl, acylamino, carbamoyl, sulfamoyl, sulfonamido, alkoxycarbonyl, acyloxy or a urethane group.

If Q' is hydrogen, the magenta coupler is tetraequivalent with respect to the silver halide.

Typical examples of magenta couplers of this type are compounds of the formula

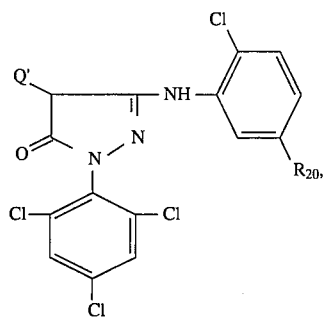

in which $R_{20}$ is as defined above, and Q', as described above, is a leaving group. These compounds are preferably present in the material according to the invention.

Further examples of tetraequivalent magenta couplers of this type are given in U.S. Pat. Nos. 2,983,608, 3,061,432, 3,062,653, 3,127,269, 3,152,896, 3,311,476, 3,419,391, 3,519,429, 3,558,319, 3,582,322, 3,615,506, 3,684,514, 3,834,908, 3,888,680, 3,891,445, 3,907,571, 3,928,044, 3,930,861, 3,930,866 and 3,933,500 and JP-A-89/309 058.

If Q' in the formula C is not hydrogen, but instead a group which is eliminated during the reaction with the oxidised developer, the magenta coupler is diequivalent. In this case, Q can be, for example, halogen or a group bonded to the pyrazole ring via O, S or N. Diequivalent couplers of this type give greater colour density and are more reactive towards the oxidised developer than are the corresponding tetraequivalent magenta couplers.

Examples of diequivalent magenta couplers are described in U.S. Pat. Nos. 3,006,579, 3,419,391, 3,311,476, 3,432, 521, 3,214,437, 4,032,346, 3,701,783, 4,351,897, 3,227,554, in EP-A-133 503, DE-A-2 944 601, JP-A-78/34 044, 74/53 435, 74/53 436, 75/53 372 and 75/122 935.

It is possible for 2 pyrazolone rings to be linked via a divalent Q', giving so-called bis-couplers. These am described, for example, in U.S. Pat. Nos. 2,632,702, U.S. Pat. No. 2,618,864, GB-A-968 461, GB-A-786 859, JP-A- 76/37 646, 59/4 086, 69/16 110, 69/26 589, 74/37 854 and 74/29 638. Y is preferably an O-alkoxyarylthio group.

As mentioned above, the magenta couplers used can also be pyrazoles condensed with 5-membered heterocyclic rings, known as pyrazoloazoles. Their advantages over simple pyrazoles is that they have colours of greater formalin resistance and have purer absorption spectra.

Magenta couplers of the pyrazoloazole type, which are likewise preferred, may be represented by the formula

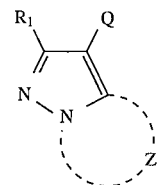

(M-7)

in which $R_1$ is hydrogen or a substituent, Z represents the non-metallic atoms necessary to complete a 5-membered ring containing 2 or 3 nitrogen atoms, it being possible for this ring to be substituted, and Q is hydrogen or a leaving group.

Of these compounds, preference is given to magenta couplers of the formulae

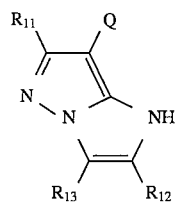

(M-8)

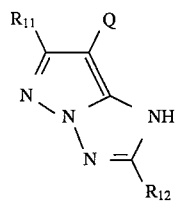

(M-9)

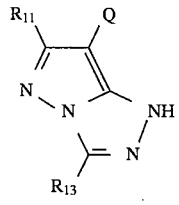

(M-10)

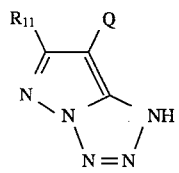

(M-11)

$R_{11}$, $R_{12}$ and $R_{13}$, independently of one another, are, for example, hydrogen, halogen, —$CR_3$, in which the radicals $R_3$ are, independently of one another, hydrogen or alkyl, aryl, heterocyclyl, cyano, hydroxyl, nitro, carboxyl, amino, alkoxy, aryloxy, acylamino, alkylamino, anilino, ureido, sulfamoylamino, alkylthio, arylthio, alkoxycarbonylamino, sulfonamido, carbamoyl, sulfamoyl, sulfonyl, alkoxycarbonyl, heterocyclyoxy, azo, aryloxy, carbamoyloxy, silyloxy, aryloxycarbonylamino, imido, heterocyclylthio, sulfinyl, phosphonyl, aryloxycarbonyl, acyl or azolyl, preferably hydrogen, halogen (for example chlorine or bromine), —$CR_3$ in which the radicals R are, independently of one another, hydrogen or alkyl, aralkyl, alkenyl, alkynyl, cycloalkyl or cycloalkenyl, particularly preferably methyl, ethyl, propyl, isopropyl, t-butyl, tridecyl, 2-methanesulfonylethyl, 3-(3-pentadecylphenoxy)propyl, 3-(4-(2-(4-(4-hydroxyphenylsulfonyl)phenoxy) dodecanamido)phenyl)propyl, 2-ethoxytridecyl, trifluoromethyl, cyclopentyl, 3-(2,4-di-t-amylphenoxy)propyl; aryl (for example phenyl, 4-t- butylphenyl, 2,4-di-t-amylphenyl or 4-tetradecaneamidophenyl); heterocyclyl (for example 2-furyl, 2-thienyl, 2-pyrimidinyl or 2-benzothiazolyl); cyano; hydroxyl, nitro; carboxyl; amino; alkoxy (for example methoxy, ethoxy, 2-methoxyethoxy; 2-dodecylethoxy, 2-methanesulfonylethoxy); aryloxy (for example phenoxy, 2-methylphenoxy, 4-t-butylphenoxy, 3-nitrophenoxy, 3-t-butoxycarbamoylphenoxy or 3-methoxycarbamoyl); acylamino (for example acetoamido, benzamido, tetradecaneamido, 2-(2,4-di-t-amylphenoxy)butaneamido, 4-(3-t-butyl-4-hydroxyphenoxy)butaneamido or 2-(4-(4-hydroxyphenylsulfonyl)phenoxy)decaneamido); methylbutylamino; anilino (for example phenylamino, 2-chloroanilino, 2-chloro-5-tetradecaneaminoanilino, 2-chloro-5-dodecyloxycarbonylanilino, N-acetylanilino or 2-chloro-5-(alpha-(3-t-butyl-4-hydroxyphenoxy)dodecaneamidoanilino); ureido (for example phenylureido, methylureido or N,N-dibutylureido); sulfamoylamino (for example N,N-dipropylsulfamoylamino or N-methyl-N-decylsulfamoylamino); alkylthio (for example methylthio, octylthio, tetradecylthio, 2-phenoxyethylthio, 3-phenoxypropylthio or 3-(4-t-butylphenoxy)propylthio); arylthio (for example phenylthio, 2-butoxy-5-t-octylphenylthio, 3-pentadccylphenylthio, 2-carboxyphenylthio or 4-tetradecaneamidophenylthio); alkoxycarbonylamino (for example methoxycarbonylamino or tetradecyloxycarbonylamino); sulfonamido (for example methanesulfonamido, hexadecanesulfonamido, benzenesulfonamido, p-toluenesulfonamido, octadecanesulfonamido or 2-methoxy-5-t-butylbenzenesulfonamido); carbamoyl (for example N-ethylcarbamoyl, N,N-dibutylcarbamoyl, N-(2-dodecyloxyethyl)carbamoyl, N-methyl-N-dodecylcarbamoyl or N-(3-(2,4-di-t-amylphenoxy)propyl)carbamoyl); sulfamoyl (for example N-ethylsulfamoyl, N,N-dipropylsulfamoyl, N-2-(dodecyloxyethyl)sulfamoyl, N-ethyl-N-dodecylsulfamoyl or N,N-diethylsulfamoyl); sulfonyl (for example methanesulfonyl, octanesulfonyl, benzenesulfonyl or toluenesulfonyl); alkoxycarbonyl (for example methoxycarbonyl, butoxycarbonyl, dodecyloxycarbonyl or octadecyloxycarbonyl); heterocyclyloxy (for example 1-phenyltetrazol-5-oxy or 2-tetrahydropyranyloxy); azo (for example phenylazo, 4-methoxyphenylazo, 4-pivaloylaminophenylazo or 2-hydroxy-4-propanoylphenylazo); acyloxy (for example acetoxy); carbamoyloxy (for example N-methylcarbamoyloxy or N-phenylcarbamoyloxy); silyloxy (for example trimethylsilyloxy or dibutyhnethylsilyloxy); aryloxycarbonylamino (for example phenoxycarbonylamino); imido (for example N-succinimido, N-phthalimido or 3-octadecenylsuccinimido); heterocyclylthio (for example 2-benzothiazolylthio, 2,4-diphenyloxy-1,3,5-triazole-6-thio or 2-pyridylthio); sulfinyl (for example dodecanesulfinyl, 3-pentadecylphenylsulfinyl or 3-phenoxypropylsulfinyl); phosphonyl (for example phenoxyphosphonyl, octyloxyphosphonyl or phenylphosphonyl); aryloxycarbonyl (for example phenoxycarbonyl); acyl (for example acetyl, 3-phenylpropanoyl, benzoyl or 4-dodecyloxybenzoyl); or azolyl (for example imidazolyl, pyrazolyl or 3-chloro-pyrazol-1-yl).

These substituents may be further substituted, for example by halogen or by an organic radical bonded via a C, O, N or S atom.

Preferred groups $R_{11}$ are alkyl, aryl, alkoxy, aryloxy, alkylthio, ureido, urethane and acylamino groups.

$R_{12}$ may be as defined for $R_{11}$ and is preferably hydrogen, alkyl, aryl, a heterocyclic ring, alkoxycarbonyl, carbamoyl, sulfamoyl, sulfinyl, acyl or cyano.

$R_{13}$ may be as defined for $R_{11}$ and is preferably hydrogen, alkyl, aryl, heterocyclyl, alkoxy, aryloxy, alkylthio, arylthio, alkoxycarbonyl, carbamoyl or acyl, in particular alkyl, aryl, heterocyclyl, alkylthio or arylthio.

Q is hydrogen or a leaving group, such as halogen, alkoxy, aryloxy, acyloxy, alkyl- or arylsulfonyloxy, acylamino, alkyl- or arylsulfonamido, alkoxycarbonyloxy, aryloxycarbonyloxy. alkyl-, aryl- or heterocyclyl-S-carbamoylamino, a 5- or 6-membered, nitrogen-containing heterocyclic radical, imido or arylazo. These groups may be further substituted as indicated for $R_{11}$.

Q is preferably halogen (for example fluorine, chlorine or bromine); alkoxy (for example ethoxy, dodecyloxy, methoxyethylcarbamoylmethoxy, carboxypropoxy, methylsulfonylethoxy or ethoxycarbonylmethoxy); aryloxy (for example 4-methylphenoxy, 4-chlorophenoxy, 4-methoxyphenoxy, 4-carboxyphenoxy, 3-ethoxycarboxyphenoxy, 3-acetylaminophenoxy or 2-carboxyphenoxy); acyloxy (for example acetoxy, tetradecanoyloxy or benzoyloxy); alkyl- or arylsulfonyloxy (for example methanesulfonyloxy or toluenesulfonyloxy); acylamino (for example dichloroacetylamino or heptafluorobutyrylamino); alkyl- or arylsulfonamido (for example methanesulfonamido, trifluoromethanesulfonamido or p-toluenesulfonamido); alkoxycarbonyloxy (for example ethoxycarbonyloxy or benzyloxycarbonyloxy); aryloxycarbonyloxy (for example phenoxycarbonyloxy); alkyl-, aryl- or heterocyclyl-S- (for example dodecylthio, 1-carboxydodecylthio, phenylthio, 2-butoxy-5-t-octylphenylthio or tetrazolylthio); carbamoylamino (for example N-methylcarbamoylamino or N-phenylcarbamoylamino); a 5- or 6-membered, nitrogen-containing ring (for example imidazolyl, pyrazolyl, triazolyl, tetrazolyl or 1,2-dihydro-2-oxo-1-pyridyl); imido (for example succinimido or hydantoinyl); or arylazo (for example phenylazo or 4-methoxyphenylazo).

Q may alternatively form corresponding bis-compounds by condensation of four equivalents of coupler with an aidehyde or ketone. Furthermore, Q may contain photographically active groups, such as development inhibitors or development accelerators. Q is preferably halogen, alkoxy, aryloxy, alkyl- or arylthio, or a 5- or 6-membered, nitrogen-containing, heterocyclic group which is bonded to the coupling site via a nitrogen atom.

Pyrazolotetrazoles are described in JP-A-85/33 552; pyrazolopyrazoles in JP-A-85/43 695; pyrazoloimidazoles in JP-A-85/35 732, JP-A-86/18 949 and U.S. Pat. No. 4,500, 630; pyrazolotriazoles in JP-A-85/186 567, JP-A-86/47 957, JP-A-85/215 687, JP-A-85/197 688, JP-A-85/172 982, EP-A-119 860, EP-A-173 256, EP-A-178 789, EP-A-178 788 and in Research Disclosure 84/24 624.

Further pyrazoloazole magenta couplers are described in: JP-A-86/28 947, JP-A-85/140 241, JP-A-85/262 160, JP-A-85/213 937, JP-A-87/278 552, JP-A-87/279 340, JP-A-88/100 457, EP-A-177 765, EP-A-176 804, EP-A-170 164, EP-A-164 130, EP-A-178 794, DE-A-3 516 996, DE-A-3 508 766, and Research Disclosure 81/20 919, 84/24 531 and 85/25 758.

Cyan couplers may be, for example, derivatives of phenol, of 1-naphthol or of pyrazoloquinazolone. Preference is given to structures of the formula E

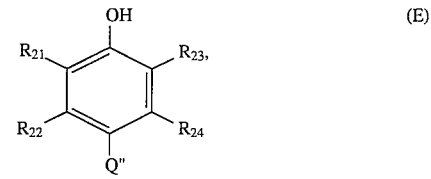

in which $R_{21}$, $R_{22}$, $R_{23}$ and $R_{24}$ are hydrogen, halogen, alkyl, carbamoyl, amino, sulfonamido, phosphoramido or ureido.

$R_{21}$ is preferably H or Cl, $R_{22}$ is preferably an alkyl or amino group, $R_{23}$ is preferably an amino group and $R_{24}$ is preferably hydrogen. Q" is hydrogen or a leaving group which can be eliminated during the reaction with the oxidised developer. A detailed list of cyan couplers is given in U.S. Pat. No. 4,456,681.

Further examples of cyan couplers are given in the following: U.S. Pat. Nos. 2,369,929, 2,423,730, 2,434,272, 2,474,293, 2,521,293, 2,521,908, 2,698,794, 2,706,684, 2,772,162, 2,801,171, 2,895,826, 2,908,573, 3,034,892, 3,046,129, 3,227,550, 3,253,294, 3,311,476, 3,386,301, 3,419,390, 3,458,315, 3,476,560, 3,476,563, 3,516,831, 3,560,212, 3,582,322, 3,583,971, 3,591,383, 3,619,196, 3,632,347, 3,652,286, 3,737,326, 3,758,308, 3,839,044, 3,880,661, 4,004,929, 4,124,396, 4,333,999, 4,463,086, 4,456,681, 4,873,183, 4,923,791 and in EP-A-354 549 and EP-A-398 664.

The red-sensitive silver-halide emulsion layer of the material according to the invention preferably contains a cyan coupler of the formula

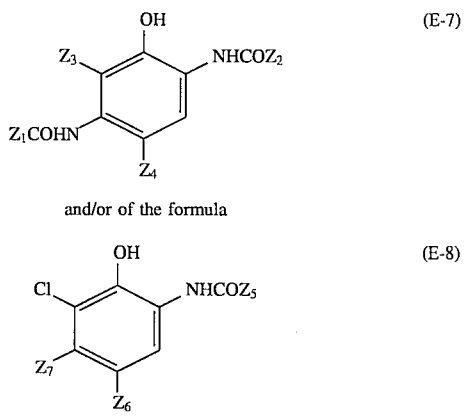

(E-7)

and/or of the formula (E-8)

in which $Z_1$ is alkyl or aryl, $Z_2$ is alkyl, cycloalkyl, aryl, a heterocyclic group or a ballast group, $Z_3$ is hydrogen or halogen, $Z_1$ and $Z_3$ together can form a ring, and $Z_4$ is hydrogen or a leaving group, and $Z_5$ is a ballast group, $Z_6$ is hydrogen or a leaving group and $Z_7$ is alkyl.

The colour developers usually used for colour-photographic materials are p-dialkylaminoanilines. Examples thereof are 4-amino-N,N-diethylaniline, 3-methyl-4-amino-N,N-diethylaniline, 4-amino-N-ethyl-N-α-hydroxyethylaniline, 3-methyl-4-amino-N-ethyl-N-α-hydroxyethylaniline, 3-methyl-4-amino-N-ethyl-N-α-hydroxyethylaniline, 3-methyl-4-amino-N-ethyl-N-α-methanesulfonamidoethylaniline, 3-methyl-4-amino-N-ethyl-N-α-methoxyethyl-aniline, 3-α-methanesulfonamidoethyl-4-amino-N,N-diethylaniline, 3-methoxy-4-amino-N-ethyl-N-α-hydroxyethylaniline, 3-methoxy-4-amino-N-ethyl-N-α-methoxyethylaniline, 3-acetamido-4-amino-N,N-diethylaniline, 4-amino-N,N-dimethylaniline, N-ethyl-N-α-[α'-(α"-methoxyethoxy)ethoxy]ethyl-3-methyl-4-aminoaniline, N-ethyl-N-α-(α'-methoxyethoxy)ethyl-3-methyl-4-aminoaniline, and the salts of such compounds, for example sulfates, hydrochlorides or toluenesulfonates.

The UV absorbers of the formula I used in accordance with the invention can be incorporated into the colour-photographic material either alone or together with the colour coupler and any further additives by predissolving them in high-boiling organic solvents. Preference is given to solvents which boil at above 160° C. Typical examples of such solvents are the esters of phthalic acid, phosphoric acid, citric acid, benzoic acid or of fatty acids, and alkylamides and phenols.

In most cases, a low-boiling solvent is additionally used to simplify incorporation of the additives into the colour-photographic material. Examples of such solvents are esters, for example ethyl acetate, alcohols, for example butanol, ketones, for example methyl isobutyl ketone, chlorinated hydrocarbons, for example methylene chloride, or amides, for example dimethylformamide. If the additives are themselves liquid, they can be incorporated into the photographic material without the aid of solvent.

The novel UV absorbers can, if desired, be dispersed in the gelatin layer without oil; Research Disclosure 88/296 017 and 89/303 070.

Further details on high-boiling solvents which may be used can be found in the following publications:

Phosphates: GB-A-791 219, BE-A-755 248, JP-A-76/76 739, 78/27 449, 78/218 252, 78/97 573, 79/148 133, 82/216 177, 82/93 323 and 83/216 177 and EP-A-265 296.

Phthalates: GB-A-791 219, JP-A-77/98 050, 82/93 322, 82/216 176, 82/218 251, 83/24 321, 83/45 699 and 84/79 888.

Amides: GB-A-791 129, JP-A-76/105 043, 77/13 600, 77/61 089, 84/189 556, 87/239 149, U.S. Pat. No. 928 741, EP-A-270 341 and WO 88/00 723.

Phenols: GB-A-820 329, FR-A-1 220 657, JP-A-69/69 946, 70/3 818, 75/123 026, 75/82 078, 78/17 914, 78/21 166, 82/212 114 and 83/45 699.

Other oxygen-containing compounds: U.S. Pat. Nos. 3,748,141, 3,779,765, JP-A-73/75 126, 74/101 114, 74/10 115, 75/101 625, 76/76 740, 77/61 089, EP-A-304 810 and BE-A-826 039.

Other compounds: JP-A-72/115 369, 72/130 258, 73/127 521, 73/76 592, 77/13 193, 77/36 294, 79/95 233, 91/2 748, 83/105 147 and Research Disclosure 82/21 918.

The amount of high-boiling solvent is, for example, in the range from 50 mg to 2 g per $m^2$ of base, preferably from 200 mg to 1 g per $m^2$.

Further preferred colour couplers for use in the novel compositions, examples of such compounds, further additives, such as colour cast inhibitors, DIR couplers and further light stabilizers, such as UV absorbers, phenols, phosphorus(III) compounds, organometallic complexes, hydroquinones and hydroquinone ethers, and further details on the structure of various photographic materials are given, for example, in the publications EP-A-531 258 and EP-A-520 938 and in the references cited therein.

The examples below describe the novel coating compositions, without representing a limitation. In the examples, parts and percentages are by weight, unless stated otherwise; mixtures of solvents are generally by volume. If an example mentions room temperature, this is taken to mean a temperature in the range 20°–25° C. Alkyl radicals denoted by -n are straight-chain unless stated otherwise.

A) PREPARATION EXAMPLES

A1) 34.1 g (0.1 mol) of 2-(2,4-dihydroxyphenyl)-4,6-diphenyl-1,3,5-triazine are stirred for 4 hours at 110° C. with 1.0 g (0.008 mol) of p-dimethylaminopyridine in 150 ml of acetic anhydride. The reaction mixture is cooled to room temperature and poured into 1 l of water. The product precipitates in crystalline form. After filtration and subsequent washing with water, the crude product is recrystallized from acetonitrile, giving the product of the formula

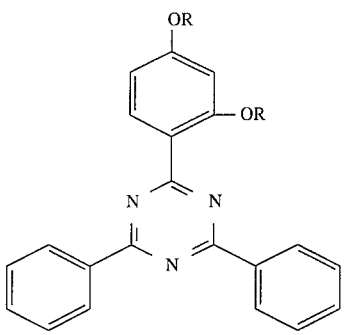

R = —CO—CH₃ of melting point 167°–168° C.

| Elemental analysis: | calculated | found |
|---|---|---|
| C: | 70.58% | 70.47% |
| H: | 4.50% | 4.59% |
| N: | 9.88% | 9.99% |

A2) 37.2 g (0.1 mol) of 2-phenyl-4,6-(2,4-dihydroxyphenyl)-1,3,5-triazine are stirred for 4 hours at 100° C. with 1.0 g (0.008 mol) of p-dimethylaminopyridine in 150 ml of acetic anhydride. The reaction mixture is cooled to room temperature and poured into 1 l of water. The crude product is extracted with ethyl acetate, and the organic phase is dried over Na₂SO₄ and subsequently evaporated. The solid residue is recrystallized from toluene, giving the product of the formula

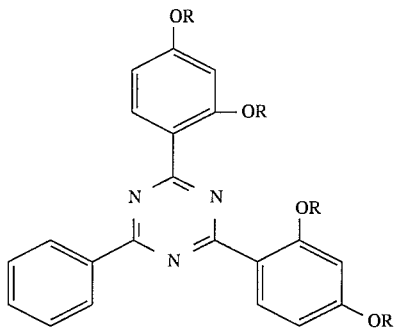

R = —CO—CH₃ of melting point 176°–179° C.

| Elemental analysis | calculated | found |
|---|---|---|
| C: | 64.32% | 64.35% |
| H: | 4.28% | 4.37% |
| N: | 7.76% | 7.84% |

A3) 20.3 g (0.05 mol) of 2,4,6-tris(2,4-dihydroxyphenyl)-1,3,5-triazine are stirred for 24 hours at 110° C. with 0.5 g (0,004 mol) of p-dimethylaminopyridine in 150 ml of acetic anhydride. The reaction mixture is cooled to room temperature and poured into 1 l of water. The product precipitates in crystalline form and, after filtration, is recrystallized from toluene, giving the product of the formula

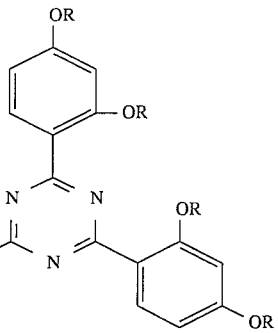

R = —CO—CH₃ of melting point 180°–182° C.

A4) 20.4 g (0.05 mol) of 2-(4-chlorophenyl)-4,6-di(2,4-dihydroxyphenyl)-1,3,5-triazine are stirred for 4 hours at 100° C. with 0.5 g (0.004 mol) of p-dimethylaminopyridine in 150 ml of acetic anhydride. The reaction mixture is subsequently evaporated to dryness and the residue is recrysmllized from a mixture of ligroin and toluene, giving the product of the formula

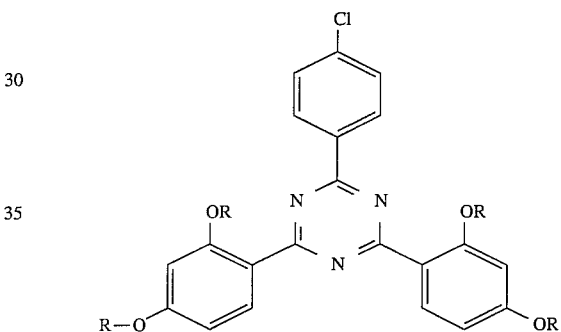

R = —CO—CH₃ of melting point 104°–107° C.

| Elemental analysis: | calculated | found |
|---|---|---|
| C: | 60.48% | 60.37% |
| H: | 3.85% | 3.90% |
| N: | 7.30% | 7.40% |
| Cl: | 6.15% | 6.27% |

A5) 58.4 g (0.1 mol) of 2-(2-hydroxy-4-[2-hydroxy-3-(2-ethylhexyloxy)propoxy]phenyl)-4,6-bis(2,4-dimethylphenyl)-1,3,5-triazine are stirred for 2 hours at 100° C. with 1.0 g (0.008 mol) of p-dimethylaminopyridine in 250 ml of acetic anhydride. The reaction mixture is cooled to room temperature and poured into 2 l of water. The product is extracted with ethyl acetate, and the organic phase is washed with water until neutral, dried over Na₂SO₄ and evaporated, giving the product of the formula

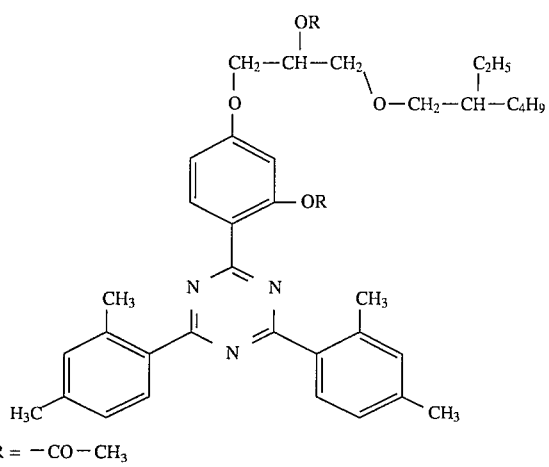

R = —CO—CH₃ as a yellow viscous oil of refractive index $n_D^{40}$=1.5751; mass spectrum M⁺=667.

Elemental analysis:

|   | calculated | found |
|---|---|---|
| C: | 71.94% | 71.89% |
| H: | 7.40% | 7.70% |
| N: | 6.29% | 6.41% |

A6) 53.9 g (0.1 mol) of 2-(2-hydroxy-4-[2-hydroxy-3-methacryloyloxypropoxy]phenyl)-4,6-bis(2,4-dimethylphenyl)-1,3,5-triazine are stirred for 2 hours at 100° C. with 1.0 g (0.008 mol) of p-dimethylaminopyridine in 250 ml of acetic anhydride. The reaction mixture is cooled to room temperature and poured into 2 l of water. The product is extracted with ethyl acetate, and the organic phase is washed with water until neutral, dried over Na₂SO₄ and evaporated, giving the product of the formula

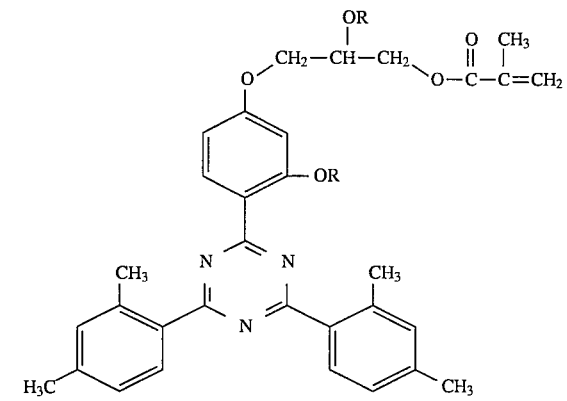

R = —CO—CH₃ which crystallizes slowly, melting point 99°–101° C.

Elemental analysis

|   | calculated | found |
|---|---|---|
| C: | 69.33% | 69.36% |
| H: | 5.98% | 6.02% |
| N: | 6.74% | 6.78% |

A7) 51.0 g (0.1 mol) of 2-(2-hydroxy-4-octyloxyphenyl)-4,6-bis(2,4-dimethylphenyl)-1,3,5-triazine are stirred for 2 hours at 100° C. with 1.0 g (0.008 mol) of p-dimethylaminopyridine in 150 ml of acetic anhydride. The reaction mixture is cooled to room temperature and poured into 1 l of water. The product crystallizes slowly; the crystalline product is filtered off, washed with water and recrystallized from acetonitrile, giving the product of the formula

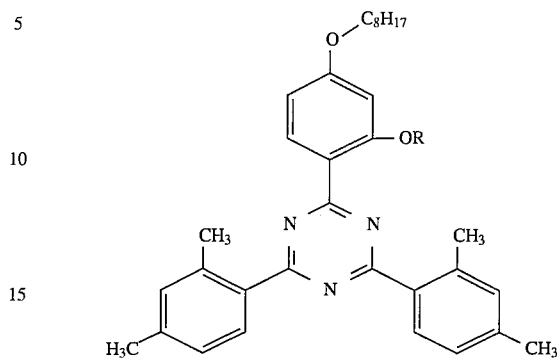

in which R is acetyl, of melting point 99°–100° C.

Elemental analysis:

|   | calculated | found |
|---|---|---|
| C: | 76.19% | 76.21% |
| H: | 7.49% | 7.47% |
| N: | 7.62% | 7.58% |

A8) 50.3 g of a mixture of 2-(2-hydroxy-4-[2-hydroxy-3-dodecyloxy-propoxy]phenyl)-4,6-bis(2,4-dimethylphenyl)-1,3,5-triazine and 2-(2-hydroxy-4-[2-hydroxy-3-tridecyloxypropoxy]phenyl)-4,6-bis(2,4-dimethylphenyl)-1,3,5-triazine, where the dodecyl and tridecyl radicals are in each case isomer mixtures, are stirred for 1 hour at 100° C. with 1.0 g (0.008 mol) of p-dimethylaminopyridine in 150 ml of acetic anhydride. The reaction mixture is cooled to room temperature and poured into 1 l of water. The product is extracted with ethyl acetate, and the organic phase is washed with water until neutral, evaporated and dried at 100° C. in a high vacuum, giving the product of the formula

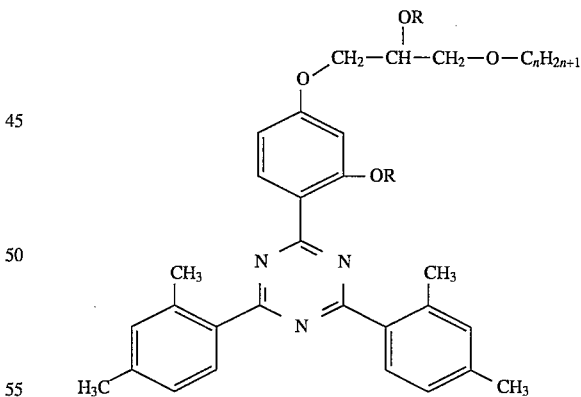

in which R is acetyl and n is 12 or 13, as a yellow resin of refractive index $n_D^{40}$=1.5638; mass spectrum M⁺=723 and 737.

A9) 9.8 g (0.03 mol) of 2-(2'-hydroxyphenyl)-4,6-diphenyl-1,3,5-triazine are stirred for 2 hours at 100° C. with 0.5 g (0.004 mol) of dimethylaminopyridine in 100 ml of acetic anhydride. The reaction mixture is cooled to room temperature and poured into 1 l of water. The product precipitates in crystalline form and is filtered, washed with water and subsequently recrystallized from acetonitrile, giving the compound

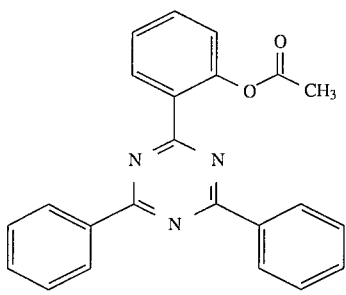

as a white product of melting point 142°–143° C.

Elemental analysis:

| Calculated: | % C | 75.19 | found: | % C | 75.04 | 75.07 |
|---|---|---|---|---|---|---|
| | % H | 4.66 | | % H | 4.76 | 4.76 |
| | % N | 11.44 | | % N | 11.58 | 11.63 |

A10) 13.0 g (0.04 mol) of 2-(2'-hydroxyphenyl)-4,6-diphenyl-1,3,5-triazine are stirred for hours at room temperature with 0.5 g (0.004 mol) of dimethylaminopyridine in 100 ml of trifluoroacetic anhydride. 500 ml of acetonitrile are added to the reaction mixture, and the product is filtered off and dried, giving the compound

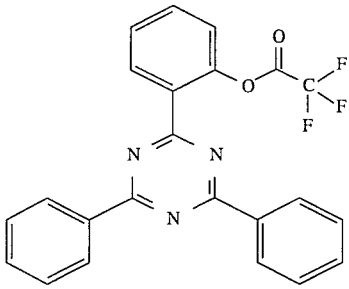

as a white product of melting point 121°–123° C.

Elemental analysis:

| calculated: | % C | 65.56 | found: | % C | 65.24 | 65.38 |
|---|---|---|---|---|---|---|
| | % H | 3.35 | | % H | 3.45 | 3.56 |
| | % N | 9.97 | | % N | 9.90 | 9.84 |

A11) 21.3 g (0.05 mol) of 2-(2-hydroxy-4-hexyloxyphenyl)-4,6-diphenyl-1,3,5-triazine are dissolved in 200 ml of toluene, 10.0 g (0.25 mol) of sodium hydroxide are dissolved in 10 ml of water and added to the solution together with 1.7 g (0.005 mol) of tetrabutylammonium hydrogensulfate. A solution of 7.9 g (0.055 mol) of benzoyl chloride in 7.5 ml of toluene is then added dropwise with vigorous stirring. Towards the end of the dropwise addition, a white precipitate forms. The reaction mixture is diluted with toluene and poured into 2 l of water, whereupon the product precipitates. The precipitate is filtered off, washed with water, dried in a vacuum cabinet and recrystallized from methyl ethyl ketone, giving the compound

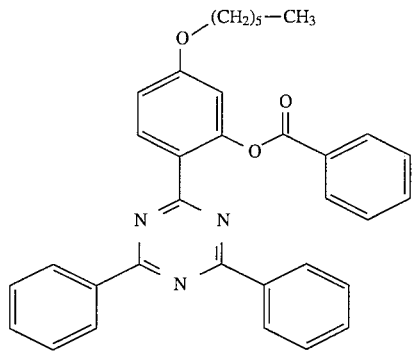

as a white product of melting point 166°–168° C.

Elemental analysis:

| calculated: | % C | 77.10 | found: | % C | 77.07 | 77.03 |
|---|---|---|---|---|---|---|
| | % H | 5.90 | | % H | 5.98 | 5.93 |
| | % N | 7.93 | | % N | 7.95 | 7.93 |

A12) 42.5 g (0.1 mol) of 2-(2-hydroxy-4-hexyloxyphenyl-4,6-diphenyl-1,3,5-triazine are stirred for 2 hours at 100° C. with 1.0 g of dimethylaminopyridine and 200 ml of acetic anhydride. The reaction mixture is poured into 1 l of water. The white precipitate is filtered off, washed with water, dried in a vacuum cabinet and recrystallized from acetonitrile, giving the compound

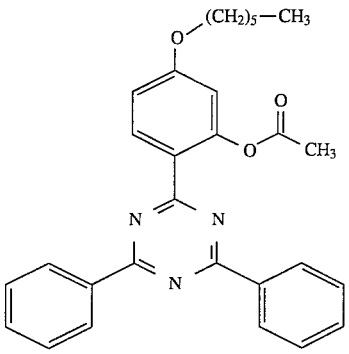

as a white product of melting point 129°–131° C.

Elemental analysis:

| calculated: | % C | 74.50 | found: | % C | 74.43 | 74.40 |
|---|---|---|---|---|---|---|
| | % H | 6.25 | | % H | 6.26 | 6.24 |
| | % N | 8.99 | | % N | 9.11 | 9.08 |

A13) 19.2 g (0.02 mol) of 1,12-bis[3-hydroxy-4-(4,6-dimethylphenyl-1,3,5-triazinyl)-phenoxy]dodecane are stirred for 16 hours at 100° C. with 0.5 g (0.004 mol) of dimethylaminopyridine and 150 ml of acetic anhydride. The reaction mixture is poured into 1 l of water, and the precipitate is filtered off, washed with water, dried in a vacuum cabinet and recrystallized from xylene, giving the compound

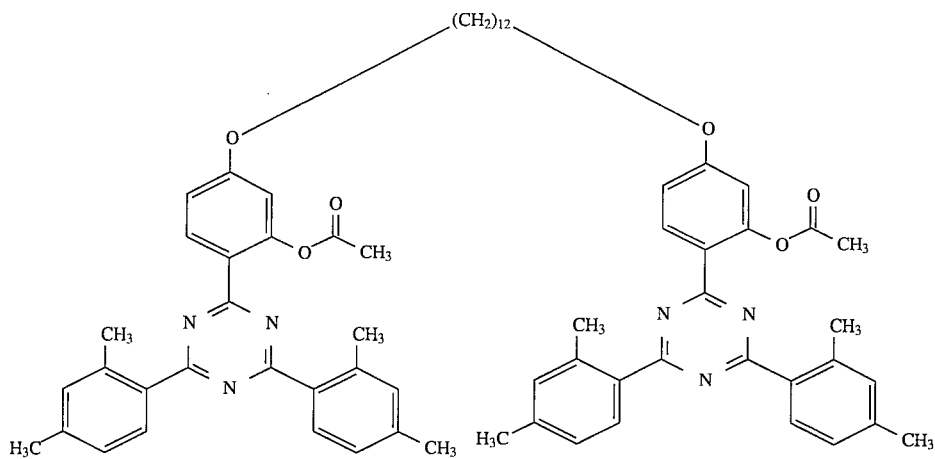

as a white product of melting point 182°–184° C.

Elemental analysis:

| | | | | | | |
|---|---|---|---|---|---|---|
| calculated: | % C | 75.83 | found: | % C | 76.03 | 75.93 |
| | % H | 6.94 | | % H | 7.02 | 7.01 |
| | % N | 8.04 | | % N | 8.14 | |

A14) 32.0 g (0.05 mol) of a mixture of the compounds 1-[2-hydroxy-4(3-dodecyloxy-2-hydroxypropoxy)phenyl]-4,6-bis(2,4-dimethylphenyl)-1,3,5-triazine and 1-[2-hydroxy-4(3-tridecyloxy-2-hydroxypropoxy)phenyl]-4,6-bis(2,4-dimethylphenyl)-1,3,5-triazine are dissolved in 200 ml of toluene at 40° C. 10.0 g (0.25 mol) of sodium hydroxide are dissolved in 10 ml of water and added to the solution together with 1.7 g (0.005 mol) of tetrabutylammonium hydrogensulfate. 7.9 g (0.055 mol) of benzoyl chloride in 7.5 ml of toluene are added dropwise with vigorous stirring. The reaction is slightly exothermic. The white emulsion is poured into 2 l of water, and the organic phase is washed with water until neutral, dried over sodium sulfate, evaporated and dried in a high vacuum, giving a mixture of the compounds

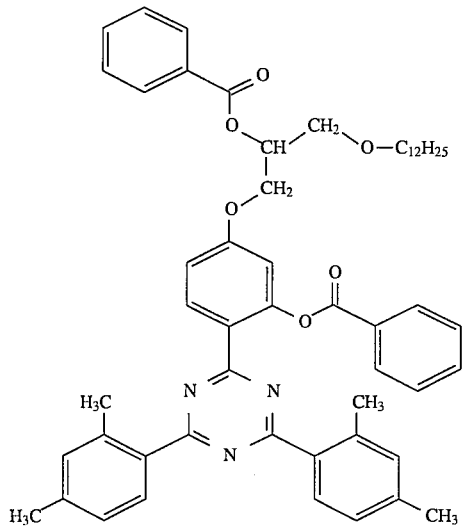

and

-continued

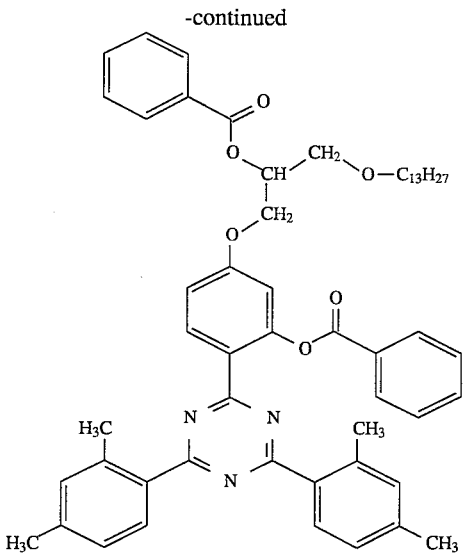

as a yellow oil.

Mass spectrum: $M_1^+=847$ $M_2^+=861$

A15) 20.4 g (0.05 mol) of 2-(4-chlorophenyl)-4,6-bis(2,4-dihydroxyphenyl)-1,3,5-triazine are suspended in 299 ml of ethyl acetate together with 30.3 g (0.3 mol) of triethylamine. 29.5 g (0.21 mol) of benzoyl chloride are added dropwise at room temperature. The mixture is subsequently stirred at 40° C. for 20 hours. The reaction mixture is diluted with a little toluene and washed with water. The organic phase is dried over sodium sulfate and evaporated. The partially crystalline residue is recrystallized from acetonitrile, giving the compound

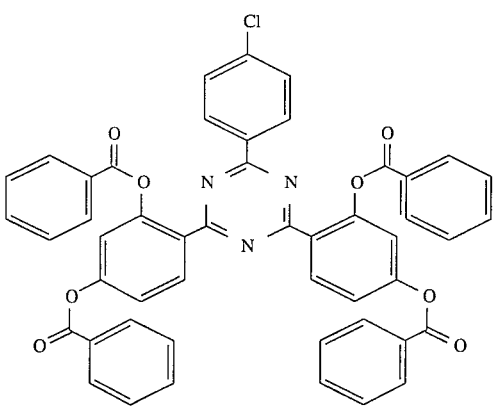

as a white product of melting point 149°–152° C.

Elemental analysis:

| | | | | | |
|---|---|---|---|---|---|
| calculated: | % C | 71.40 | found: | % C | 71.17 |
| | % H | 3.66 | | % H | 3.71 |
| | % N | 5.09 | | % N | 5.17 |
| | % Cl | 4.30 | | % Cl | 4.59 |

A16) 18.6 g (0.05 mol) of 2-phenyl-4,6-bis(2,4-dihydroxyphenyl)-1,3,5-triazine and 42 ml (0.3 mol) of triethylamine are introduced into 250 ml of ethyl acetate at room temperature. 30.9 g (0.22 mol) of benzoyl chloride are added dropwise at this temperature. The white suspension is stirred at 50° C. for 20 hours. The white precipitate is then filtered off, the pale yellow flitrate is evaporated, and the partially crystalline residue is recrystallized from acetonitrile, giving the compound

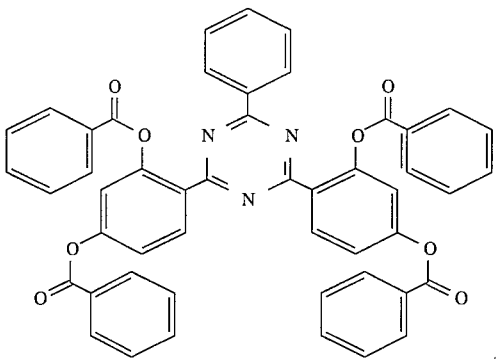

as a white product of melting point 152°–155° C.

Elemental analysis:

| | | | | | |
|---|---|---|---|---|---|
| calculated: | % C | 74.51 | found: | % C | 73.86 |
| | % H | 3.95 | | % H | 4.18 |
| | % N | 5.32 | | % N | 5.25 |

A17) A suspension of 9.7 g (0.022 mol) of 2-(2-hydroxy-4-methoxy-5-hexylphenyl)-4,6-bisphenyl-1,3,5-triazine in 70 ml of dry toluene is heated at 50° C. under nitrogen. After 30 minutes, 1.9 g (0.033 mol) of KOH and 1.1 g (0.0033 mol) of tetrabutylammonium hydrogensulfate are added, and the mixture is heated to reflux. 4 g (0.033 mol) of allyl bromide are subsequently added dropwise over the course of 30 minutes. After 19 hours, the mixture is filtered, the flitrate is washed with water, and the organic phase is dried over MgSO$_4$ and evaporated. The crude product is chromatographed over silica gel using a mixture of toluene/petroleum ether in the ratio 1:1, giving the product of the formula

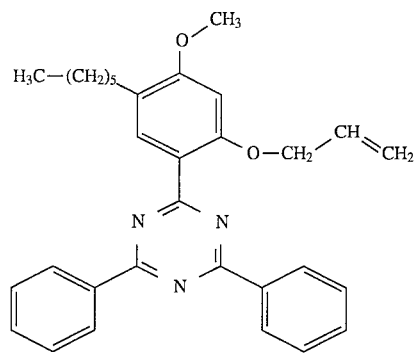

of melting point 90°–92° C.

A18) 28.3 g (0.060 mol) of 2-(2-hydroxy-4-(2-hydroxy-3-butoxypropoxy)phenyl)-4,6-diphenyl-1,3,5-triazine in 100 ml of toluene are heated at 50° C. for 30 minutes under nitrogen. 5.0 g (0.090 mol) of KOH and 2.0 g (0.006 mol) of tetrabutylammonium hydrogensulfate are added, and the mixture is heated to reflux. 10.9 g (0.090 mol) of allyl bromide are subsequently added dropwise over the course of 30 minutes. After 23 hours, a further 1.7 g (0.030 mol) of KOH and 3.6 g (0.030 mol) of allyl bromide are added, and the mixture is refluxed for a further 6 hours. The organic phase is subsequently washed with water, dried over MgSO$_4$ and evaporated. The crude product is chromatographed over silica gel, with elution with toluene, with toluene containing 10% of ethyl acetate and finally with toluene containing 20% of ethyl acetate, giving the product of the formula

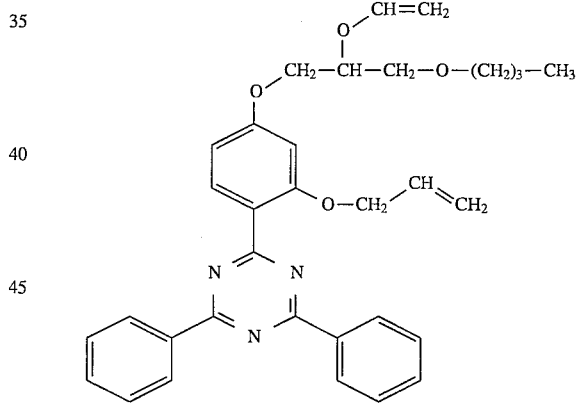

as a viscous oil.

Elemental analysis:

| | | | | | |
|---|---|---|---|---|---|
| calculated: | % C | 74.02 | found: | % C | 74.59 |
| | % H | 6.76 | | % H | 6.74 |
| | % N | 7.62 | | % N | 7.31 |

A19) A suspension of 170.2 g (0.400 mol) of 2-(2-hydroxy-4-hexyloxyphenyl)-4,6-bisphenyl-1,3,5-triazine in 750 ml of dry toluene is heated at 50° C. under nitrogen. After 30 minutes, 33.7 g (0.600 mol) of KOH and 12.9 g (0.038 mol) of tetrabutylammonium hydrogensulfate are added, and the mixture is heated to reflux. 72.5 g (0.600 mol) of allyl bromide are subsequently added dropwise over the course of 60 minutes. After 19 hours, the mixture is filtered, the flitrate is washed with water, and the organic phase is dried over MgSO₄ and evaporated. Recrystallization from Ethylcellosolve gives the product of the formula

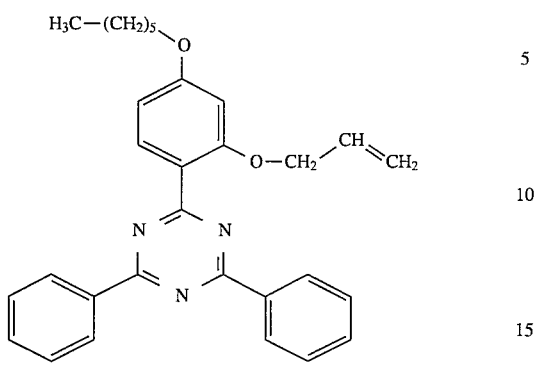

of melting point 78°–80° C.

A20) A suspension of 85.1 g (0.200 mol) of 2-(2-hydroxy-4-hexyloxyphenyl)-4,6-bisphenyl-1,3,5-triazine in 500 ml of dry toluene is heated to 50° C. under nitrogen. After 30 minutes, 11.2 g (0.200 mol) of KOH and 6.8 g (0.020 mol) of tetrabutylammonium hydrogensulfate are added, and the mixture is refluxed for 1 hour. 10 ml (0.095 mol) of 3-chloro-2-chloromethyl-1-propene are subsequently added dropwise over the course of 60 minutes. After 53 hours, the mixture is filtered, the filtrate is washed with water, and the organic phase is dried over MgSO₄ and evaporated. Recrystallization from toluene gives the product of the formula

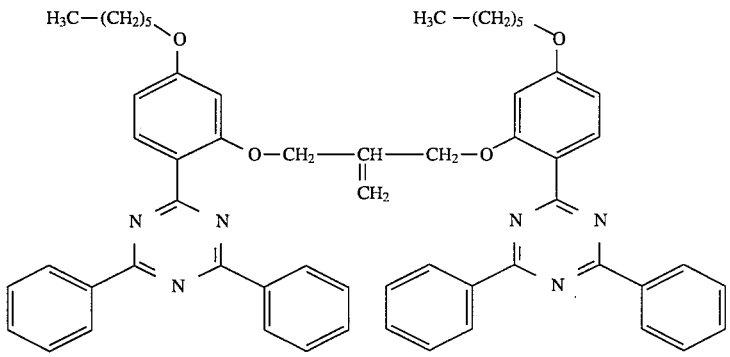

of melting point 149°–150° C.

A21) Firstly 11.13 g (0.110 mol) of triethylamine and subsequently, over the course of 5 minutes, 11.94 g (0.11 mol) of ethyl chloroformate in 100 ml of dry THF are added, under nitrogen, to a suspension of 34.14 g (0.100 mol) of 2-(2,4-dihydroxyphenyl)-4,6-bisphenyl-1,3,5-triazine in 200 ml of dry tetrahydrofuran (THF). The mixture is heated at 40° C. for 3 hours with stirring and subsequently filtered. The solvent is removed from the filtrate, and the residue is dissolved in dichloromethane. The solution is washed with water, dried over MgSO₄ and re-evaporated. The crude product is chromatographed over silica gel using a mixture of toluene/petroleum ether in a ratio of 1:1, giving the product of the formula

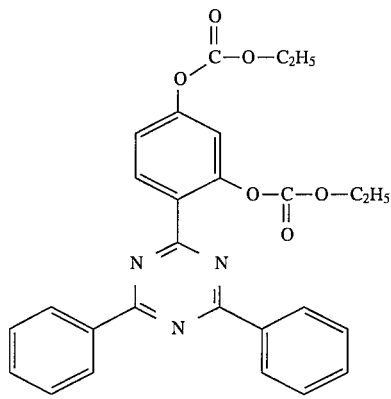

Elemental analysis:

| calculated: | %C | 66.80 | found: | % C | 66.77 |
|---|---|---|---|---|---|
| | %H | 4.78 | | % H | 4.88 |
| | %N | 8.66 | | % N | 8.70 |

A22) A mixture of 25.5 g (0.05 mol) of 2-(2-hydroxy-4-octyloxyphenyl)-4,6-bis(2,4-dimethylphenyl)-1,3,5-triazine, 13.9 g (0.09 mol) of tert-butyldimethylchlorosilane and 12.3 g (0.18 mol) of imidazole in 250 ml of dimethylacetamide is stirred at 70° C. for 40 hours. The mixture is subsequently cooled to 20°–25° C. and filtered, and the filtrate is chromatographed using petroleum ether containing 3% of ethyl acetate. Crystallization gives the compound of the formula

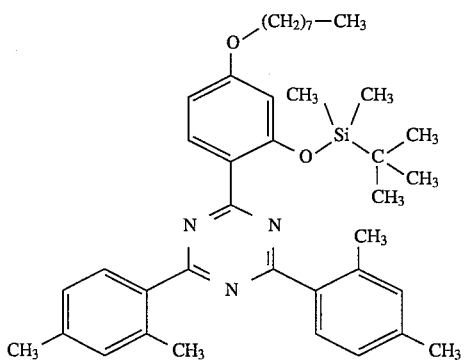

of melting point 68°–70° C.

A23) A mixture of 7.9 g (0.055 mol) of benzoyl chloride and 7.5 ml of toluene is added dropwise with stirring over the course of 15 minutes at 40° C. to a mixture of 25.5 g (0.05 mol) of 2-(2-hydroxy-4-octyloxyphenyl)-4,6-bis(2,4-dimethylphenyl)-1,3,5-triazine, 10.0 g (0.25 mol) of sodium hydroxide, 10 ml of water and 1.7 g (0.005 mol) of tetrabutylammonium hydrogensulfate in 200 ml of toluene. The reaction mixture is heated at 40° C. for 45 minutes and then poured into 2 l of water. Extraction with toluene, washing of the organic phase with water until neutral, evaporation and recrystallization from acetonitrile give the product of the formula

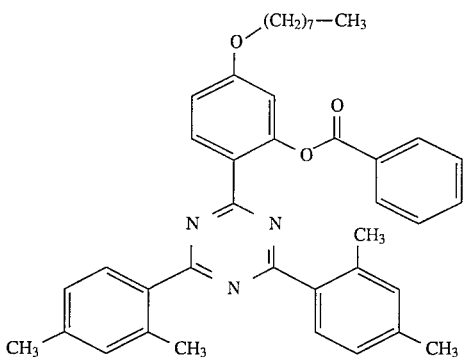

of melting point 99°–101° C.

Intermediates for example A24 and A25: Compounds (a)–(c)

a) 2-Mesityl-4,6-dichloro-1,3,5-triazine A solution of 109.5 g (0.55 mol) of 2-bromomesitylene (purity 98%) in 150 ml of abs. THF (purity 99.5%) is added over the course of 1½ hours under nitrogen to a stirred suspension, held at 60° C., of 14.6 g (0.60 mol) of magnesium turnings (purity 99.8%) in 100 ml of abs. THF to which an iodine crystal has been added. Tile mixture is subsequently held at the reflux temperature (68° C.) for 30 minutes. After the mixture has been cooled, the resultant Grignard reagent is transferred into a dropping funnel and added dropwise to a solution of 96.0 g (0.52 mol) of cyanuric chloride (98%) in 270 ml of THF. During the addition, which takes 1½ hours, a temperature of from 15° to 30° C. is maintained by cooling. The mixture is subsequently stirred at 25° C. for 2 hours, and then poured into 2 l of an ice/water mixture containing 80 ml of 32% HCl (0.81 mol). The mixture is stirred for 1 hour and filtered. The filter cake is suspended in 1000 ml of water, and the suspension is stirred for 30 minutes and re-filtered. This operation is repeated twice. The filter cake is dried over $P_2O_5$ for 24 hours at 25° C. and a pressure of 60 mmHg (8000 Pa). 171.0 g of crude product are subsequently dissolved in toluene, filtered while hot and crystallized by addition of hexane and cooling to 0° C. Filtration and drying give 82.8 g of the title product (a)

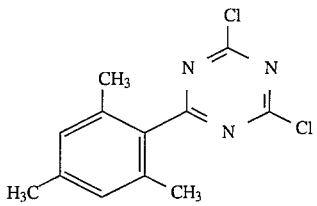 (a)

of melting point 85°–91° C.

b) 2-Mesityl-4,6-bis(2,4-dihydroxyphenyl)-1,3,5-triazine 148.7 g (1.21 mol) of anhydrous aluminium trichloride (purity 98%) are added with stirring to a suspension of 130.0 g (0.485 mol) of 2-mesityl-4,6-dichloro-1,3,5-triazine (a) in 300 ml of petroleum ether (110°–140° C.) and 385 ml of sulfolane. During this addition, the mixture warms to 45° C. A solution of 133.5 g (1.21 mol) of resorcinol (purity 98%) in 155 mol of sulfolane is added over the course of 45 minutes. The mixture is warmed at 80°–85° C. for 5 hours 30 minutes with evolution of HCl. The upper phase (petroleum ether) is removed, and the lower, viscous phase is transferred while hot into a stirred mixture of 2.1 l of methanol and 2.1 l of water. After the mixture has been stirred for 14 hours, the solid is filtered off, stirred for 1 hour in 2.2 l of 1 molar HCl and filtered off again. The filter cake is suspended in 1000 ml of water, and the suspension is stirred for 30 minutes and re-filtered. This operation is repeated twice. The filter cake is dried for 24 hours at 80° C. and a pressure of 60 mmHg (8000 Pa), giving 170.5 g of the title product (b) of the formula

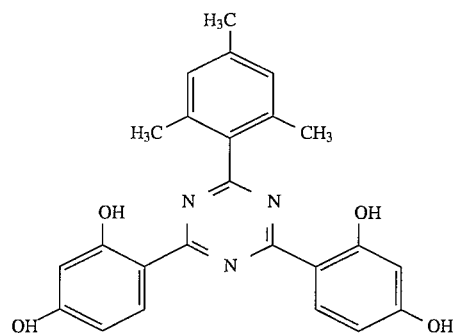

of melting point 230°–234° C.

c) 2-Mesityl-4,6-bis(2-hydroxy-4-[3-n-butoxy-2-hydroxypropoxy]phenyl)-1,3,5-triazine A mixture of 20.0 g (0.048 mol) of 2-mesityl-4,6-bis(2,4-dihydroxyphenyl)-1,3,5-triazine (b), 13.8 g (0.105 mol) of n-butyl glycidyl ether (purity 95%) and 1.8 g (4.8 mmol) of ethyltriphenylphosphonium bromide (purity 97%) in 100 ml of mesitylene (purity 99%) is stirred at 140° C. under nitrogen for 21 hours. Decantation and evaporation of the remaining solvent gives 41.2 g of crude product. This is dissolved in 100 ml of ethyl acetate and filtered through a 10.5 cm bed of silica gel 60 (230–400 mesh) of diameter 7.5 cm, with elution with 3 l of ethyl acetate/hexane (1:1 mixture). The 34.0 g of solid obtained after removal of the solvent are re-dissolved in 25 ml of ethyl acetate. 250 ml of hexane are added to the viscous solution. The mixture is stirred at 0° C. for 2 hours and filtered, and the solid is dried for 24 hours at 80° C. and a pressure of 60 mmHg (8000 Pa), giving 23.0 g of the title product (c) of the formula

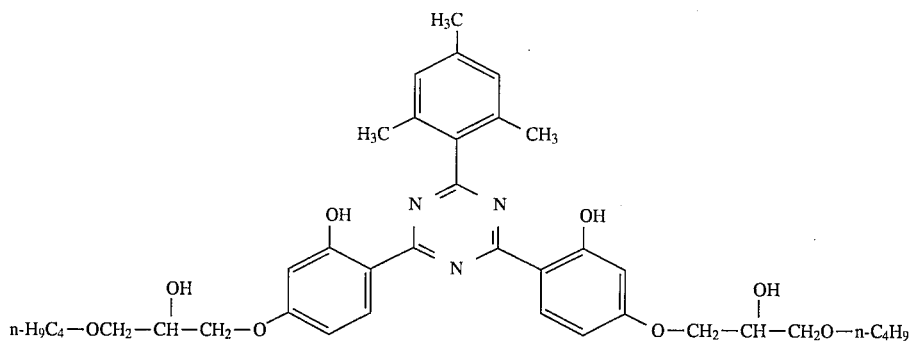

of melting point 125°–131° C.

A24) 2-Mesityl-4,6-bis(2,4-diacetoxyphenyl)-1,3,5-triazine A mixture of 20.8 g (0.050 mol) of 2-mesityl-4,6-bis(2,4-dihydroxyphenyl)-1,3,5-triazine (b), 0.5 g (0.004 mol) of 4-dimethylaminopyridine (DMAP, Fluka, 98%) and 150 ml (162.0 g, 1.59 mol) of acetic anhydride (Fluka, 99.5%) is stirred at 110° C. for 16 hours under nitrogen. After cooling, the mixture is poured into 1000 ml of water and stirred for 1 hour at 25° C., and the solid is filtered off. The crude product is washed with 100 ml of water and dried for 14 hours at 65° C./8 kPa. Recrystallization from a mixture of 2 parts by volume of toluene and one part by volume of hexane gives the product of the formula

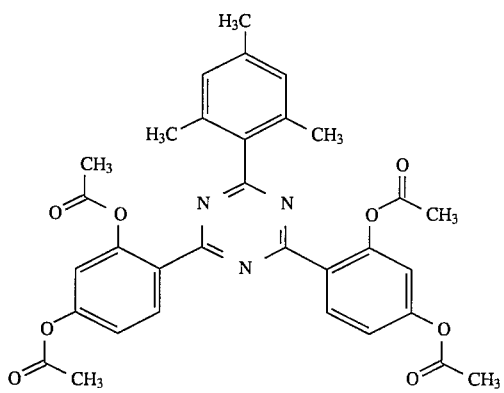

of melting point 160°–162° C.

A25) 2-Mesityl-4,6-bis[2-acetoxy-4-(2-acetoxy-3-n-butoxypropoxy)phenyl]-1,3,5-triazine A mixture of 30.4 g (0.045 mol) of 2-mesityl-4,6-bis(2-hydroxy-4-[3-n-butoxy-2-hydroxy-propoxy]-phenyl)-1,3,5-triazine (c), 0.6 g (0.0045 mol) of 4-dimethylaminopyridine (DMAP, Fluka, 98%) and 150 ml (162.0 g, 1.59 mol) of acetic anhydride (Fluka, 99.5%) is stirred at 110° C. for 17 hours under nitrogen. After cooling, the mixture is poured into 1000 ml of water, stirred for 3 hours at 25° C. and subsequently extracted with 500 ml of ethyl acetate. The organic phase is washed with 200 ml of aqueous NaCl, dried over MgSO$_4$ and chromatographed through a bed of silica gel 60 (230–400 mesh, depth 4 cm, diameter 6.5 cm) and eluted with ethyl acetate. Removal of the solvent and drying for 3 hours at 100° C./13 Pa gives the title product of the formula

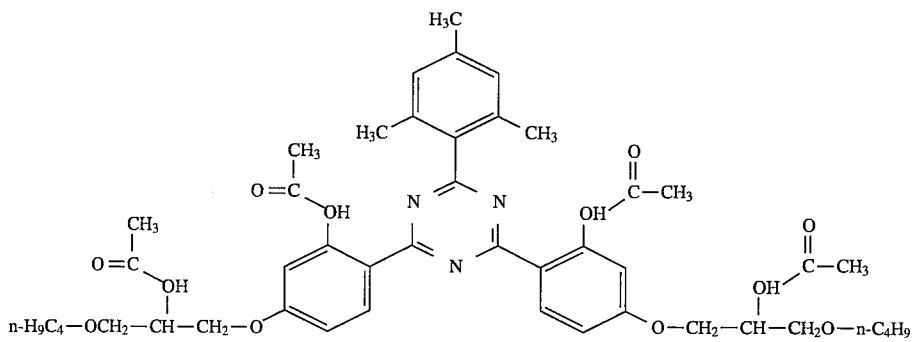

as a yellowish resin. UV (ethyl acetate): ε(max. 302 nm)= 50400.

A26) Use of 2,4,6-tris-(2-hydroxyphenyl)-1,3,5-triazine instead of 2,4,6-tris-(2,4-dihydroxyphenyl)-1,3,5-triazine in the preparation process of Example A3) gives a product of the formula of melting point 147°–149° C.

B. USE EXAMPLES

Example B1: Stabilization of a 2-coat metal-effect finish
The compound to be tested is incorporated into 5–10 g of xylene and tested in a varnish of the following composition:

| | |
|---|---|
| Synthacryl ® SC 303[1] | 27.51 |
| Synthacryl ® SC 370[2] | 23.34 |
| Maprenal ® MF 650[3] | 27.29 |
| Butyl acetate/butanol (37/8) | 4.33 |
| Solvesso ® 150[4] | 2.72 |
| Crystal oil K-30[5] | 8.74 |
| Flow-control agent Baysilon ® MA[6] | 1.20 |
| | 100.00 g |

[1] Acrylate resin, Hoechst AG; 65% solution in xylene/butanol 26:9
[2] Acrylate resin, Hoechst AG; 75% solution in Solvesso ® 100[4]
[3] Melamine resin, Hoechst AG; 55% solution in isobutanol
[4] Aromatic hydrocarbon mixture, boiling range 182–203° C. (Solvesso ® 150) or 161–178° C. (Solvesso ® 100); manufacturer: ESSO
[5] Aliphatic hydrocarbon mixture, boiling range 145–200° C.; manufacturer: Shell
[6] 1% in Solvesso ® 150[4]; manufacturer: Bayer AG The varnish is mixed with 2% of the compound to be tested, based on the solid content of the varnish. Some further varnish samples which, in addition to the novel compound, contain 0.7% of the compound

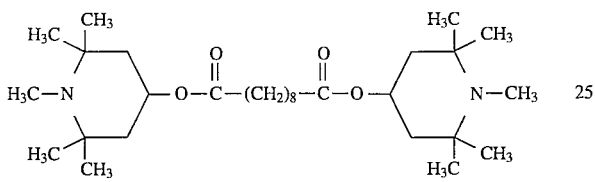

(compound B), based on the solids content of the varnish, are produced. The comparison is a varnish containing no light stabilizer.

The varnish is thinned to spray consistency using Solvesso® 100 and sprayed onto a prepared aluminium sheet (coil coat, filler, pale-green metallic basecoat) and baked for 30 minutes at 130° C., giving a dry film thickness of 40–50 μm of varnish. The samples are then weathered in a UVCON® weathering unit from Atlas Corp. (UVB-313 lamps) in a cycle of UV irradiation at 70° C. for 8 hours and condensation at 50° C. for 4 hours.

The surface gloss (20° gloss according to DIN 67530) of the samples is measured at regular intervals. The results are shown in the table below.

TABLE

20° gloss according to DIN 67530 before and after weathering

| Stabilizer (Comp. from Example) | 20° gloss after | | | | | | |
|---|---|---|---|---|---|---|---|
| | 0 | 400 | 800 | 1200 | 1600 | 2000 | h weathering |
| none | 87 | 84 | 46 | | | | |
| A5 | 89 | 91 | 84 | | | | |
| A6 | 89 | 91 | 89 | | | | |
| A7 | 88 | 91 | 88 | | | | |
| A8 | 87 | 91 | 89 | 78 | | | |
| A26 | 89 | 91 | 90 | 87 | | | |
| A1 | 88 | 91 | 90 | 77 | | | |
| A5 + B | 87 | 90 | 89 | 77 | 88 | 84 | |
| A6 + B | 88 | 91 | 90 | 74 | 87 | 69 | |
| A7 + B | 88 | 91 | 90 | 75 | 88 | 58 | |
| A8 + B | 88 | 85 | 89 | 83 | 87 | 65 | |
| A26 + B | 88 | 90 | 90 | 88 | 85 | 81 | |
| A1 + B | 88 | 91 | 90 | 89 | 86 | 75 | |

The samples stabilized in accordance with the invention have better weathering stability (gloss retention, cracking resistance) than the unstabilized comparison sample.

What is claimed is:
1. A composition comprising
A) an organic material which is sensitive to damage by light, oxygen and/or heat and
B) a sufficient stabilizing amount of a compound of the formula I

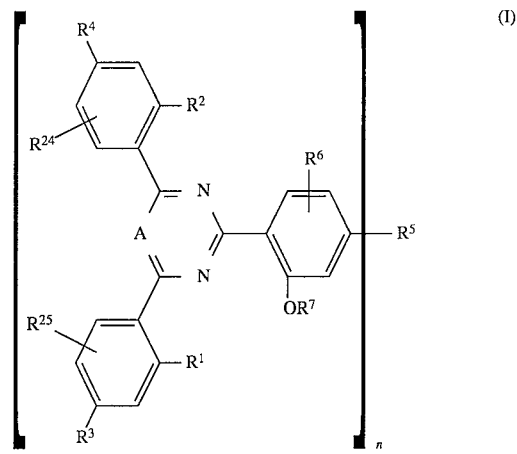

in which n is 1 or 2;

A is CH or a nitrogen atom;

$R^1$ and $R^2$, independently of one another, are H, $C_1$–$C_{12}$alkyl, $C_5$–$C_{12}$cycloalkyl, trifluoromethyl or $OR^7$;

$R^3$ and $R^4$, independently of one another, are H, $C_1$–$C_{12}$alkyl, $C_5$–$C_{12}$cycloalkyl, $OR^{17}$, phenyl, CN, halogen or $OR^7$;

$R^5$, in the case where n=1, is as a monovalent radical $C_6$–$C_{18}$alkyl, $C_1$–$C_{18}$alkoxy, halogen, —O—CO—$R^{12}$, —O—$SO_2$—$R^{13}$,

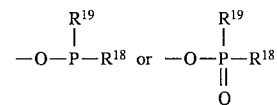

or $R^5$, in the case where n=1, is as defined for $R^{17}$ or is —O—$R^{17}$, and $R^5$ as a monovalent radical in the case where neither of the radicals $R^1$ and $R^2$ is $OR^7$ also comprises H or $C_1$–$C_5$alkyl;

$R^5$, in the case where n=2, is as a divalent radical —O—G—O—, where G is $C_2$–$C_{16}$alkylene, $C_4$–$C_{12}$alkenylene, xylylene or $C_3$–$C_{20}$alkylene which is interrupted by —O— and/or is substituted by $OR^7$, or G is one of the groups —$CH_2CH(OR^7)CH_2O$—$R^{20}$—$OCH_2CH(OR^7)CH_2$—, —CO—$R^{21}$—CO—, —CO—NH—$R^{22}$—NH—CO— and —$(CH_2)_m$—COO—$R^{23}$—OOC—$(CH_2)_m$—, in which m is an integer in the range from 1 to 3, or is

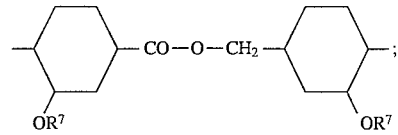

$R^6$ is H, $C_2$–$C_{18}$alkenyl, —X—$Z^3$, benzoyl which is unsubstituted or substituted on the phenyl ring by methyl, halogen, —CN or methoxy; or $R^6$ is halogen, —$SR^{14}$, $SOR^{13}$, —$SO_2R^{13}$, —$C(Z^3)$=N—$Z^3$, —$CH(Z^3)$—NH—$Z^3$, a radical of the formula

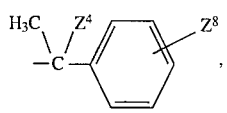

or a radical of the formula

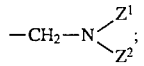

$R^7$ is —CO—$R^{11}$, —$SO_2$—$R^{13}$,

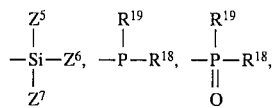

allyl or a group of the formula

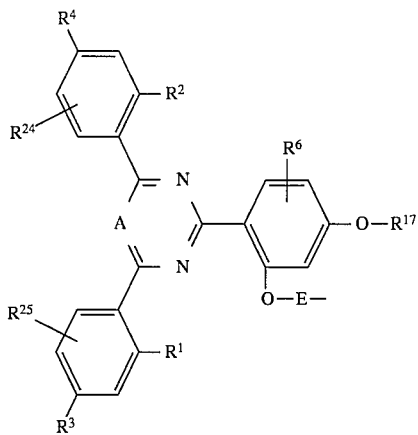

in which E is $C_3$–$C_{18}$alkylene or $C_4$–$C_{18}$alkenylene;
$R^8$ is $C_1$–$C_{18}$alkyl; $C_3$–$C_{18}$alkenyl; $C_3$–$C_{20}$alkyl which is interrupted by O, N or S and/or is substituted by $OR^7$; $C_1$–$C_4$alkyl which is substituted by —P(O)($OR^{14}$)$_2$, —N($R^9$)($R^{10}$), —$OCOR^{11}$ and/or $OR^7$; glycidyl; $C_5$–$C_{12}$cycloalkyl or $C_7$–$C_{11}$phenylalkyl; or a group of the formula

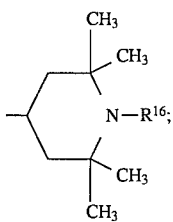

$R^9$ and $R^{10}$, independently of one another, are $C_1$–$C_{12}$alkyl, $C_3$–$C_{12}$alkoxyalkyl, $C_4$–$C_{16}$dialkylaminoalkyl or $C_5$–$C_{12}$cycloalkyl, or $R^9$ and $R^{10}$ together are $C_3$–$C_9$alkylene or -oxaalkylene or -azaalkylene;
$R^{11}$ is $C_1$–$C_{18}$alkyl, halogen-substituted $C_1$–$C_{18}$alkyl, $C_5$–$C_{12}$cycloalkyl, $C_2$–$C_{18}$alkenyl, —$CH_2$—CO—$CH_3$, $C_7$–$C_{12}$aralkyl, $C_1$–$C_{12}$alkoxy; or phenyl which is unsubstituted or substituted by $C_1$–$C_{12}$alkyl, $C_1$–$C_4$alkoxy, halogen and/or benzyl;
$R^{12}$ is $C_1$–$C_{18}$alkyl, halogen-substituted $C_1$–$C_{18}$alkyl, $C_5$–$C_{12}$cycloalkyl, $C_2$–$C_{18}$alkenyl, phenyl or —$R^{15}$—

O—CO—$R^{11}$, or is a group of the formula

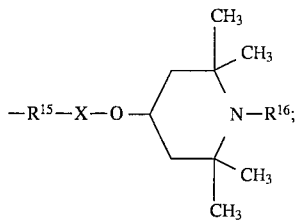

$R^{13}$ is $C_1$–$C_{12}$alkyl, $C_6$–$C_{10}$aryl, or $C_7$–$C_{18}$alkylaryl;
$R^{14}$ is $C_1$–$C_{12}$alkyl, phenyl or $C_7$–$C_{15}$phenylalkyl;
$R^{15}$ is $C_1$–$C_{18}$alkylene or $C_2$–$C_{18}$alkenylene;
$R^{16}$ is hydrogen, N-oxide, formyl, $C_2$–$C_8$alkanoyl, $C_1$–$C_8$alkyl, $C_1$–$C_{18}$alkoxy, $C_5$–$C_{12}$cycloalkyl, $C_5$–$C_{12}$cycloalkoxy, $C_7$–$C_{11}$phenylalkyl, $C_7$–$C_{11}$phenylalkyl which is substituted on the phenyl ring by 1 to 3 $C_1$–$C_4$alkyl or $C_1$–$C_8$alkanoyl radicals, or is $C_7$–$C_{11}$phenylalkoxy;
$R^{17}$ is $C_5$–$C_{18}$alkyloxycarbonyl, $C_2$–$C_{18}$alkenyl or $C_1$–$C_{18}$alkyl which is substituted by $OR^7$, $C_1$–$C_{18}$alkoxy, $C_5$–$C_{12}$cycloalkoxy, $C_2$–$C_{18}$alkanoyl, $C_2$–$C_8$alkenyloxy, halogen, —$COOR^8$, —$CONH_2$, —$CONHR^9$, —CON($R^9$)($R^{10}$), —$NHR^9$, —N($R^9$)($R^{10}$), —$NHCOR^{11}$, —CN, —$OCOR^{11}$, a group of the formula

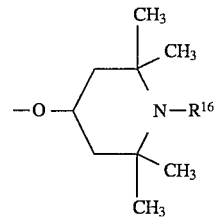

and/or phenoxy which is unsubstituted or substituted by $C_1$–$C_{18}$alkyl, $C_1$–$C_{18}$alkoxy or halogen, or $R^{17}$ is $C_3$–$C_{50}$alkyl which is interrupted by O or may be substituted by $OR^7$, or is glycidyl, $C_5$–$C_{12}$cycloalkyl, $C_5$–$C_{12}$cycloalkyl which is substituted by $OR^7$, $C_1$–$C_4$alkyl or —$OCOR^{11}$, or is $C_7$–$C_{11}$phenylalkyl which is unsubstituted or substituted by $OR^7$, Cl or $CH_3$;
$R^{18}$ and $R^{19}$, independently of one another, are $C_1$–$C_{12}$alkoxy, phenoxy, $C_1$–$C_{12}$alkyl, $C_5$–$C_{12}$cycloalkyl, benzyl, tolyl or phenyl;
$R^{20}$ is $C_2$–$C_{10}$alkylene, $C_4$–$C_{50}$alkylene which is interrupted by —O—, or $R^{20}$ is phenylene or a -phenylene-D-phenylene- group in which D is —O—, —S—, —$SO_2$—, —$CH_2$— or —C($CH_3$)$_2$—;
$R^{21}$ is $C_2$–$C_{10}$alkylene, $C_6$–$C_{12}$arylene, $C_2$–$C_6$alkenylene, or $C_2$–$C_{10}$alkylene which is interrupted by O or S;
$R^{22}$ is $C_2$–$C_{10}$alkylene, phenylene, tolylene, diphenylenemethane or

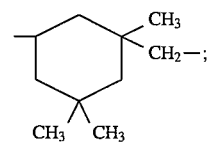

$R^{23}$ is $C_2$–$C_{10}$alkylene or $C_4$–$C_{20}$alkylene which is interrupted by —O—;

$R^{24}$ and $R^{25}$, independently of one another, are H, $C_1$–$C_{12}$alkyl, $C_2$–$C_6$alkenyl, $C_1$–$C_{12}$alkoxy, $C_3$–$C_{18}$alkenyloxy, halogen, trifluoromethyl, $C_7$–$C_{11}$phenylalkyl, phenyl, phenyl which is substituted by $C_1$–$C_{18}$alkyl, $C_1$–$C_{18}$alkoxy or halogen, or are phenoxy, or phenoxy which is substituted by $C_1$–$C_{18}$alkyl, $C_1$–$C_{18}$alkoxy or halogen;

X is a direct bond or —CO—;

$Z^1$ and $Z^2$, independently of one another, are $C_1$–$C_{12}$alkyl or together are $C_4$–$C_{10}$alkylene, which may be interrupted by an oxygen atom;

$Z^3$ is $C_1$–$C_{20}$alkyl or $C_7$–$C_{15}$phenylalkyl;

$Z^4$ and $Z^8$, independently of one another, are hydrogen or methyl; and $Z^5$, $Z^6$ and $Z^7$, independently of one another, are $C_1$–$C_{18}$alkyl, cyclohexyl, phenyl or $C_1$–$C_{18}$alkoxy.

2. A composition according to claim 1, in which, in the compound of the formula I, $R^1$ and $R^2$, independently of one another, are H, $C_1$–$C_{12}$alkyl, cyclohexyl, trifluoromethyl or $OR^7$;

$R^3$ and $R^4$, independently of one another, are H, $C_1$–$C_{12}$alkyl, cyclohexyl, $C_1$–$C_{18}$alkoxy, or $C_3$–$C_{18}$alkoxy which is interrupted by O and/or substituted by $OR^7$, or are halogen or $OR^7$;

$R^5$, in the case where n=1, is as a monovalent radical as defined for $R^{17}$ or is $C_6$–$C_{18}$alkyl, $C_1$–$C_{18}$alkoxy, halogen, —O—CO—$R^{12}$, —O—$SO_2$—$R^{13}$ or —O—$R^{17}$; and in the case where $R^1$ and $R^2$ are not $OR^7$, $R^5$ also comprises H, $C_1$–$C_5$alkyl;

$R^5$, in the case where n=2, is as a divalent radical —O—G—O—, where G is $C_2$–$C_{16}$alkylene, $C_4$–$C_{12}$alkenylene, xylylene, $C_3$–$C_{20}$alkylene which is interrupted by —O—, or G is one of the groups —$CH_2CH(OR^7)CH_2O$—$R^{20}$—$OCH_2CH(OR^7)CH_2$—, —CO—$R^{21}$—CO—, —CO—NH—$R^{22}$—NH—CO— or —$(CH_2)_m$—COO—$R^{23}$—OOC—$(CH_2)_m$—, in which m is an integer in the range from 1 to 3, or is

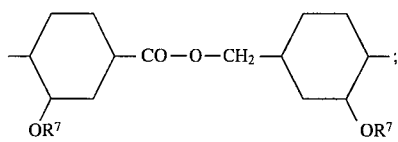

$R^6$ is in the o-position to $R^5$ and in the p-position to $OR^7$;

$R^9$ and $R^{10}$, independently of one another, are $C_1$–$C_{12}$alkyl, $C_3$–$C_{12}$alkoxyalkyl, $C_4$–$C_{16}$dialkylaminoalkyl or cyclohexyl, or $R^9$ and $R^{10}$ together are $C_3$–$C_9$alkylene, -oxaalkylene or -azaalkylene;

$R^{11}$ is $C_1$–$C_{18}$alkyl, trihalomethyl, $C_2$–$C_{18}$alkenyl, —$CH_2$—CO—$CH_3$, $C_7$–$C_{12}$aralkyl, $C_1$–$C_2$alkoxy, or phenyl which is unsubstituted or substituted by $C_1$–$C_{12}$alkyl, $C_1$–$C_4$alkoxy, halogen and/or benzyl;

$R^{17}$ is $C_5$–$C_{18}$alkoxycarbonyl or $C_2$–$C_{18}$alkenyl or is $C_1$–$C_{18}$alkyl which is substituted by $OR^7$, $C_1$–$C_{18}$alkoxy, $C_2$–$C_{18}$alkanoyl, $C_2$–$C_8$alkenyloxy, halogen, —$COOR^8$, —$CONH_2$, —$CONHR^9$, —$CON(R^9)(R^{10})$, —$NHR^9$, —$N(R^9)(R^{10})$, —NH-$COR^{11}$, —CN, —$OCOR^{11}$, a group of the formula

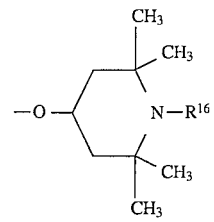

and/or phenoxy which is unsubstituted or substituted by $C_1$—$C_{18}$alkyl, $C_1$–$C_{18}$alkoxy, or halogen, or $R^{17}$ is $C_4$–$C_{20}$alkyl which is interrupted by O and may be substituted by $OR^7$, or is glycidyl, cyclohexyl, cyclohexyl which is substituted by $OR^7$, $C_1$–$C_4$alkyl or —$OCOR^{11}$, or $R^{17}$ is $C_7$–$C_{11}$phenylalkyl which is unsubstituted or substituted by Cl or $CH_3$;

$R^{18}$ and $R^{19}$, independently of one another, are $C_1$–$C_6$alkoxy, $C_1$–$C_4$alkyl, cyclohexyl, tolyl or phenyl;

$R^{24}$ and $R^{25}$, independently of one another, are H or $C_1$–$C_{12}$alkyl; and $Z^5$, $Z^6$ and $Z^7$, independently of one another, are $C_1$–$C_4$alkyl or $C_1$–$C_4$alkoxy.

3. A composition according to claim 1, in which, in the compound of the formula I, $R^1$ and $R^2$, independently of one another, are H, $C_1$–$C_4$alkyl or $OR^7$;

$R^3$ and $R^4$, independently of one another, are H, $C_1$–$C_4$alkyl, $C_1$–$C_8$alkoxy, $C_3$–$C_{12}$alkoxy which is interrupted by O and/or substituted by $OR^7$, or are halogen or $OR^7$;

$R^5$, in the case where n=1, is as a monovalent radical as defined for $R^{17}$ or is halogen, $C_6$–$C_{18}$alkyl, $C_1$–$C_{18}$alkoxy, —O—CO—$R^{12}$, —O—$SO_2$—$R^{13}$ or —O—$R^{17}$; and in the case where $R^1$ and $R^2$ are not $OR^7$, $R^5$ also comprises H, $C_1$–$C_5$alkyl;

$R^5$, in the case where n=2, is as a divalent radical —O—G—O—, where G is $C_2$–$C_{16}$alkylene, $C_4$–$C_{12}$alkenylene or xylylene, or G is one of the groups —$CH_2CH(OR^7)CH_2O$—$R^{20}$—$OCH_2CH(OR^7)CH_2$—, —CO—$R^{21}$—CO—, —CO—NH—$R^{22}$—NH—CO— or —$(CH_2)_m$—COO—$R^{23}$—OOC—$(CH_2)_m$—, in which m is an integer in the range from 1 to 3;

$R^6$ is H, allyl, $C_1$–$C_{10}$alkyl, acetyl or benzoyl;

$R^7$ is —CO—$R^{11}$, —$SO_2$—$R^{13}$,

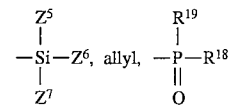

or a group of the formula

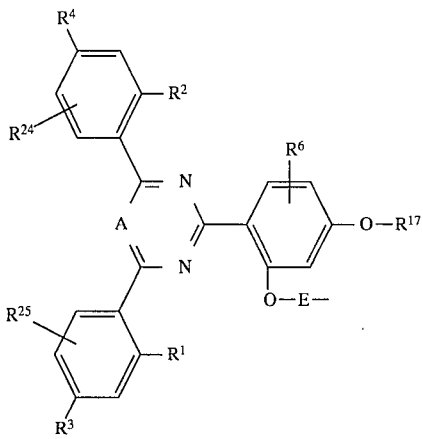

in which E is $C_3$–$C_{18}$alkylene or $C_4$–$C_{18}$alkenylene;

$R^8$ is $C_1$–$C_{18}$alkyl, $C_3$–$C_{18}$alkenyl, $C_3$–$C_{20}$alkyl which is interrupted by O, N or S and/or is substituted by $OR^7$, or is glycidyl or a group of the formula

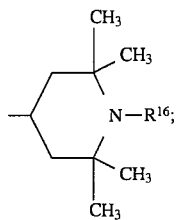

$R^9$ and $R^{10}$, independently of one another, are $C_1$–$C_{12}$alkyl or together are $C_4$–$C_9$alkylene, -oxaalkylene or -azaalkylene;

$R^{11}$ is $C_1$–$C_{12}$alkyl, trihalomethyl, $C_1$–$C_{12}$alkoxy, $C_2$–$C_4$alkenyl, phenyl, tolyl or xylyl;

$R^{12}$ is $C_1$–$C_{18}$alkyl, $C_2$–$C_{18}$alkenyl, phenyl, $-R^{15}-O-CO-C(CH_3)=CH_2$ or $-R^{15}-O-CO-CH=CH_2$, or a group of the formula

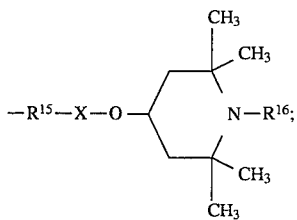

$R^{13}$ is phenyl or $C_7$–$C_{18}$alkylphenyl, $R^{15}$ is $C_2$–$C_{12}$alkylene;

$R^{16}$ is hydrogen, N-oxide, $C_2$–$C_8$alkanoyl, $C_1$–$C_{12}$alkyl, $C_1$–$C_{18}$alkoxy, cyclohexyl, $C_5$–$C_{12}$cycloalkoxy, $C_7$–$C_{11}$phenylalkyl or $C_7$–$C_{11}$phenylalkoxy;

$R^{17}$ is $C_3$–$C_{18}$alkenyl, or $C_1$–$C_{12}$alkyl which is substituted by $OR^7$, $C_1$–$C_{18}$alkoxy, $-COOR^8$, $-CONHR^9$, $-CON(R^9)(R^{10})$, $-OCOR^{11}$ and/or a group of the formula

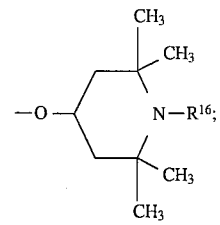

or $R^{17}$ is $C_4$–$C_{20}$alkyl which is interrupted by 1 to 6 O atoms and may be substituted by $OR^7$, or is glycidyl, $C_5$–$C_{12}$cycloalkyl or $C_7$–$C_{11}$phenylalkyl;

$R^{18}$ and $R^{19}$, independently of one another, are $C_1$–$C_4$alkoxy, methyl or phenyl;

$R^{20}$ is $C_2$–$C_{10}$alkylene, phenylene or a -phenylene-D-phenylene- group in which D is $-O-$, $-SO_2-$ or $-C(CH_3)_2-$;

$R^{21}$ is $C_2$–$C_{10}$alkylene, phenylene or $C_2$–$C_6$alkenylene;

$R^{22}$ is $C_2$–$C_{10}$alkylene or

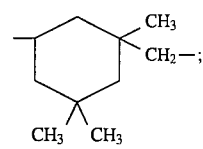

$R^{23}$ is $C_2$–$C_{10}$alkylene; and $R^{24}$ and $R^{25}$, independently of one another, are H or methyl.

4. A composition according to claim 3, in which, in the compound of the formula I, A is a nitrogen atom;

$R^6$ is in the o-position to $R^5$ and in the p-position to $OR^7$;

$R^7$ is $C_2$–$C_8$alkanoyl, benzoyl, phenylsulfonyl, $-CO-CF_3$, allyl,

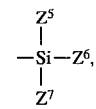

$C_7$–$C_9$alkylphenylsulfonyl or a group of the formula

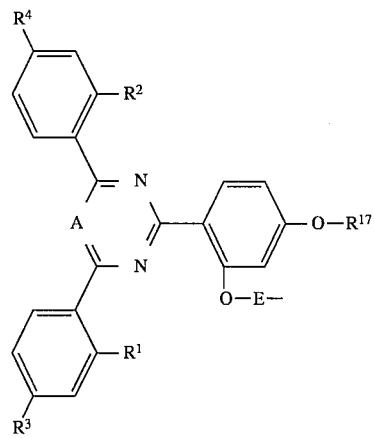

in which E is $C_3$–$C_6$alkylene or $C_4$–$C_6$alkenylene; and $Z^5$, $Z^6$ and $Z^7$, independently of one another, are $C_1$–$C_4$alkyl.

5. A composition according to claim 3, in which, in the compound of the formula I, $R^1$ and $R^2$, independently of one another, are H, $C_1$–$C_4$alkyl or $OR^7$;

$R^3$ and $R^4$, independently of one another, are H, $C_1$–$C_4$alkyl, $C_1$–$C_4$alkoxy, $C_3$–$C_{12}$alkoxy which is interrupted by O and substituted by $OR^7$, or are Cl or $OR^7$;

$R^5$, in the case where n=1, is —O—CO—$R^{12}$ or —O—$R^{17}$; and in the case where $R^1$ and $R^2$ are not $OR^7$, also comprises H;

$R^5$, in the case where n=2, is —O—G—O—, where G is $C_2$–$C_{16}$alkylene;

$R^6$ is H or $C_1$–$C_{10}$alkyl;

$R^8$ is $C_1$–$C_8$alkyl;

$R^{11}$ is $C_1$–$C_3$alkyl, trifluoromethyl, trichloromethyl, $C_1$–$C_4$alkoxy, $C_2$–$C_3$alkenyl, phenyl, tolyl or xylyl;

$R^{12}$ is $C_1$–$C_8$alkyl, or phenyl;

$R^{13}$ is phenyl or $C_7$–$C_9$alkylphenyl;

$R^{16}$ is hydrogen, N-oxide, $C_1$–$C_{12}$alkyl, $C_1$–$C_{18}$alkoxy, cyclohexyloxy or $C_7$–$C_{11}$phenylalkyl;

$R^{17}$ is $C_1$–$C_{18}$alkyl, allyl or $C_1$–$C_{12}$alkyl which is substituted by $OR^7$, $C_1$–$C_{18}$alkoxy, —$COOR^8$ and/or —$OCOR^{11}$.

6. A composition according to claim 1, comprising from 0.01 to 15 parts by weight of component B per 100 parts by weight of component A.

7. A composition according to claim 1, comprising, in addition to components A and B, another stabilizer or other additive.

8. A composition according to claim 7, comprising, in addition to components A and B, a light stabilizer of the sterically hindered amine, 2-(2-hydroxyphenyl)-1,3,5-triazine and/or 2-hydroxyphenyl-2H-benzotriazole type as component C.

9. A composition according to claim 1, wherein component A is a synthetic organic polymer.

10. A composition according to claim 1, wherein component A is a thermoplastic polymer, a binder for coatings or a photographic material.

11. A process for stabilizing organic material against damage by light, oxygen and/or heat, which comprises adding thereto, as stabilizer, a compound of the formula I according to claim 1.

12. A compound of the formula Ia

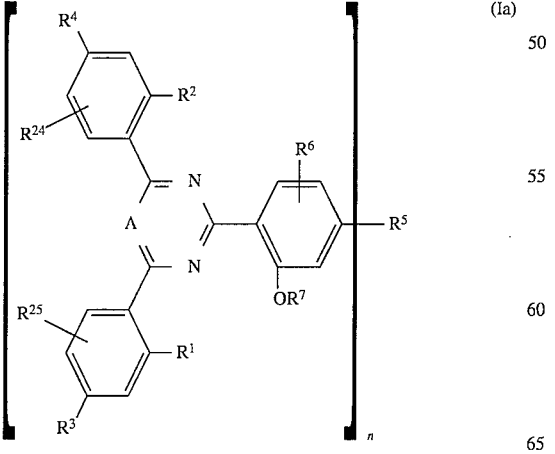

(Ia)

in which n is 1 or 2;

A is CH or a nitrogen atom;

$R^1$ and $R^2$, independently of one another, are H, $C_1$–$C_{12}$alkyl, $C_5$–$C_{12}$cycloalkyl, trifluoromethyl or $OR^7$;

$R^3$ and $R^4$, independently of one another, are H, $C_1$–$C_{12}$alkyl, $C_5$–$C_{12}$cycloalkyl, $OR^{17}$, halogen or $OR^7$;

$R^5$, in the case where n=1, is as a monovalent radical $C_6$–$C_{18}$alkyl, $C_1$–$C_{18}$alkoxy, halogen, —O—$SO_2$—$R^{13}$,

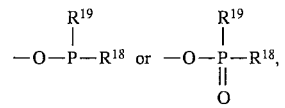

or $R^5$, in the case where n=1, is as defined for $R^{17}$ or is —O—$R^{17}$, and $R^5$ as a monovalent radical in the case where neither of the radicals $R^1$ and $R^2$ is $OR^7$ also comprises H, $C_1$–$C_5$alkyl;

$R^5$, in the case where n=2, is as a divalent radical —O—G—O—, where G is $C_2$–$C_{16}$alkylene, $C_4$–$C_{12}$alkenylene, xylylene or $C_3$–$C_{20}$alkylene which is interrupted by —O— and/or is substituted by $OR^7$, or G is one of the groups —$CH_2CH(OR^7)CH_2O$—$R^{20}$—$OCH_2CH(OR^7)CH_2$—, —CO—$R^{21}$—CO—, —CO—NH—$R^{22}$—NH—CO— and —$(CH_2)_m$—COO—$R^{23}$—OOC—$(CH_2)_m$—, in which m is an integer in the range from 1 to 3, or is

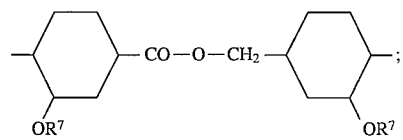

$R^6$ is H, $C_2$–$C_{18}$alkenyl, —X—$Z^3$, benzoyl which is unsubstituted or substituted on the phenyl ring by methyl, halogen, —CN or methoxy, or $R^6$ is halogen, —$SR^{14}$, —$SOR^{13}$, —$SO_2R^{13}$, —$C(Z^3)$=N—$Z^3$, —$CH(Z^3)$—NH—$Z^3$, a radical of the formula

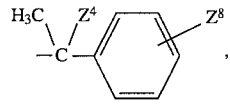

or a radical of the formula

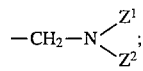

$R^7$ is —CO—$R^{11}$, —$SO_2$—$R^{13}$,

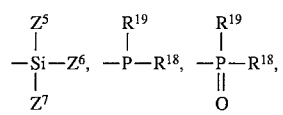

allyl or a group of the formula

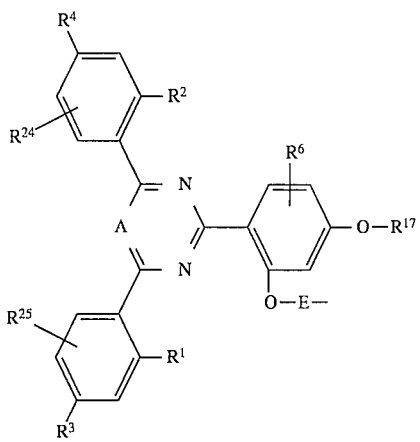

in which E is $C_3$–$C_{18}$alkylene or $C_4$–$C_{18}$alkenylene;

$R^8$ is $C_1$–$C_{18}$alkyl, $C_3$–$C_{18}$alkenyl, $C_3$–$C_{20}$alkyl which is interrupted by O, N or S and/or is substituted by $OR^7$, or $R^8$ is $C_1$–$C_4$alkyl which is substituted by —$P(O)(OR^{14})_2$, —$N(R^9)(R^{10})$, —$OCOR^{11}$ and/or $OR^7$, or $R^8$ is glycidyl, $C_5$–$C_{12}$cycloalkyl or $C_7$–$C_{11}$phenylalkyl, or a group of the formula

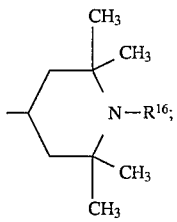

$R^9$ and $R^{10}$, independently of one another, are $C_1$–$C_{12}$alkyl, $C_3$–$C_{12}$alkoxyalkyl, $C_4$–$C_{16}$dialkylaminoalkyl or $C_5$–$C_{12}$cycloalkyl, or $R^9$ and $R^{10}$ together are $C_3$–$C_9$alkylene or -oxaalkylene or -azaalkylene;

$R^{11}$ is $C_1$–$C_{18}$alkyl, $C_5$–$C_{12}$cycloalkyl, halogen-substituted $C_1$–$C_{18}$alkyl, $C_2$–$C_{18}$alkenyl, —$CH_2$—CO—$CH_3$, $C_7$–$C_{12}$aralkyl, $C_1C_{12}$alkoxy, or phenyl which is unsubstituted or substituted by $C_1$–$C_{12}$alkyl, $C_1$–$C_4$alkoxy, halogen and/or benzyl;

$R^{13}$ is $C_1$–$C_{12}$alkyl, $C_6$–$C_{10}$aryl or $C_7$–$C_{18}$alkylaryl;

$R^{14}$ is $C_1$–$C_{12}$alkyl, phenyl or $C_7$–$C_{15}$phenylalkyl;

$R^{15}$ is $C_1$–$C_{18}$alkylene or $C_2$–$C_{18}$alkenylene;

$R^{16}$ is hydrogen, N-oxide, formyl, $C_2$–$C_8$alkanoyl, $C_1$–$C_{18}$alkyl, $C_1$–$C_{18}$alkoxy, $C_5$–$C_{12}$cycloalkyl, $C_5$–$C_{12}$cycloalkoxy, $C_7$–$C_{11}$phenylalkyl, $C_7$–$C_{11}$phenylalkyl which is substituted on the phenyl ring by 1 to 3 $C_1$–$C_4$alkyl or $C_1$–$C_8$alkanoyl radicals, or is $C_7$–$C_{11}$phenylalkoxy;

$R^{17}$ is $C_5$–$C_{18}$alkyloxycarbonyl, $C_2$–$C_{18}$alkenyl or $C_1$–$C_{18}$alkyl which is substituted by $OR^7$, $C_1$–$C_{18}$alkoxy, $C_5$–$C_{12}$cycloalkoxy, $C_2$–$C_{18}$alkanoyl, $C_2$–$C_8$alkenyloxy halogen, —$COOR^8$, —$CONH_2$, —$CONHR^9$, —$CON(R^9)(R^{10})$, —$NHR^9$, —$N(R^9)(R^{10})$, —$NHCOR^{11}$, —CN, —$OCOR^{11}$, a group of the formula

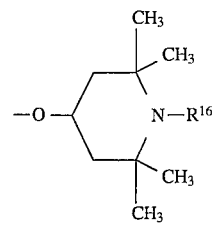

and/or phenoxy which is unsubstituted or substituted by $C_1$–$C_{18}$alkyl, $C_1$–$C_{18}$alkoxy or halogen, or $R^{17}$ is $C_3$–$C_{50}$alkyl which is interrupted by O and may be substituted by $OR^7$, or is glycidyl, $C_5$–$C_{12}$cycloalkyl, $C_5$–$C_{12}$cycloalkyl which is substituted by $OR^7$, $C_1$–$C_4$alkyl or —$OCOR^{11}$, or is $C_7$–$C_{11}$phenylalkyl which is unsubstituted or substituted by $OR^7$, Cl or $CH_3$;

$R^{18}$ and $R^{19}$, independently of one another, are $C_1$–$C_{12}$alkoxy, phenoxy, $C_1$–$C_{12}$alkyl, $C_5$–$C_2$cycloalkyl, benzyl, tolyl or phenyl;

$R^{20}$ is $C_2$–$C_{10}$alkylene, $C_4$–$C_{50}$alkylene which is interrupted by —O—, phenylene or a -phenylene-D-phenylene- group in which D is —O—, —S—, —$SO_2$—, —$CH_2$— or —$C(CH_3)_2$—;

$R^{21}$ is $C_2$–$C_{10}$alkylene, $C_2$–$C_{10}$alkylene which is interrupted by O or S, or is $C_6$–$C_{12}$arylene or $C_2$–$C_6$alkenylene;

$R^{22}$ is $C_2$–$C_{10}$alkylene, phenylene, tolylene, diphenylenemethane or

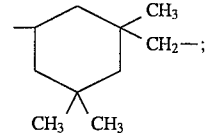

$R^{23}$ is $C_2$–$C_{10}$alkylene or $C_4$–$C_{20}$alkylene which is interrupted by —O—;

$R^{24}$ and $R^{25}$, independently of one another, are H, $C_1$–$C_{12}$alkyl, $C_2$–$C_6$alkenyl, $C_1$–$C_{12}$alkoxy, $C_3$–$C_{18}$alkenyloxy, halogen, trifluoromethyl, $C_7$–$C_{11}$phenylalkyl, phenyl, phenyl which is substituted by $C_1$–$C_{18}$alkyl, $C_1$–$C_{18}$alkoxy or halogen, or are phenoxy, or phenoxy which is substituted by $C_1$–$C_{18}$alkyl, $C_1$–$C_{18}$alkoxy or halogen;

X is a direct bond or —CO—;

$Z^1$ and $Z^2$, independently of one another, are $C_1$–$C_{12}$alkyl or together are $C_4$–$C_{10}$alkylene, which may be interrupted by an oxygen atom;

$Z^3$ is $C_1$–$C_{20}$alkyl or $C_7$–$C_{15}$phenylalkyl;

$Z^4$ and $Z^8$, independently of one another, are hydrogen or methyl; and $Z^5$, $Z^6$ and $Z^7$, independently of one another, are $C_1$–$C_8$alkyl, cyclohexyl, phenyl or $C_1$–$C_{18}$alkoxy.

13. A compound of the formula Ia according to claim 12, in which $R^1$ and $R^2$, independently of one another, are H, $C_1$–$C_{12}$alkyl, cyclohexyl, trifluoromethyl or $OR^7$;

$R^3$ and $R^4$, independently of one another, are H, $C_1$–$C_{12}$alkyl, cyclohexyl, $C_1$–$C_{18}$alkoxy, $C_3$–$C_{18}$alkoxy which is interrupted by O and/or substituted by $OR^7$, or are halogen or $OR^7$;

$R^5$, in the case where n=1, is as a monovalent radical as defined for $R^{17}$ or is $C_6$–$C_{18}$alkyl, $C_1$–$C_{18}$alkoxy, halogen, —O—SO$_2$—R$^{13}$ or —O—R$^{17}$; and in the case where R$^1$ and R$^2$ are not OR$^7$, R$^5$ also comprises H, C$_1$–C$_5$alkyl;

R$^5$, in the case where n=2, is as a divalent radical —O—G—O—, where G is C$_2$–C$_{16}$alkylene, C$_4$–C$_{12}$alkenylene, xylylene, C$_3$–C$_{20}$alkylene which is interrupted by —O—, or G is one of the groups —CH$_2$CH(OR$^7$)CH$_2$O—R$^{20}$—OCH$_2$CH(OR$^7$)CH$_2$—, —CO—R$^{21}$—CO—, —CO—NH—R$^{22}$—NH—CO— or —(CH$_2$)$_m$—COO—R$^{23}$—OOC—(CH$_2$)$_m$—, in which m is an integer in the range from 1 to 3, or is

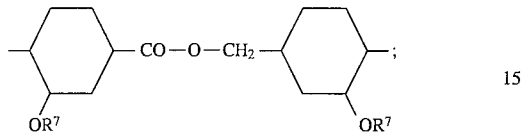

R$^6$ is in the o-position to R$^5$ and in the p-position to OR$^7$;

R$^9$ and R$^{10}$, independently of one another, are C$_1$–C$_{12}$alkyl, C$_3$–C$_{12}$alkoxyalkyl, C$_4$–C$_{16}$dialkylaminoalkyl or cyclohexyl, or R$^9$ and R$^{10}$ together are C$_3$–C$_9$alkylene, -oxaalkylene or -azaalkylene;

R$^{11}$ is C$_1$–C$_{18}$alkyl, trihalomethyl, C$_2$–C$_{18}$alkenyl, —CH$_2$—CO—CH$_3$, C$_7$–C$_{12}$aralkyl, C$_1$–C$_{12}$alkoxy, or phenyl which is unsubstituted or substituted by C$_1$–C$_{12}$alkyl, C$_1$–C$_4$alkoxy, halogen and/or benzyl;

R$^{17}$ is C$_5$–C$_{18}$alkoxycarbonyl or C$_2$–C$_{18}$alkenyl or is C$_1$–C$_{18}$alkyl which is substituted by OR$^7$, C$_1$–C$_{18}$alkoxy, C$_2$–C$_{18}$alkanoyl, C$_2$–C$_8$alkenyloxy, halogen, —COOR$^8$, —CONH$_2$, —CONHR$^9$, —CON(R$^9$)(R$^{10}$), —NHR$^9$, —N(R$^9$)(R$^{10}$), —NH-COR$^{11}$, —CN, —OCOR$^{11}$, a group of the formula

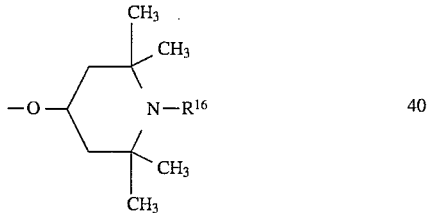

and/or phenoxy which is unsubstitued or substituted by C$_1$–C$_{18}$alkyl, C$_1$–C$_{18}$alkoxy, or halogen, or R$^{17}$ is C$_4$–C$_{20}$alkyl which is interrupted by O and may be substituted by OR$^7$, or is glycidyl, cyclohexyl, cyclohexyl which is substituted by OR$^7$, C$_1$–C$_4$alkyl or —OCOR$^{11}$, or is C$_7$–C$_{11}$phenylalkyl which is unsubstituted or substituted by Cl or CH$_3$;

R$^{18}$ and R$^{19}$, independently of one another, are C$_1$–C$_6$alkoxy, C$_1$–C$_4$alkyl, cyclohexyl, tolyl or phenyl;

R$^{24}$ and R$^{25}$, independently of one another, are H or C$_1$–C$_{12}$alkyl; and Z$^5$, Z$^6$ and Z$^7$, independently of one another, are C$_1$–C$_4$alkyl or C$_1$–C$_4$alkoxy.

14. A compound of the formula Ia according to claim 12, in which

R$^1$ and R$^2$, independently of one another, are H, C$_1$–C$_4$alkyl or OR$^7$;

R$^3$ and R$^4$, independently of one another, are H, C$_1$–C$_4$alkyl, C$_1$–C$_8$alkoxy, C$_3$–C$_{12}$alkoxy which is interrupted by O and/or substituted by OR$^7$, or are halogen or OR$^7$;

R$^5$, in the case where n=1, is as a monovalent radical as defined for R$^{17}$ or is halogen, C$_6$–C$_{18}$alkyl, C$_1$–C$_{18}$alkoxy, —O—SO$_2$—R$^{13}$ or —O—R$^{17}$; and in the case where R$^1$ and R$^2$ are not OR$^7$, R$^5$ also comprises H, C$_1$–C$_5$alkyl;

R$^5$, in the case where n=2, is as a divalent radical —O—G—O—, where G is C$_2$–C$_{16}$alkylene, C$_4$–C$_{12}$alkenylene or xylylene, or G is one of the groups —CH$_2$CH(OR$^7$)CH$_2$O—R$^{20}$—OCH$_2$CH(OR$^7$)CH$_2$—, —CO—R$^{21}$—CO—, —CO—NH—R$^{22}$—NH—CO— or —(CH$_2$)$_m$—COO—R$^{23}$—OOC—(CH$_2$)$_m$—, in which m is an integer in the range from 1 to 3;

R$^6$ is H, allyl, C$_1$–C$_{10}$alkyl, acetyl or benzoyl;

R$^7$ is —CO—R$^{11}$, —SO$_2$—R$^{13}$,

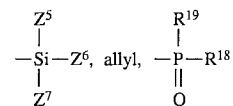

or a group of the formula

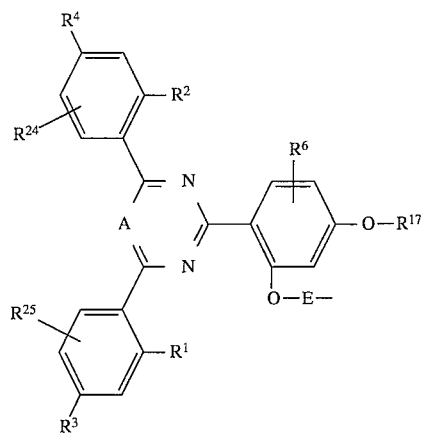

in which E is C$_3$–C$_{18}$alkylene or C$_4$–C$_{18}$alkenylene;

R$^8$ is C$_1$–C$_{18}$alkyl, C$_3$–C$_{18}$alkenyl, C$_3$–C$_{20}$alkyl which is interrupted by O, N or S and/or is substituted by OR$^7$, or is glycidyl or a group of the formula

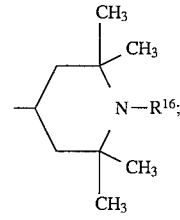

R$^9$ and R$^{10}$, independently of one another, are C$_1$–C$_{12}$alkyl or together are C$_4$–C$_9$alkylene, -oxaalkylene or -azaalkylene;

R$^{11}$ is C$_1$–C$_{12}$alkyl, trihalomethyl, C$_2$–C$_4$alkenyl, C$_1$–C$_{12}$alkoxy, phenyl, tolyl or xylyl;

R$^{13}$ is phenyl or C$_7$–C$_{18}$alkylphenyl;

R$^{15}$ is C$_2$–C$_{12}$alkylene;

R$^{16}$ is hydrogen, N-oxide, C$_2$–C$_8$alkanoyl, C$_1$–C$_{12}$alkyl, C$_1$–C$_{18}$alkoxy, cyclohexyl, C$_5$–C$_{12}$cycloalkoxy, C$_7$–C$_{11}$phenylalkyl or C$_7$–C$_{11}$phenylalkoxy;

R$^{17}$ is C$_3$–C$_{18}$alkenyl, or C$_1$–C$_{12}$alkyl which is substituted by OR$^7$, C$_1$–C$_{18}$alkoxy, —COOR$^8$, —CONHR$^9$, —CON(R⁹)(R¹⁰), —OCOR¹¹ or a group of the formula

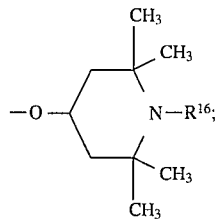

or R¹⁷ is $C_4$–$C_{20}$alkyl which is interrupted by 1 to 6 O atoms and may be substituted by $OR^7$, or is glycidyl, $C_5$–$C_{12}$cycloalkyl or $C_7$–$C_{11}$phenylalkyl;

$R^{18}$ and $R^{19}$, independently of one another, are $C_1$–$C_4$alkoxy, methyl or phenyl;

$R^{20}$ is $C_2$–$C_{10}$alkylene, phenylene or a -phenylene-D-phenylene- group in which D is —O—, —$SO_2$— or —$C(CH_3)_2$—;

$R^{21}$ is $C_2$–$C_{10}$alkylene, phenylene or $C_2$–$C_6$alkenylene;

$R^{22}$ is $C_2$–$C_{10}$alkylene or

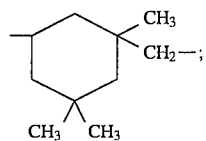

$R^{23}$ is $C_2$–$C_{10}$alkylene; and $R^{24}$ and $R^{25}$, independently of one another, are H or methyl.

15. A compound of the formula Ia according to claim 13, in which

A is a nitrogen atom;

$R^6$ is in the o-position to $R^5$ and in the p-position to $OR^7$;

$R^7$ is $C_2$–$C_8$alkanoyl, benzoyl, phenylsulfonyl, allyl,

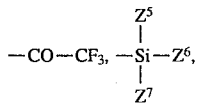

$C_7$–$C_9$alkylphenylsulfonyl or a group of the formula

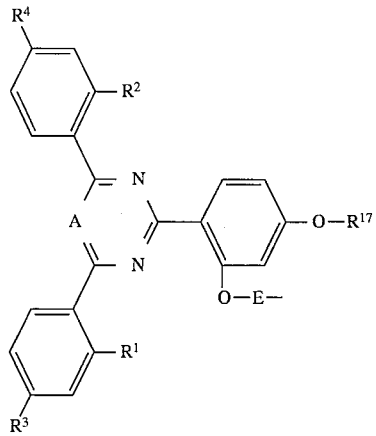

in which E is $C_3$–$C_6$alkylene or $C_4$–$C_6$alkenylene; and $Z^5$, $Z^6$ and $Z^7$, independently of one another, are $C_1$–$C_4$alkyl.

16. A compound of the formula Ia according to claim 13, in which $R^1$ and $R^2$, independently of one another, are H, $C_1$–$C_4$alkyl or $OR^7$;

$R^3$ and $R^4$, independently of one another, are H, $C_1$–$C_4$alkyl, $C_1$–$C_4$alkoxy, $C_3$–$C_{12}$alkoxy which is interrupted by O and substituted by $OR^7$, or are Cl or $OR^7$;

$R^5$, in the case where n=1, is —O—$R^{17}$; and in the case where $R^1$ and $R^2$ are not $OR^7$, also comprises H;

$R^5$, in the case where n=2, is —O—G—O—, where G is $C_2$–$C_{16}$alkylene;

$R^6$ is H or $C_1$–$C_{10}$alkyl;

$R^8$ is $C_1$–$C_8$alkyl;

$R^{11}$ is $C_1$–$C_3$alkyl, trifluoromethyl, trichloromethyl, $C_1$–$C_4$alkoxy, $C_2$–$C_3$alkenyl, phenyl, tolyl or xylyl;

$R^{13}$ is phenyl or $C_7$–$C_9$alkylphenyl;

$R^{16}$ is hydrogen, N-oxide, $C_1$–$C_{12}$alkyl, $C_1$–$C_{18}$alkoxy, cyclohexyloxy or $C_7$–$C_{11}$phenylalkyl;

$R^{17}$ is $C_1$–$C_{18}$alkyl, allyl, or $C_1$–$C_{12}$alkyl which is substituted by $OR^7$, $C_1$–$C_{18}$alkoxy, —$COOR^8$ and/or —$OCOR^{11}$; and $R^{24}$ and $R^{25}$, independently of one another, are H or methyl.

* * * * *